US008577795B2

(12) United States Patent
Clubb et al.

(10) Patent No.: US 8,577,795 B2
(45) Date of Patent: Nov. 5, 2013

(54) SYSTEM AND METHOD FOR REVENUE AND AUTHORIZATION MANAGEMENT

(75) Inventors: Ian James Clubb, Histon (GB); Philip Geoffrey Claridge, Caldecote (GB); Thomas Joseph Shusta, Longwood, FL (US); Jeffrey M. Miller, Oviedo, FL (US)

(73) Assignee: Convergys Information Management Group, Inc., Cincinnati, OH (US)

( * ) Notice: Subject to any disclaimer, the term of this patent is extended or adjusted under 35 U.S.C. 154(b) by 2269 days.

(21) Appl. No.: 10/682,663

(22) Filed: Oct. 9, 2003

(65) Prior Publication Data

US 2004/0153407 A1    Aug. 5, 2004

Related U.S. Application Data

(60) Provisional application No. 60/417,706, filed on Oct. 10, 2002.

(51) Int. Cl.
*G06Q 40/00* (2012.01)

(52) U.S. Cl.
USPC .......................................................... 705/39

(58) Field of Classification Search
USPC ..................................... 705/35–40
See application file for complete search history.

(56) References Cited

U.S. PATENT DOCUMENTS

| | | | |
|---|---|---|---|
| 4,901,223 A | 2/1990 | Rhyne | |
| 5,062,040 A | 10/1991 | Bishop et al. | |
| 5,392,390 A | 2/1995 | Crozier | |
| 5,539,883 A | 7/1996 | Allon | |
| 5,544,086 A | 8/1996 | Davis et al. | |
| 5,621,796 A | 4/1997 | Davis et al. | |
| 5,649,164 A | 7/1997 | Childs et al. | |
| 5,751,961 A | 5/1998 | Smyk | |
| 5,758,351 A | 5/1998 | Gibson et al. | |
| 5,801,938 A | 9/1998 | Kalantery | |
| 5,838,909 A | 11/1998 | Roy et al. | |
| 5,850,446 A | 12/1998 | Berger et al. | |
| 5,860,137 A | 1/1999 | Raz et al. | |
| 5,864,862 A | 1/1999 | Kriens et al. | |
| 5,889,863 A | 3/1999 | Weber | |
| 5,938,722 A | 8/1999 | Johnson | |
| 5,978,840 A | 11/1999 | Nguyen et al. | |
| 5,983,208 A | 11/1999 | Haller | |
| 5,987,132 A | 11/1999 | Rowney | |
| 6,035,342 A | 3/2000 | Bernstein et al. | |

(Continued)

FOREIGN PATENT DOCUMENTS

| WO | WO 97/49052 | 12/1997 |
|---|---|---|
| WO | WO 97/49055 | 12/1997 |

(Continued)

OTHER PUBLICATIONS

BellSouth Corporation, New Release Archive "BellSouth Third Quarter EPS Increases 10%" Oct. 19, 2000.*

(Continued)

*Primary Examiner* — Thomas M Hammond, III
(74) *Attorney, Agent, or Firm* — Foley & Lardner LLP

(57) ABSTRACT

A system is disclosed for facilitating relationship-centric authorization of transactions in a manner which provides optimum scalability and availability by logically partitioning wallets in conjunction with partitioning a resource associated with a group of consumers.

18 Claims, 80 Drawing Sheets

(56) References Cited

U.S. PATENT DOCUMENTS

| | | | |
|---|---|---|---|
| 6,041,332 | A | 3/2000 | Miller et al. |
| 6,058,423 | A | 5/2000 | Factor |
| 6,072,870 | A | 6/2000 | Nguyen et al. |
| 6,088,659 | A | 7/2000 | Kelley et al. |
| 6,119,105 | A | 9/2000 | Williams et al. |
| 6,167,378 | A | 12/2000 | Webber, Jr. |
| 6,175,876 | B1 | 1/2001 | Branson et al. |
| 6,199,068 | B1 | 3/2001 | Carpenter |
| 6,230,309 | B1 | 5/2001 | Turner et al. |
| 6,233,565 | B1 | 5/2001 | Lewis et al. |
| 6,253,027 | B1 | 6/2001 | Weber et al. |
| 6,253,230 | B1 | 6/2001 | Couland et al. |
| 6,272,523 | B1 | 8/2001 | Factor |
| 6,282,276 | B1 | 8/2001 | Felger |
| 6,311,165 | B1 | 10/2001 | Coutts et al. |
| 6,324,525 | B1 | 11/2001 | Kramer et al. |
| 6,363,363 | B1 | 3/2002 | Haller et al. |
| 6,373,950 | B1 | 4/2002 | Rowney |
| 6,374,297 | B1 | 4/2002 | Wolf et al. |
| 6,396,913 | B1 | 5/2002 | Perkins |
| 6,529,593 | B2 * | 3/2003 | Nelson ................ 379/114.2 |
| 6,578,068 | B1 | 6/2003 | Bowman-Amuah |
| 6,594,692 | B1 | 7/2003 | Reisman |
| 6,601,761 | B1 | 8/2003 | Katis |
| 6,636,833 | B1 * | 10/2003 | Flitcroft et al. ................. 705/1 |
| 6,658,099 | B2 | 12/2003 | Perkins |
| 6,658,568 | B1 | 12/2003 | Ginter et al. |
| 6,675,153 | B1 | 1/2004 | Cook et al. |
| 6,788,772 | B2 * | 9/2004 | Barak et al. ................. 379/130 |
| 6,941,285 | B2 * | 9/2005 | Sarcanin ..................... 705/67 |
| 7,117,172 | B1 * | 10/2006 | Black ............................ 705/35 |
| 7,280,645 | B1 * | 10/2007 | Allen et al. ................ 379/114.2 |
| 7,366,495 | B1 | 4/2008 | Magnotta et al. |
| 2001/0018648 | A1 | 8/2001 | Turner et al. |
| 2001/0034725 | A1 | 10/2001 | Park et al. |
| 2001/0039537 | A1 | 11/2001 | Carpenter et al. |
| 2002/0002609 | A1 | 1/2002 | Chung et al. |
| 2002/0013767 | A1 | 1/2002 | Katz |
| 2002/0077978 | A1 | 6/2002 | O'Leary et al. |
| 2002/0103753 | A1 | 8/2002 | Schimmel |
| 2002/0116331 | A1 * | 8/2002 | Cataline et al. ................. 705/39 |
| 2002/0152106 | A1 | 10/2002 | Stoxen et al. |
| 2002/0156683 | A1 | 10/2002 | Stoutenburg et al. |
| 2002/0169719 | A1 | 11/2002 | Dively et al. |
| 2002/0194502 | A1 | 12/2002 | Sheth et al. |
| 2003/0046094 | A1 | 3/2003 | Singh et al. |
| 2003/0115353 | A1 | 6/2003 | Deryugin et al. |
| 2003/0120546 | A1 | 6/2003 | Cusack et al. |
| 2003/0140004 | A1 | 7/2003 | O'Leary et al. |
| 2003/0145205 | A1 | 7/2003 | Sarcanin |
| 2003/0149662 | A1 | 8/2003 | Shore |
| 2003/0163431 | A1 | 8/2003 | Ginter et al. |
| 2003/0177088 | A1 | 9/2003 | Nilsson et al. |
| 2003/0195846 | A1 | 10/2003 | Felger |
| 2003/0195847 | A1 | 10/2003 | Felger |
| 2003/0195848 | A1 | 10/2003 | Felger |
| 2003/0212834 | A1 | 11/2003 | Potter et al. |
| 2003/0212927 | A1 | 11/2003 | Navar et al. |
| 2003/0216996 | A1 | 11/2003 | Cummings et al. |
| 2004/0019900 | A1 | 1/2004 | Knightbridge et al. |
| 2004/0128199 | A1 | 7/2004 | Cusack et al. |
| 2004/0133622 | A1 | 7/2004 | Clubb et al. |
| 2004/0172464 | A1 | 9/2004 | Nag |
| 2004/0194087 | A1 | 9/2004 | Brock et al. |

FOREIGN PATENT DOCUMENTS

| | | |
|---|---|---|
| WO | WO 98/05011 A2 | 2/1998 |
| WO | WO 98/10381 A1 | 3/1998 |
| WO | WO 98/13797 A2 | 4/1998 |
| WO | WO 99/13426 | 3/1999 |
| WO | WO 00/00915 A1 | 1/2000 |
| WO | WO 01/01300 A1 | 1/2001 |
| WO | WO 01/01313 A2 | 1/2001 |
| WO | WO 01/86570 A1 | 11/2001 |
| WO | WO 02/059754 A1 | 8/2002 |
| WO | WO 02/082305 A2 | 10/2002 |
| WO | WO 02/096012 A1 | 11/2002 |
| WO | WO 02/096105 A1 | 11/2002 |
| WO | WO 2004/034228 A2 | 4/2004 |

OTHER PUBLICATIONS

U.S. Appl. No. 60/417,706, filed Oct. 10, 2002, Chubb et al., Convergys Cross Ref.
U.S. Appl. No. 60/598,951, Convergys Cross Ref.
U.S. Appl. No. 60/579,402, Convergys Cross Ref.
U.S. Appl. No. 10/666,631, Convergys Cross Ref.
U.S. Appl. No. 10/190,844, Convergys Cross Ref.
U.S. Appl. No. 09/709,942, Convergys Cross Ref.
U.S. Appl. No. 10/682,601, filed Oct. 9, 2003, Clubb et al., Hydra I.
U.S. Appl. No. 10/682,663, filed Oct. 9, 2003, Clubb et al., Hydra II.
U.S. Appl. No. 11/555,518, Clubb et al., Hydra III.
U.S. Appl. No. 11/197,597, filed Aug. 4, 2005, Clubb et al., Hydra IV.
U.S. Appl. No. 11/151,930, filed Jun. 14, 2005, Clubb et al., Hydra V.
*The ACE Programmer's Guide*—ISBN 0-201-69971-0 Source Unavailable.
*Berkeley DB* by New Riders Library of Congress Catalogue # 00-109051 Source Unavailable.
*JAVA Language Definition* Source Unavailable.
Adams, D. J., Programming Jabber: Extending XML Messaging (O'Reilly XML) Rejected messaging approach used for real time chat protocols. (Probably no reference needed) Source Unavailable.
Foster, Ian, The Grid: Blueprint for a New Computing Infrastructure: Classic text on distributed system applications Source Unavailable.
Plat, David S., Introducing Microsoft.NET, Reference document for .NET architecture Source Unavailable.
IBM Web services provisioning for Websphere; Web Services Hosting Technology Version 1.1, *White Paper: Overview and Introduction* Source Unavailable.
Reviewed Abstract Only, *Privacy-preserving inter-database operations*ISI 2004 : intelligence and security informatics: Tucson AZ, Jun. 10-11, 2004,Gang Liang; Chawathe Sudarshan S ; Chen Hsinchun ed; Moore Reagan ed; Zeng Daniel D ed; Leavitt John ed Computer Science Department, University of Maryland College Park, Maryland 20742 United States Conference: Symposium on intelligence and security informatics, 2, (Tucson AZ USA), Jun. 10, 2004 Lecture notes in computer science, 2004, vol. 3073, p. 66-82 We present protocols for distributed computation of relational intersections and equi-joins such that each site gains no information about the tuples at the other site that do not intersect or join with its own tuples. Such protocols form the building blocks of distributed information systems that manage sensitive information, such as patient records and financial transactions, that must be shared in only a limited manner. We discuss applications of our protocols, outlining the ramifications of assumptions such as semi-honesty. In addition to improving on the efficiency of earlier protocols, our protocols are asymmetric, making them especially applicable to applications in which a low-powered client interacts with a server in a privacy-preserving manner. We present a brief experimental study of our protocols. (24 ref.).
Reviewed Abstract Only Houck, D.J.; Kim, E.; O'Reilly, G.P.; Picklesimer, D.D.; Uzunalioglu, H. *A Network Survivability Model For Critical National Infrastructures*, QoS Manage. & Assessment Group, Lucent Technol., Holmdel, NJ, USA Bell Labs Technical Journal, vol. 8, No. 4, p. 153-72 Publisher: Lucent Technologies, 2004 Critical national infrastructures for power, finance, transportation, and other basic resources rely on information and telecommunications networks (voice, data, Internet) to provide services and conduct business. While these networks tend to be highly reliable, disasters may lead to extended outages requiring days/weeks to repair. These outages can cause loss of emergency services, financial transaction failures, power distribution and transportation inefficiencies, and other malfunctions, resulting in inconvenience, financial ruin for individuals or businesses, or even loss of life. In this paper, we describe the life cycle of a disaster first and then present an approach for modeling information network disasters and their impact on other

(56) References Cited

OTHER PUBLICATIONS national infrastructures. Central to the approach is a simulation engine that Bell Labs has developed. The engine uses publicly available data (e.g., demographics, census, infrastructures) and, coupled with Bell Labs' network design and operational expertise, it effectively models network performance. This is particularly useful in the analysis of failure scenarios during and after a network disaster, providing insight for improving networks, procedures, and policies. (8 References).

Convergys Corporation, Infinys: *Geneva Rating and Billing, Administration and Maintenance*, Release 5.3. 2001-2004, (pp. 64-70) Convergys, Cincinnati, Ohio USA, pp. 64-70 [Hereinafter, Geneva] There is described a rating and billing system comprising the following elements: Consolidator, LoadStage*, and SortMergeDaemonProcess. In Geneva, the Consolidator and the SortMergeDaemon sorts the daily records and groups all call records of an account together. These elements store records in a bifurcated fashion to achieve greater retrieval efficiency by using one element (e.g., Consolidator) to managed newly arrived records and using the other element (e.g., SortMergeDaemon) to archive records in formats more suitable for CSR/Billing inquiries. LoadStage1 processes usage transactions when the USAGE_STATUS_IND is set to a predetermined value. It reads the BLOB files and writes out the data to various predetermined files. Geneva also utilizes a File Control Database. It uses the database to hold references to files in the operating system. The references, however, represent the entire file. Thus, when one wants to process a file in Geneva, the entire file is made on the operating system. When finished, an entry is made in the FCD and away it goes.

Ayad, N.; Verbraeck, A. Dept. of Syst. Eng., Delft Univ. of Technol., Netherlands Conference: 36th Hawaii International Conference on Systems Sciences , p. 10 pp. Publisher: IEEE Comput. Soc , Los Alamitos, CA, USA , 2003 , CD-ROM Pages Conference: 36th Hawaii International Conference on Systems Sciences , Jan. 6-9, 2003, Big Island, HI, USA *System Architecture for Cross Border Payment: A Case Study for the Financial Services Industry* The financial services industry is changing rapidly as a result of advances in information technology (IT), telecommunications and the Internet. Technological innovations and increasing customer demand have led to the emergence of new services and new organizational forms for financial services firms. Willingly or unwillingly, banks are being forced to move toward worldwide operation. This enables them to offer services and credit facilities on a global scale, tailored to customers regardless of where they are based. However, variations among national markets present obstacles as well as opportunities to companies attempting to "go global." This paper describes specific problems and solutions for the globalization of banking services, and a case study carried out on payment services for an international bank to develop system architecture for cross border payment. The proposed architecture aims to keep apart of the processes local, but transfers the core of the transaction operations to a centralized system with clear services and clear interfaces. The bi-directional translation of formats.

Masaud-Wahaishi, A., et al., *Brokering Services in Cooperative Distributed Systems: Privacy Based Model*, EC-Web 2003, LNCS 2738, pp. 435-444.

Axis Beta 1 documentation, 2002 http://ws.apache.org/axis/java/index.html.

Graham, Steve, et al., *Building Web Services with Java: Making Sense of XML, SOAP, WSDL and UDDI*, Sams Indianapolis, Indiana, 2002 http://www.amazon.com/Building-Web-Services-Java-Developers/dp/0672326418 (link is to 2nd edition, we used 1st edition).

Irani, Romin, S. Jeelani Basa, *Axis, Next Generation Java SOAP*, May 2002, Wrox Press, Birmingham, UK http://www.amazon.com/AXIS-Next-Generation-Java-SOAP/dp/1861007159 Publisher: Peer Information; 1st edition (May 2002) ISBN-10: 1861007159 ISBN-13: 978-1861007155.

Iyengar, et al., *Enhancing web performance*, Communication Systems. State of the Art. IFIP 17$^{th}$ World Computer Congress—TC6 Stream on Communication Systems: The State of the Art, 2002, pp. 95-126 An overview of the techniques for improving Web performance by supporting high volume Web traffic is provided. For improving server performance, multiple Web servers can be used in combination with efficient load balancing techniques. Also discussed is how the choice of server architecture affects performance. Content distribution networks (CDNs) and the routing techniques that they use are also examined. While Web performance can be improved using caching, a key problem with caching is its consistency. Different techniques for achieving varying forms of cache consistency are presented. Descriptor(s)—cache storage; computer architecture; network servers ; telecommunication network routing ; Internet; Web sites Identifier(s)—adaptive TTL algorithms; cache consistency; content distribution networks; dynamic Web content serving; event driven servers ; in kernel servers ; load balancing; process based servers ; server architecture; telecommunication network routing ; thread based servers ; CDN; Web caching; Web performance improvement; Web servers Treatment Code—TC-B; TC-G Sectional Classification Code—B6210L; B6150P; C7210N; C5630; C5220; C5620W.

Wang, T, et al., *A Distributed Secure E-Commerce Model with a Non-Secure Merchant Server for Developing Nations*, IKE 2002 International Conference.

Sycara, K. Sch. of Comput. Sci., Carnegie Mellon Univ., Pittsburgh, PA, USA Conference: Proceedings of the First International Joint Conference on Autonomous Agents and Multiagent Systems , p. 1044 Publisher: ACM, New York, NY, USA , 2002 , CD-ROM Pages Conference: AAMAS '02: First International Joint Conference on Automomous Agents and Multi-Agent Systems, Jul. 15-19, 2002, Bologna, Italy Agents Supporting Humans and Organizations in Open, Dynamic Environments Summary form only given. The presence of the digital infosphere and the continuous growth of e-commerce have generated important shifts in the ways people and organizations get information and make decisions. These shifts necessitate increased automation and creation of infrastructure, standards and policies to enable machines to automatically access information, understand it, fuse it as needed, and engage in collaborative problem solving to support decision making. Fulfilling such goals presents many challenges, including semantic interoperability, agent-based collaboration, information customization, automated and flexible service discovery and transactions across the Internet. Services are discovered and invoked manually by human users. In the near future, such service discovery and use will be mediated by agents acting on behalf of humans. This opens the possibilities for agents and humans to be team partners and coordinate sharing information, responsibility and control according to the task requirements. There are many challenges to accomplish such collaboration. A crucial one is making the Web agent-understandable, i.e. allowing for semantic annotation of content. The combination of the semantic Web and agent technology is the harbinger of the next Web revolution. Instead of being populated only with human-readable documents, the Web will be populated with agent-mediated services. In addition, agents will support human decision-making and human institutions through autonomous interactions, such as negotiations, coalition formation, and agent-mediated markets. In the Laboratory of Advanced Agent Technology at Carnegie Mellon University, the author has been developing multiagent infrastructure, tools, and algorithms that comprise a Reusable Environment of Task-Structured Intelligent Networked Agents (RETSINA). This infrastructure can be used for developing distributed heterogeneous intelligent agents that interact in various ways including a peer-to-peer manner, as well as agent-mediated services that describe themselves in semantically meaningful ways, discover one another dynamically, interoperate and compose themselves on-the-fly and on-demand, given particular tasks and goals to be fulfilled. This infrastructure has been used to support humans and organizations in open and dynamic environments, where information sources, agents and communication links may appear and disappear dynamically. The developed multiagent applications range from financial portfolio management, to distributed crisis action planning, team coordination, reactive and anticipatory assistance, location-based collaboration and e-commerce. She gives an overview of agent research and presents current research results and future challenges. Up until now, this vision has been conceived and pursued mainly in academia and research labs. How-

(56) References Cited

OTHER PUBLICATIONS ever, recent industrial interest in flexible interoperable automated transactions, Web services, and the availability of tools to enable some form of service automation (e.g. UDDI, WSDL, X-lang, WSFL, e-speak, NET, etc.) holds the promise of fast progress in this area.
Cygent Smart Component Server Concepts Guide—Version 4.0, SCSC40, Jun. 5, 2002, General Release Source Unavailable.
Siebel eBusiness Applications: Integration Business Process Summary Document, eCommunications, eMedia, Version 7.5.2, UAN 1.1 CME, Document Version 2.0, Nov. 2002 Source Unavailable.
Reviewed Abstract Only Hakomori, S.; Taniguchi, H. Dept. of Inf. Technol., NTT Data Corp., Tokyo, Japan Systems and Computers in Japan, vol. 33, No. 14, p. 59-71 Publisher: Scripta Technica, Dec. 2002 *An Operating System for an Online Transaction Processing System With a Heavy Load* In this paper, we describe an operating system for terminal controller which controls communication lines and terminals in a large-scaled distributed transaction processing system. Since the controller deals with a lot of transaction requests from terminals concurrently, its operating system needs to manage resources efficiently in order to guarantee the maximum response time. Besides, system availability and efficiency for system maintenance are also required, therefore the operating system has to provide essential facilities. Our operating system was developed to satisfy such requirements in a practical way. This paper introduces the major features, evaluation results, and states of the application. (11 References).
Allamaraju, Subrahmanyam (Editor), et al., Professional Java Server Programming J2EE, 1.3 Edition, (Perfect Paperback—Sep. 2001): An example of one of the many Java J2EE texts. http://www.amazon.com/Professional-Java-Server-Programming-J2EE/dp/1861005377 Publisher: Wrox Press; 1st edition (Sep. 2001) ISBN-10: 1861005377 ISBN-13: 978-1861005373.
*Siebel eBusiness Application Integration vol. 1. eBusiness Applications*, Version 7.0, 10PAI-OV00-07000, Sep. 2001 Source Unavailable.
*Siebel eCommunications Guide: eBusiness Applications Version 7.0 80PA1-CG00-70000*, Dec. 2001 Source Unavailable.
Chang, et al., *A pipe-embeded-component assembly mechanism in CORBA environment*, IEEE 2000, pp. 283-288.
Reviewed Abstract Only Little, Hayward; Esterline, A. North Carolina Agricultural and Technical State Univ, Greensboro, NC, USA Conference: IEEE SoutheastCon 2000 'Peparing for the New Millenium', Nashville, TN, USA, 19000407-19000409 , (Sponsor: IEEE Region-3; Vanderbilt University; Tennessee State University; Tennessee Technological University; et al.) Conference Proceedings—IEEE Southeastcon 2000. IEEE, Piscataway, NJ, USA. p. 64-67, 2000 *Agent-Based Transaction Processing* The increase in the popularity of agents and transactions has made it necessary to develop a framework for multiagent interaction. Traditional database transactions, which use ACID properties, must be extended to meet the needs present in an agent, peer-to-peer environment. By encapsulating our agents and having them conform to new commitment rules, transactions can be done safely and effectively. (Author abstract) 6 Refs.
Russell, Travis, Signalling System #7, reference for distributed architectures used in switched phone network. http://www.amazon.com/Signaling-System-7-Travis-Russell/dp/0071361197 Publisher: McGraw-Hill Companies; 3rd edition (Jun. 19, 2000) ISBN-10: 0071361197 ISBN-13: 978-0071361194.
Mori, M., et al., *Proposal of Application Architecture in Electronic Commerce Service Between Companies*, WECWIS International Workshop, 1999.
Paik, I., *Universal Electronic Commerce Framework and Distributed Object Services Based on SET Protocol*, IASTED Conference, Software Engineering, 1998.
*Signal and Image Processing (SIP '98)*, Proceedings of the IASTED International Conference, Las Vegas, Nevada—USA Complete Source Unavailable.
Reviewed Abstract Only Ishizaka T; Hyou K Bit Inc., Jpn ; Dalian Univ. Technol., Chn Joho Shori Gakkai Shinpojiumu Ronbunshu, 1998, vol. 98, No. 14, p. 147-151 *TimeCube—a Temporal Data Warehouse and Its Distributed Applications* TimeCube is a new product which has being design and developed in our department. In this paper we will explain characteristics of TimeCube and its technical points of the design and implementation. It is a new type of Data Warehouse which can collect and store time-varying data automatically. There are three types of data stored in databases, transaction type data, aggregated type data and master type data. TimeCube belongs to the master type data based on the state model. Many time query methods such as period query, history query, period length query, event query etc. and their combination query are also described. TimeCube is very adaptable to distributed computing environments and applications based on a Client/Server model. A lot of distributed potential applications in personnel, business, traffic, and financial departments etc. are also illustrated. (author abst.).
Reviewed Abstract Only TREC'98 : trends in distributed systems for electronic commerce : Hamburg, Jun. 3-5, 1998 Papazoglou M P; Jeusfeld M A; Weigand H; Jarke M ; Lamersdorf Winfried ed; Merz Michael ed Infolab, Tilburg University 5000 LE Tilburg Netherlands; RWTH Aachen, Informatik V 52056 Aachen Germany Conference: International IFIP/GI working conference, (Hamburg DEU), Jun. 3, 1998 Lecture notes in computer science , 1998, vol. 1402, p. 192-204 *Distributed, Interoperable Workflow Support for Electronic Commerce* This paper describes a flexible distributed transactional workflow environment based on an extensible object-oriented framework built around class libraries, application programming interfaces, and shared services. The purpose of this environment is to support a range of EC-like business activities including the support of financial transactions and electronic contracts. This environment has as its aim to provide key infrastructure services for mediating and monitoring electronic commerce. (16 ref.).
Reviewed Abstract Only Balasubramanian, R.; Haskell, L.; Karmarkar, V.; Lackey, J.; Yatchman, M. Lucent Technol., USA Conference: ISS'97: World Telecommunications Congress. 'Global Network Evolution: Convergence or Collision?'. Proceedings Part: vol. 2 , p. 105-12 vol. 2 Publisher: Pinnacle Group, Toronto, Ont., Canada, 1997, 2 vol. (xxxiv+591+633) Pages Conference: Proceedings of ISS'97 International Switching Symposium, Sponsor: Alcatel Canada, Bell Canada, BC Tel, Island Telphone Co., Manitoba Telecom Serv., et al, Sep. 21-26, 1997, Toronto, Ont., Canada *Toward Object-Web-Based Service Provider Infrastructure for E-Commerce Transactions* The emergence of the World-Wide Web (WWW) as the pervasive and ultimate open framework for multi-computer and multi-party collaboration has spurred rapid evolution of online business transaction processing and delivery architectures. The promise of heterogeneous networked systems inter-operating to conduct secure multi-party commerce over the Internet with object-based transaction processing technologies is just being realized. The Web model's span of application across computer and communication networks from corporate private backbones (intranets) to global public backbones (Internets), and several grades of sub-networks in between (virtual intranets or extranets), has created the universal "plumbing" scenario for the next decade. Distributed object computing (DOC) standards that will both utilize and incrementally enhance this plumbing are fuelling competition between "network" and "network-edge" technology companies in the creation of the next generation of electronic commerce (E-commerce) overlay infrastructures. The dominant criteria driving choices can perhaps be best categorized into two powerful dimensions, namely, psychological and economical, where decisions to locate essential object services for E-commerce will need to address a mix of security, reliability and economies-of-scale attributes. This paper propositions a road-map to rapid collaborative approaches where network providers (NP) and content providers (CP) can offer best-in-class E-commerce transaction services by addressing these attributes simultaneously. (11 References).
Reviewed Abstract Only Vogler, Hartmut; Kunkelmann, Thomas; Moschgath, Marie-Louise Darmstadt Univ of Technology, Darmstadt, Ger Conference: Proceedings of the 1997 International Conference on Parallel and Distributed Systems , Seoul, South Korea , 19971210-19971213 , (Sponsor: IEEE) Proceedings of the Intematoinal Conference on Parallel and Distributed Systems—ICPADS 1997. IEEE Comp Soc, Los Alamitos, CA,

(56) References Cited

OTHER PUBLICATIONS

USA,97B100215. p. 268-274 *1997 Approach For Mobile Agent Security and Fault Tolerance Using Distributed Transactions* Mobile agents are no longer a theoretical issue since different architectures for their realization have been proposed. With the increasing market of electronic commerce it becomes an interesting aspect to use autonomous mobile agents for electronic business transactions. Being involved in money transactions, supplementary security features for mobile agent systems have to be ensured. In this paper we present an architecture for a mobile agent system which guarantees security for the host as well as security for the agent. This architecture additionally offers fault tolerance for the whole agent system at a high level. To handle these issues for mobile agents we use various encryption mechanisms and we apply a novel method for mobile agent systems by using distributed transactions processing based on the OMG Object Transaction Service in our architecture. With this security architecture an agent will be enabled to do money transactions. (Author abstract) Refs.

Reviewed Abstract Only Linn, C.; Howarth, B. Dept. of Comput., Univ. of Western Sydney, Nepean, NSW, Australia , p. 203-12 Publisher: IEEE Comput. Soc. Press , Los Alamitos, CA, USA, 1994 , xii+272 Pages Conference: Proceedings of 3rd International Conference on Parallel and Distributed Information Systems , Sponsor: IEEE Comput. Soc. Tech. Committee on Data Eng., ACM SIGMOD, Bellcore, US West , Sep. 28-30, 1994 , Austin, TX, USA *A Proposed Globally Distributed Federated Database: A Practical Performance Evaluation* Many organisations are now planning to move their operations from total reliance on centralised databases towards distributed environments which may involve the interoperability of a Number of heterogeneous databases. This study looks at a particular case for an international financial institution, with the likely performance of a proposed globally distributed federated database being compared with the performance of the current centralised system. The performance model developed includes submodels for transaction structure and management, user workload and distributed heterogeneous databases. Simulations focus on response times for a particular class of credit control/deal entry transactions in the presence of a background load. The results demonstrate that the proposed federated database outperforms the current centralised system, and that this is achievable using currently available technology. (25 References).

Reviewed Abstract Only Lee, P.C.; Ghosh, S. Integration Services Div., Andersen Consulting, Kuala Lumpur, Malaysia IEEE Journal on Selected Areas in Communications , vol. 12, No. 6, p. 1072-87, Aug. 1994 *NOVAHID: A Novel Architecture for Asynchronous, Hierarchical, International, Distributed, Real-Time Payments Processing* The paper introduces a novel architecture for asynchronous, hierarchical, international, geographically distributed, real-time banking, NOVAHID. NOVAHID is organized as a hierarchical approach. The paper assumes that nations may be organized into unique and autonomous entities, termed groups. The lower level of the hierarchy consists of discrete "group-networks" where each group-network is synthesized from the Equivalent Federal Reserve banking nodes of the nations served by the group-network. At the highest level of the hierarchy, representative entities of the groups are interconnected through a "top-level-network". The hierarchy reflects the underlying assumption that a significant fraction of all transactions is local to the group-networks. NOVAHID utilizes the principles of YADDES, which embodies the principle of an asynchronous, discrete-event simulation algorithm for cyclic circuits and mathematically guarantees the accuracy of the execution of events. Each banking transaction is modeled as an event in discrete-event simulation. NOVAHID guarantees the accuracy of every transaction and, hence, the accurate balance of every account at all times. NOVAHID offers to any user the banking privileges of withdrawal, deposit, and transfer anywhere and at any time in the world. The paper also describes a model ' and implementation of NOVAHID on a loosely coupled parallel processor. Performance measures are also reported. (19 References).

Reviewed Abstract Only Lee, Tony; Ghosh, Sumit Brown Univ, Providence, RI, USA Simulation v 62 n 3 Mar. 1994. p. 180-201, 1994 *Distributed Approach to Real-Time Payments-Processing in a Partially-Connected Network of Banks Modeling and Simulation* This paper observes that the banking process may be mathematically mapped to a discrete-event simulation system with feedback loops. This approach distributes the processing operations to multiple, concurrent, cooperating geographically distributed computers. It mathematically guarantees the accuracy of every transaction. 21 Refs.

Lee, Y.-H.; Yu, P.S.; Iyer, B.R. IBM Thomas J. Watson Res. Center, Yorktown Heights, NY, USA IEEE Transactions on Computers , vol. C-36, No. 8 , p. 976-87 , Aug. 1987 *Progressive Transaction Recovery in Distributed DB/DC Systems* To perform large amounts of on-line transactions processing, several database management (DB) and data communication management (DC) subsystems can be coupled together to form a distributed DB/DC system. A key problem is to provide these distributed systems with effective means to recover transactions upon failure, while paying little performance penalty during normal processing. Also, there should be minimal interference with fault-free components during the recovery of a failed component. By decentralizing recovery management, and using transaction-level structural information to eliminate costly lower-level handshaking protocols, progressive transaction recovery protocols seek to solve the problem. A queueing model for evaluating the transaction response time during normal processing for progressive and pessimistic protocols is developed and solved, via simulation. The progressive recovery protocols are shown to reduce normal processing overhead and lead to performance improvement over the pessimistic protocol. (23 References).

CIFS—Common Internet File System. Microsoft sponsored alternative to NFS. http://www.microsoft.com/mind/1196/cifs.asp.

Dell PowerEdge 1655MC server. Documentation/vendor products re: cluster in a chassis with the following features: node management, Hot swap, Integral Gigabit Ethernet networks, SAN or Network Attached Storage support, Integral storage modules.

VI: Virtual Interface: Fast memory to memory transfers over network. Virtual Interface Architecture Specification: ftp://download.intel.com/design/servers/vi/VI_Arch_Specification10.pdf.

IBM: http://www-03.ibm.com/systems/bladecenter/products/ Documentation/vendor products re: cluster in a chassis with the following features: node management, Hot swap, Integral Gigabit Ethernet networks, SAN or Network Attached Storage support, Integral storage modules.

http://www-3.ibm.com/software/solutions/webservices/bpel.html WS-Coordination: WS-Coordination provides developers with a way to manage the operations related to a business activity. A business process may involve a Number of Web services working together to provide a common solution. Each service needs to be able to coordinate its activities with those of the other services for the process to succeed. Coordination involves the sequencing of operations in a process to reach an agreement on the overall outcome of the business process. WS-Transaction: WS-Transaction allows businesses to monitor the success or failure of each specific, coordinated activity in a business process. It provides businesses with a flexible transaction protocol to help enable consistent and reliable operations across distributed organizations in a Web services environment. The specification also allows the business process to react to faults detected during execution. BPEL4WS: BPEL4WS is an XML-based flow language that defines how business processes interact. This interaction can involve processes contained within or between enterprises. It allows companies to describe complex business processes that can span multiple companies, such as order processing, lead management and claims handling. BPEL4WS replaces the existing IBM WSFL and Microsoft® XLANG efforts by combining and extending the functions of these previous foundation technologies.

http://www-106.ibm.com/developerworks/webservices/library/ws-wsht/ IBM Web services provisioning.

http://www.altiris.com/ Blade Server Support.

http://www.antssoftware.com/technology/ace.php3 Lock free databases: ANTS.

http://www.beowulf.org/overview/index.html Beowulf introduction.

http://www.beowulf.org/overview/faq.html Beowulf Overview.

http://www.brocade.com/ Brocade.

(56) References Cited

OTHER PUBLICATIONS http://www.cdt.luth.se/~olov/publications/JHSN-98.pdf Resource sharing in advance reservation agents, Olov Schelen and Stephen Pink, Computer Science and Electrical Engineering, Lulea University of Technology, Sweden.
http://www.clusterfs.com/ Cluster File System / InterMezzo.
http://clustering.foundries.sourceforge.net/ SourceForge.
http://www.cs.fsu.edu/~engelen/soap.html Microsoft sponsored standard submitted to IETF to wrapper message payloads of different types (e.g. XML, binary, JPEG), into a common message payload. The DIME standard makes it very simple to skip unwanted parts of the message (unlike the similar MIME function for E-mails). Integrating into a number of SOAP toolkits.
http://www.csm.ornl.gov/oscar/ Oscar: Open source clustering application resources: OSCAR Components.
http://www.csm.ornl.gov/pvm/ PVM.
http://www.csm.ornl.gov/torc/C3/ C3.
http://www.cs.oberlin.edu/~jbasney/honors/thesis.html Programming Language Linda.
http://www.cs.umanitoba.ca/~pgraham/papers/hpcs98.pdf Managing Long Linked Lists Using Lock Free Techniques, Mohammad Farook and Peter Graham, University of Manitoba, Canada.
http://www.cs.wustl.edu/~schmidt/ACE-overview.html Source code about the Shared Memory management portion of the ACE library, Documentation of ACE C++ as a sample framework that supports dynamic loading.
Reviewed Abstract Only http://www.cs.yale.edu/Linda/ap_and_piranha.html, *Adaptive Parallelism and Piranha*, Nick Carriero, Eric Freeman, David Gelernter and David Kaminsky. *Adaptive Parallelism and Piranha*. Yale University, Feb. 1994 Abstracts, full article requires IEEE subscriptions, abstracts from: http://ieeexplore.ieee.org/xpl/freeabs_all.jsp?tp=&arnumber=362631&isnumber=8308 This paper appears in: Computer Publication Date: Jan. 1995 vol. 28, Issue: 1 On pp. 40-49 ISSN: 0018-9162 References Cited: 12 CODEN: CPTRB4 INSPEC Accession No. 4881874, Digital Object Identifier: 10.1109/2.362631 Posted online: Aug. 6, 2002 20:02:51.0 Desktop computers are idle much of the time. Ongoing trends make aggregate LAN "waste"-idle compute cycles-an increasingly attractive target for recycling. Piranha, a software implementation of adaptive parallelism, allows these waste cycles to be recaptured by putting them to work running parallel applications. Most parallel processing is static: programs execute on a fixed set of processors throughout a computation. Adaptive parallelism allows for dynamic processor sets which means that the number of processors working on a computation may vary, depending on availability. With adaptive parallelism, instead of parceling out jobs to idle workstations, a single job is distributed over many workstations. Adaptive parallelism is potentially valuable on dedicated multiprocessors as well, particularly on massively parallel processors. One key Piranha advantage is that task descriptors, not processes, are the basic movable, remappable computation unit. The task descriptor approach supports strong heterogeneity. A process image representing a task in mid computation can't be moved to a machine of a different type, but a task descriptor can be. Thus, a task begun on a Sun computer can be completed by an IBM machine. The authors show that adaptive parallelism has the potential to integrate heterogeneous platforms seamlessly into a unified computing resource and to permit more efficient sharing of traditional parallel processors than is possible with current systems.
http://www.eecs.harvard.edu/dafs/ or http://www.acmqueue.org/modules.php?name=Content&pa=showpage&pid=48 DAFS—Direct Access File System.
http://www.dell.com/downloads/global/products/pedge/en/pe1955_spec_sheet.pdf Documentation/vendor products re: cluster in a chassis with the following features: node management, Hot swap, Integral Gigabit Ethernet networks, SAN or Network Attached Storage support, Integral storage modules.
http://www.dwheeler.com/program-library/Program-Library-HOWTO/shared-libraries.html.
http://freshmeat.net/browse/141/?topic_id=141 Links from Freshmeat.
http://www.globus.org/alliance/publications/papers/iwqos.pdf A Distributed Resource Management Architecture that Supports Advance Reservations and Co-Allocation, Ian Foster, Mathematics and Computer Science Division, Argonne National Laboratory and Department of Computer Science, University of Chicago.
http://www.gnutella.co.uk/library/pdf/paper_final_gnutella_english.pdf Gnutella: Distributed System for Information Storage and Searching, Model Description, Fernando R. A. Bordignon, Gabriel H. Tolosa, bordi@unlu.edu.ar, tolosoft@unlu.edu.ar, División Estadística y Sistemas, Departamento de Ciencias Básicas, Universidad Nacional de Luján.
http://gridengine.sunsource.net/.
HP: http://h18004.www1.hp.com/products/blades/components/bladeservers.html Documentation/vendor products re: cluster in a chassis with the following features: node management, Hot swap, Integral Gigabit Ethernet networks, SAN or Network Attached Storage support, Integral storage modules.
http://www.ibiblio.org/pub/Linux/docs/HOWTO/other-formats/html_single/Beowulf-HOWTO.html Beowulf Clusters.
http://www.icewalkers.com/Linux/Software/513710/LUI.html LUI—Linux Utility for cluster Install. The Linux Utility for cluster Install (LUI) utility—an open-source project sponsored by IBM that was released in April of 2000 under the GPL (GNU Public License).
http://www.ietf.org/html.charters/rserpool-charter.html RSerPool standards.
http://www.iis.ee.ic.ac.uk/~frank/surp98/report/sha/ SET / Secure Electronic Transaction Protocol.
http://www.infinibandta.org/home Infiniband: Next generation storage interconnect based on multiple of 2.5Gbit links.
http://www.intel.com/ Technologies to support commercial clustering Specifically the Intel® Cluster Toolkit for Linux. And Intel MPI Library. Currently: http://www.intel.com/cd/software/products/asmo-na/eng/244171.htm.
http://www.inter-mezzo.org/ InterMezzo: High availability distributed file system.
http://www.isotton.com/howtos/C++dlopen-mini-HOWTO/C++-dlopen-mini-HOWTO.html Dynamic loading of C++ classes. Source Unavailable.
www.ietforg Linux kernel LKSCTP under test with Kernel 2.5.29.
http://java.sun.com/j2ee/download.html#platformspec J2EE 1.4 Enterprise Edition Specification Proposed Final draft, Aug. 19, 2002.
http://java.sun.com/webservices/docs.html JSR-101, Java API for SML base RPC 1.0, JAX-RPC?
http://jcp.org/aboutJava/communityprocess/first/jsr109/index.html JSR-109, Web Services for J2EE, Versio 1.0 proposed final draft: Aug. 19, 2002.
http://www.lam-mpi.org/ LAM/MPI.
http://www.linux-mag.com/2002-04/compile_01.html *Building and Using Shared Libraries*, Requires subscription to access. Source Unavailable.
http://www.lua.org/ddj.html Doctor Dobb's Journal Lua Example.
http://www.lua.org/docs.html Lua Home Page.
http://msdn.microsoft.com/msdnmag/issues/02/12/DIME/ Microsoft sponsored standard submitted to IETF to wrapper message payloads of different types (e.g. XML, binary, JPEG), into a common message payload. The DIME standard makes it very simple to skip unwanted parts of the message (unlike the similar MIME function for E-mails). Integrating into a number of SOAP toolkits.
http://www.netlib.org/utk/papers/mpi-book/mpi-book.html MPI Textbook.
http://www.nfsv4.org/nfs4technifo.html Network File System Version 4, RFC standards relating to the NVS protocol (CS file persistence), printed Sep. 15, 2005.
http://www.openclustergroup.org/ Oscar: Open source clustering application resources: OSCAR Components.
http://www.opengroup.org/onlinepubs/007908799/xsh/dlopen.html for documentation of dlopen( ).
www.openldap.org LDAP—Review LDAP for external application access to Hydra directory services if required.
http://www.openp2p.com/pub/a/p2p/2004/04/16/matrix.html Open P2P website.
http://www.openpbs.org/ PBS.
http://www.openssh.com/ OpenSSH.

(56) References Cited

OTHER PUBLICATIONS http://www.openssl.org/ OpenSSL.
http://parlweb.parl.clemson.edu/pvfs/ Parallel Virtual File System.
http://people.redhat.com/drepper/dsohowto.pdf Linus shared library tutorial.
www.qlogic.com iSCSI: Hardware accelerated virtual SCSI connections over 1G and 10G Ethernet.
http://www.quadrics.com/ supercomputer interconnect and resource management.
www.qualcomm.com/press/PDF/BREW_whitepaper.pdf—Alternate location: http://whitepapers.zdnet.co.uk/0,1000000651,260064487p,00.htm—Requires signup to download. The Road to Profit is Paved with Data Revenue—QUALCOMM *Internet* Services White Paper—Jun. 2002 Source Unavailable.
http://www.racemi.com/ Racemi DynaCenter scheduled for release in Q3 2002 that is claimed will "reconfigure network switching and storage on the fly to dynamically allocate server resources for use as a shared utility, in real-time."
www.saforum.org/ High availability specifications.
http://save.wellsfargostore.com/wallet/Security.asp?SID Wells Fargo Electronic Wallet Security Information Source Unavailable.
http://www.scali.com/ Scali.
www.sctp.de Linux kernel LKSCTP under test with Kernel 2.5.29 RSerPool assumes a new standard messaging protocol called SCTP.
www.sctp.org Linux kernel LKSCTP under test with Kernel 2.5.29 RSerPool assumes a new standard messaging protocol called SCTP.
http://heather.cs.ucdavis.edu/~matloff/Linda/Notes/Linda.NM.html Linda Tutorial.
http://www.sistina.com/products_gfs.htm Sistina Software (volume management, and global file system).
http://www.sisuite.org/ System Installation Suite.
http://www.sleepycat.com/docs/ref/toc.html Product documentation about Berkeley DB.
http://www.perfectxml.com/Xanalysis/TSG/TSG_DefiningWebServices.pdf The Stencil Group: Defining Web Services.
http://wwws.sun.com/software/gridware/, Grid Engine software products designed to support both cluster and campus wide computing.
hhp://supercluster.org/maui/ Maui PBS Scheduler.
http://www.textuality.com/bonnie/ Bonnie: File system benchmark.
http://www.theinquire.net/?article=4438 Platform futures: Intel Tiger Xeon 1.6GB.
http://www.mpi-forum.org/ MPI message passing interface.
http://www-unix.mcs.anl.gov/mpi/mpich/ MPICH.
http://www.w3.org/TR/SOAP SOAP 1.1, May 2000.
http://www.w3.org/TR/2002/WD-soap12-part1-20020626 W3C SOAP Version 1.2 Part 1: Message Framework, Working Draft.
http://www.w3.org/2001/03/WSWS-popa/paper51 IBM and Microsoft, Web Services Framework for W3C Workshop on Web Services, Apr. 11-12, 2001, San Jose CA.
http://www.xml.com/pub/r/1173 HTTPR—A reliable messaging standard intended for SOAP based in HTTP.
Information Disclosure Statement for U.S. Appl. No. 10/682,601 dated Oct. 27, 2004.
Office Action dated Dec. 11, 2006 for U.S. Appl. No. 10/682,601.
Office Action dated Apr. 12, 2007 for U.S. Appl. No. 10/682,601.
Information Disclosure Statement for U.S. Appl. No. 11/197,597, filed Aug. 4, 2005.
Information Disclosure Statement for U.S. Appl. No. 11/197,597, filed Sep. 28, 2005.
Information Disclosure Statement for U.S. Appl. No. 11/151,930, filed Nov. 28, 2005.
Information Disclosure Statement for U.S. Appl. No. 10/190,844, filed Jul. 8, 2002.
Office Action dated Dec. 7, 2005 for U.S. Appl. No. 10/190,844.
Information Disclosure Statement for U.S. Appl. No. 10,190,844, filed Mar. 23, 2006.
Office Action dated May 24, 2006 for U.S. Appl. No. 10/190,844.
Information Disclosure Statement for U.S. Appl. No. 09/425,548, filed Oct. 10, 2000.
Office Action dated Nov. 30, 2000 for U.S. Appl. No. 09/425,548 filed Nov. 30, 2000.
Office Action dated Nov. 30, 2000 for U.S. Appl. No. 09/425,548 filed Jun. 11, 2001.
Notice of References Cited for U.S. Appl. No. 09/425,548.
Information Disclosure Statement for U.S. Appl. No. 09/961,673, dated Sep. 24, 2001.
Office Action dated Mar. 20, 2002 for U.S. Appl. No. 09/961,673.
Office Action dated Nov. 14, 2002 for U.S. Appl. No. 09/961,673.
Information Disclosure Statement for U.S. Appl. No. 10/666,631.
Information Disclosure Statement for U.S. Appl. No. 09/709,942, dated Sep. 9, 2001 (abandoned).
Notice of References Cited for U.S. Appl. No. 09/709,942 (abandoned).
Office Action undated for U.S. Appl. No. 09/709,942 (abandoned).
Office Action dated Dec. 22, 2003 for U.S. Appl. No. 09/709,942 (abandoned).
Office Action dated Jun. 21, 2004 for U.S. Appl. No. 09/709,942 (abandoned).
Office Action dated Dec. 6, 2004 for U.S. Appl. No. 09/709,942 (abandoned).
Office Action dated Oct. 3, 2005 for U.S. Appl. No. 10/190,728, filed Jul. 8, 2002.
Office Action dated Dec. 31, 2007 for U.S. Appl. No. 10/666,631.
Non-Final Rejection dated Aug. 8, 2008 for U.S. Appl. No. 10/682,601.
U.S. Appl. No. 12/013,816, filed Jan. 14, 2008, Magnotta et al.
Office Action dated Oct. 6, 2008 for U.S. Appl. No. 11/151,930.
Office Action dated Mar. 24, 2009 for U.S. Appl. No. 11/197,597.
Office Action dated Oct. 30, 2008 for U.S. Appl. No. 11/197,597.
http://publib.boulder.ibm.com/infocenter/db2luw/v8/index.jsp?topic=/com.ibm.db2.udb.doc/admin/c0004905.htm printed on Dec. 26, 2008.
http://highscalability.com/unorthodox-approach-database-design-coming-shard printed on Jan. 7, 2009.
http://mysqldba.blogspot.com/2006/11/unorthodox-approach-to-database-design.html printed on Jan. 7, 2009.
http://www.linkedin.com/ppl/webprofile?action=vmi&id=4379834&authToken=RH8r&authType=name&trk=ppro_viewmore&Ink=vw_ppro.printed on Jan. 7, 2009.
http://mysqldba.blogspot.com/2006/11/unorthodox-approach-to-database-design.html, printed Jan. 12, 2009 (part 2).
Office Action dated Apr. 14, 2009 for U.S. Appl. No. 10/666,631.
Office Action dated Jul. 13, 2009 for U.S. Appl. No. 11/555,518.
Office Action dated Mar. 10, 2010 for U.S. Appl. No. 10/666,631.
Office Action dated Feb. 9, 2010 for U.S. Appl. No. 11/555,518.
Office Action dated Jan. 7, 2011 for U.S. Appl. No. 12/651,720.
Office Action issued against U.S. Appl. No. 11/555,518 dated Jul. 28, 2010.
Office Action dated Mar. 31, 2011 for U.S. Appl. No. 10/666,631.
Office Action dated Dec. 23, 2010 for U.S. Appl. No. 11/555,518.
Office Action dated Jun. 3, 2009 for U.S. Appl. No. 10/682,601.

* cited by examiner

SYSTEM AND METHOD FOR REVENUE AND AUTHORIZATION MANAGEMENT

This non-provisional patent application claims priority from U.S. Provisional Patent Application Ser. No. 60/417,706, which was filed on Oct. 10, 2002.

BACKGROUND OF THE INVENTION

1. Field of the Invention

The field of invention relates generally to a computerized architecture for facilitating revenue and authorization management.

2. Description of the Related Art

Large carriers are making a significant push to reduce the number of customer systems. Furthermore, carrier consolidation often leads to consolidation of infrastructures and system selection is frequently based on the ability to host all customers on a single system A solution is required that offers a number of significant benefits over today's solutions such as ability to address the high-value authorization space regardless of who owns it; improved integration with CRM systems; improved rating flexibility; improved adaptability for vertical markets; cost-effective continuous availability; simplified load-balancing and capacity planning; and multiple deployment options including the use of commodity hardware. A strategy for site-level disaster resilience is also required.

Authorization takes place before and during the event. Its purpose is to ensure that the paying party has sufficient credit to cover the cost of the event. Since the authorization must be completed before the transaction can proceed, latency is critical, as is the availability of the system. Authorization may involve a reservation element. An example of an authorization without reservation would be 'has the customer bought unlimited access to music downloads for this month', and authorization/reservation examples include credit card style authorization and requests such as 'confirm and reserve that the customer has the funds for a 100 MByte content download'.

It has often been said that once a wireless account can be used to pay for things other than communication services, it starts to look more like a debit card (pre-pay) or credit card (post-pay). There are a number of issues which would need to be addressed to make this vision a reality such as creating an infrastructure to allow the device to communicate with the merchant's terminal. An authorization model is desirable because it limits the credit exposure of the card issuer; guarantees payment to the merchant; and limits fraudulent use.

The best revenue management systems do a good job of being available when they are planned to be. There are various hardware and software fail-over techniques which improve the availability of the system. For example most billing systems are supported by a number of HA technologies including:

Cold database standby products such as Veritas Cluster Server.
Hot database standby as provided within Oracle 9i real application clusters.
Log shipping/delayed log application techniques to protect against database corruption.
Mirrored SAN or NFS attached storage with integral duplicated battery backed cache and controllers supported by replicated storage interconnect infrastructure.
Replicated application servers.
Reliable messaging technologies and/or application messaging that does not lose traffic (e.g. events).
Replicated network infrastructure.

Systems using such technologies typically achieve 99.9% availability and can approach 99.99% availability excluding planned maintenance. Availability of 99.99% equates to around 1 hour of unplanned downtime each year.

It should be noted, however, that the cost of providing this improved availability is significant given the large standby machines used to provide backup database support. The incremental software license costs are also very significant, and may be of the similar order to the hardware costs.

Where today's solutions fail to deliver the availability required is when patches or upgrades are taken into account. In a typical year, it may be assumed that one upgrade and a number of maintenance patches (say 10) to the system may occur. If we assume 1 hour of downtime for each patch and 8 hours for the upgrade, we have a total planned downtime of 18 hours. In practice, however, these figures may be very optimistic—upgrades requiring database schema updates to database centric billing systems can take 24 hours or more. When combined with the unplanned downtime, we have a combined availability of 99.8%, some way from the "five 9s" of networks which allows for 5 minutes of downtime per year. Capacity upgrades may introduce significant additional downtime. And, the cost for fail-over machines is expensive. Traditional approaches may increase the cost by factor of four to ten times for each 'nine' added to the availability figure.

Additionally most monolithic systems do not fail gracefully—in many critical failures the whole system is unavailable. Therefore the effective downtime as perceived by the business and the associated costs will be much higher for a system with an 'all-or-nothing' availability profile rather than a system that under failure may degrade gracefully making only some functions or part of the consumer base available.

Raw throughput is only one measure of capacity. Telecoms require a latency of less than 100 ms for pre-event authorization to ensure that call set-up can be completed in a timely fashion. While the best revenue management systems have now reached sub 200 ms for significant volumes, there is still work to do.

Network-based solutions have come from the pre-pay world and correspondingly have their strengths in pre- and mid-event authorization, rather than post-event accounting. They are strong on availability and latency, but weak on functionality. The functionality provided by network-based solutions is rudimentary when compared with that of a revenue management system. A network-based solution assumes that all services go through a single network (at least in the authorization path).

Hybrid solutions involve an integration of a revenue management system with a network-based solution. In some respects these solutions offer the best of both worlds, especially when the services are limited to telecom services. However, when higher value services are offered, the operator is exposed to increased credit risk or inability to offer service when the revenue management system is unavailable.

None of the existing solutions successfully meet all of the requirements of relationship-centric authorization. While incremental development could evolve prior art solutions to address their limitations, it will be a costly and time-consuming exercise. Furthermore, none of today's solutions deliver the anticipated functionality, availability and throughput for these applications.

SUMMARY OF THE INVENTION

A system for meeting the requirements of relationship-centric authorization is detailed herein. Features of the various embodiments of the system promote functionality, availability, and throughput for authorization processing by logically partitioning key servers and/or independently partitioning a balance associated with a group of consumers across the set of logical servers associated therewith, and/or independently logically partitioning the data storage (data storage may include but is not limited to merely relational databases). It should also be noted that the functionality of the system may be easily applied to more than just authorization processing but should also include pure transactions, usage based transactions, reservations, permission checking . . . virtually any application with a high volume of throughput and may be applied to a number of industries including, but not limited to telecommunications, transport, retail and banking.

A computerized authorization system comprises one or more computers in communication with one another that are programmed to ensure that the paying party has sufficient credit to cover the cost of the event. This may be particularly relevant to telecommunications events but may be used in an ASP model or for use of functionality at kiosks. Some non-limiting definitions of terms used in this document follow.

A computer readable medium includes the gamut from disks, CDs, memory, or any storage that a computer may be capable of assimilating. Computer executable instructions include programs, routines, modules, and scripts.

A router may be a device or, in some cases, software in a computer, that determines the next point (i.e., on a network) to which a unit of data (i.e., a packet) should be forwarded toward its destination. A router may be often included as part of a network switch, however a router may also have application specific functionality if it is unable to determine the destination of the request from the network address alone (unlike a conventional IP router appliance).

A consumer identifier comprises any type of identification (name, customer number, social security number, telephone number, credit card number, employer identification number, group ID, etc.) that may be encoded in a record or request for further processing (including routing where such router depends on the identity of the owner of the request).

A request may include authorization requests wherein a consumer may be requesting permission to use or perform a certain task (i.e., make a phone call, play a video game, access a file, utilize a machine such as a dorm washing machine with this functionality built into its interface, etc.). Often authorization will revolve around the credit-worthiness of the consumer, the amount of money available in a particular account, or a specific level of permission granted to that consumer. Requests may also include processing transactions and other customer service functions.

An authorization request may also involve a reservation element. A request may also comprise an event (which may be referred to as a termination event, accounting event, or charge capture in different industries) that may be a historical record of a transaction that may have incurred a charge and has to be recorded. Examples of such events would be phone calls, toll usage, downloads. Events do not have to be chargeable and may be recorded for informational purposes (e.g. 1-800 calls, 911 calls).

Hashing may include the transformation of a string of characters into a usually shorter fixed-length value or key that represents the original string. Hashing may be used to index and retrieve items in a database because it may be faster to find the item using the shorter hashed key than to find it using the original value. Other means for determining a mapping scheme for routing purposes may also be devised according to the ordinary skill of the art. In an example of its use, hashing may be undertaken from the distributor to determine the directory server. That is, the Distributor may receive event, extract consumer ID, hash to determine logical directory server, send the request to logical and therefore physical directory server. Directory server may reply to distributor with the logical consumer server (and some reference cache version information) the distributor then routes the request to the correct logical and therefore physical consumer server. The consumer server may then access logical wallet servers and databases/datastores using the logical data store that has been looked up corresponding to the consumer identifier.

Programming means include any computer techniques/tools/languages/methodologies that are available to those of skill in the art.

A plurality may be taken to mean two or more in a preferred embodiment, however, embodiments which describe a plurality may also be understood to function with only one of said component.

A server may be a computer program or even a thread that provides services to other computer programs in the same or other computers. The computer that a server program runs in may be also frequently referred to as a server (though it may contain a number of server and client programs).

A logical partition, as used in this application (not to be confused with traditional partitioning that first studied by IBM in 1976 and later introduced by Amdahl and then IBM wherein a partition is a logical division of a hard disk created so that you can have different operating systems on the same hard disk or to create the appearance of having separate hard drives for file management, multiple users, or other purposes) may be the division of any of a computer systems work, processes, and storage into multiple sets of resources so that each set of resources can be operated independently. Requests for a number of logical partitions may be processed by an application (with one or more child threads or processes, with a number of associated application caches) that may be responsible for undertaking the processing on behalf of a number of logical partitions where the logical partitioning per application can be changed at runtime. While it is anticipated that each logical partition may have a dedicated process, by allowing multiple logical processing partitions to be dynamically assigned to a process allows consolidation of the number of network, cache, and I/O resources needed to allow the system to be divided into a large number of logical partitions to give fine grained control of the system processing. Each partition can communicate with the other partitions as if the other partition may be in a separate machine.

Exemplary Embodiments

An embodiment comprises a computerized authorization system further comprising at least one server comprising at least one master wallet (master wallet server); and at least one shadow wallet. It should be noted that the functionality of the master wallet may be programmed into other components of the overall system. Greater efficiency may be achieved if the shadow wallets do not have to correspond in real-time with a back-end server or processor to obtain data needed to process the pending request. By creating a master wallet which comprises a resource that may be subdivided into one or more shadow wallets, each wallet will have everything it needs to process an authorization request—it may act as an island in real-time.

The master wallet comprises at least one usage allowance (resource) corresponding to a set of consumer identifiers. Usage allowance refers to either the amount of credit (prepaid; extended or otherwise) or the maximum debt for post-pay account that may be assigned to either a group of consumers or to a particular consumer. This has particular application to a corporate account comprising, for example, fifty (50) employees wherein the company may be granted a certain level of credit which may be subdivided amongst individuals or subgroups of the employees depending on the preference of the ultimate consumer (i.e., the entity responsible for paying the bill). Usage allowance may further comprise any unit of consumption including dollars, time, bytes, quality of service, messages, or some common non-currency unit etc.

The master wallet server may be programmed to create a shadow wallet corresponding to at least one of said set of consumer identifiers. The at least one shadow wallet may be programmed to comprise a portion of said usage allowance from said master wallet; and the shadow wallets are stored on said logical server corresponding to said consumer identifier associated with said shadow wallet.

In another embodiment, a computerized authorization system may further comprise a flag that may be set in said logical wallet to indicate whether an additional usage allowance may be permitted for distribution to said logical wallet. A flag may be a Boolean value or range of values which indicates whether and how much additional usage allowance may be requested for that particular logical wallet. This flag may be typically set when the master wallet and all other associated shadow wallets do not have any free resource to prevent the shadow wallet from repeatedly requesting additional resource from the master wallets when the resource may be exhausted.

In another embodiment, the master wallet server of the computerized authorization system may be programmed to redistribute said usage allowances allocated to each of said at least one shadow wallets upon a programmed trigger. A programmed trigger may include the unused portion of a loan on a shadow wallet dipping below a programmed threshold or zeroing out. Another trigger may include a warning when the monitoring the various usage allocations indicates that a certain level of imbalance exists amount the shadow wallets. Triggers may also be programmed to go off upon certain predetermined times.

In another embodiment, each shadow wallet may be programmed to request a loan from a second shadow wallet which will grant such request if a set of predetermined criteria are fulfilled. Because the individual shadow wallets may be consumed prior to a synchronization and redistribution by the master wallet server, loan requests provide a method to allow those shadow wallets to continue processing requests by "borrowing" the loan from another shadow wallet. Various predetermined criteria may need to be fulfilled including inquiries regarding continued credit-worthiness, history of borrowing, whether the wallet being borrowed from will need to borrow itself if it makes the loan, and more.

In another embodiment, a computerized processing system further comprises a set of computer executable instructions that are implemented to redistribute said subdivided resources across said logical servers according to a predefined formula after a request has been processed. Such a predefined formula may distribute usage allowances equally or may take into account the relative consumption of various wallets and intelligently allocate funds accordingly. Other schemes may also be implemented according to the factual scenario at hand.

In another embodiment, a computerized method for processing authorization requests comprises the steps of receiving an authorization request and hashing (or otherwise determining) a consumer identifier associated with said authorization request to determine a logical processing server preconfigured (preconfigured logical processing server) to process said authorization request based on said consumer identifier, sending said authorization request to said preconfigured logical processing server; determining a usage allowance associated with said preconfigured logical processing server; updating a master wallet comprising a master usage allowance that has been allocated to a plurality of said preconfigured logical processing servers after an event has been processed; and re-allocating said master usage allowance across said preconfigured logical processing servers according to a programmed formula. Hashing may include the transformation of a string of characters into a usually shorter fixed-length value or key that represents the original string. Hashing may be used to index and retrieve items in a database because it may be faster to find the item using the shorter hashed key than to find it using the original value. Other means for determining a mapping scheme for routing purposes may also be devised according to the ordinary skill of the art.

Journal files may be used while the system may be operational. The consumer servers may write journals of all of the processed transactions. The event manager may read these journal files and consolidate requests from multiple consumer servers, and sort the transactions to be written into a separate set of files to update the wallet servers and event stores. However most of the recovery modes do not require that one consumer server read the data from another consumer server. Rather, the shadow wallet mechanism allows a new consumer server to become operational alongside the failing consumer server with a 'new' set of shadow wallet allowance/resource. Wallets may also be pre-allocated to speed failover at the expense of additional hardware.

In various embodiments, the system may be described as having one or more wallets associated with it. A master wallet represents a centralized source for a resource. A shadow wallet represents a distributed segment of the centralized resource. This demonstrates its flexibility in scaling up or down to satisfy any number of customers/entities/etc. Also, a system may comprise consecutive wallets where more than one wallet exist in that one wallet may be destroyed/returned/parked/deleted as or prior to the creation of a second wallet. If two wallets exist then they do not have to exist at the same time—a wallet could exist in one server, that server fail and another take over with a new shadow wallet.

In an embodiment, there may be a master wallet and at least two shadows splitting the resource thereof. The term resource could be a credit (pre-pay cell phone) or a maximum allowable debt. The system may also allow reservations—effectively a loan from the master or shadow wallets to an external system. Reservations may comprise one made out of the shadow that we do not save if the corresponding Server fails—use for low value—reserve 10 min for a call, and high value reservations made out of the master wallet that are persisted (reserve a BMW). Requests may include authorization, reservation and usage processing. Shadow wallets may be created on a server which may be assigned to a particular group but other groups or even isolated foreign transactions may be processed on any given server.

In an embodiment, a computerized system for resource management may comprise a master wallet and at least two shadow wallets. The system may be programmed to process a request wherein said request includes a identifier. The master wallet may be associated with a group of identifiers (master group). The master wallet may be programmed to comprise a resource. The master wallet may be programmed to allocate a subset of said resource (loan) to each of said at least two shadow wallets. The subset may comprise any portion of the total resource (even overdrafts are possible in the system) from zero to a maximum allowable resource. Also, each subset need not be identical. That is, one wallet may receive a loan for five units and another wallet may receive a loan for fifty units. The system may be programmed to process said request against the loan residing on one of said shadow wallets.

In an embodiment, each of said shadow wallets may be associated with a subset of said master group (shadow wallet subset). The system may be programmed to determine which shadow wallet may be associated with said shadow wallet subset which includes said request's identifier (selected shadow wallet).

In an embodiment, the shadow wallet may update the master wallet as a loan may be used up. There are, at least, two different ways that loan may be represented as consumed. A loan value may be maintained that may be decremented, or a loan value and a used value may be maintained. The loan may be considered consumed when loan value equals used value.

In an embodiment, a computerized system for resource management may have its system programmed to notify said master wallet as said loan on said shadow wallet may be consumed.

In an embodiment, the system may be extremely elastic and robust. Due to the vagaries of hardware and other computer components, it cannot be guaranteed that the request will always end up on the correct machine so it may need to be processed elsewhere. Therefore, the system may create a shadow wallet on another server to process an alien request (meaning a request that may be routed to a server other than its designated server). It may also reconfigure the loans associated therewith in a proactive manner. The system may be programmed to create at least one additional shadow wallet. The system may be programmed to reallocate subsets of said resource from said master wallet across said shadow wallets including said at least one additional shadow wallet. In allocating resource across shadow wallets, the system may determine to allocate resource across all or some of the wallets depending upon its programming. It may intelligently decide to distribute resource according to the anticipated or demonstrated needs of various shadow wallets.

In an embodiment, loans may be reconfigured across all existing shadow wallets with no requirement to add a new shadow wallet to accomplish the reconfiguration.

In an embodiment, if a shadow wallet runs out of its loan, it may request a further disbursement. Any of said shadow wallets may request (requesting shadow wallet) an additional loan from said master wallet or from another shadow wallet (peer-to-peer). If the master wallet/other shadow wallet comprises any unclaimed resource (unclaimed resource may be simply a more specific subset of the resource, i.e., that which has not yet been consumed), then the system may be programmed to cause the master wallet to grant said additional loan to said requesting shadow wallet. The loan may be passed from a shadow wallet on one consumer server to a shadow wallet on another consumer server or via the wallet server. In an embodiment, if a shadow wallet runs out of its loan, it may request a further disbursement. Any of said shadow wallets may request (requesting shadow wallet) an additional loan from said master wallet or from another shadow wallet (peer-to-peer between the shadow wallets or via the master wallet.

The system may be configured to allow certain flags/Boolean values within a shadow wallet to be set regarding additional loans, i.e., whether such resource may be available. Here, available may mean truly available or available because a predetermined limit has not been reached.

In an embodiment, resource allocation may be set according to a use or lose schedule in which certain loans may have a validity period outside of which the loan may not be accessed. The resource in said master wallet may comprise a validity period which may be passed to said shadow wallets along with said loans. The system may be programmed to disregard any amounts, contained in a loan, that are outside of said validity period.

The master wallet may also reclaim loans from shadow wallets for a variety of reasons including reallocation or discontinuance of a product, etc. Thus, the system may be programmed to reclaim said loan from said shadow wallet and mark any unused portion thereof as available in said master wallet. In another embodiment, a shadow wallet could potentially fail and the master wallet may recollect the loan in a reactive manner. If any of said shadow wallets fail (failed shadow wallet), said system may be programmed to notify said master wallet. The system may be programmed to update said resource on said master wallet with any unused loan from said failed shadow wallet.

In an embodiment, the master wallet may take a more proactive stance toward disbursement of loans by monitor its shadow wallets and granting an additional loan from said master wallet to any of said shadow wallets when said shadow wallet's loan falls below a predetermined minimum where such minimum may be an absolute value, or based on a derived value such as a percentage or a usage rate. The system may be programmed to grant said additional loan only if said resource existing (existing resource) in said master wallet may be greater than or equal to said additional loan. In other embodiments, overdrafts may be possible if the system is designed in such a fashion. If said existing resource is less than said additional loan, said system may be programmed to obtain said additional loan from any of said at least one other shadow wallet.

There may be times when a shadow wallet will fail and the master wallet may not have an up-to-date picture of the remaining loan stored on such a failed shadow wallet. The system may take a multitude of approaches to this situation including a pessimistic and optimistic view. In the optimistic embodiment, the system may guess at the remaining loan present in the failed shadow wallet. If any of said shadow wallets fail (failed shadow wallet), said system may be programmed to create a replacement shadow wallet. The system may be programmed to allocate to said replacement shadow wallet a subset of said loan (loan subset) allocated to said failed shadow wallet. The system may be further programmed to allocate said loan subset if an unused portion of said failed shadow wallet's loan is unknown at failure.

In an embodiment, there may be only one shadow wallet in the system at a time. This setup may be used in a failure/recovery scenario. A computerized system for resource management may comprise a master wallet and at least one shadow wallet. The system may be programmed to process a request wherein said request includes an identifier. The master wallet may be associated with a group of identifiers (master group). The at least one shadow wallet may be associated with a subset of said master group. The master wallet may be programmed to comprise a resource. The master wallet may be programmed to allocate a subset of said resource (loan) to said at least one shadow wallet. The system may be programmed to determine which shadow wallet may be associated with a group of identifiers which include said identifier associated with said request (selected shadow wallet). The system may be programmed to process said request against said selected shadow wallet's loan. The master wallet may be updated as said loan may be consumed on said shadow wallet with a remaining loan amount. If said shadow wallet fails (failed shadow wallet), said master wallet creates a new shadow wallet and allocates said remaining loan amount to said new shadow wallet. The system may be reprogrammed to send any requests associated with said failed shadow wallet to said new shadow wallet.

The system may also configure a shadow wallet so that it knows that it is the only shadow wallet drawing from the master pot/wallet. The system may be programmed to send a message to said shadow wallet if said shadow wallet has exclusive access to said master wallet. A message may include setting a flag or pushing a value to the server hosting the shadow wallet to accomplish this function. In the latter mode, the server hosting the master wallet may push an invalid value to the shadow wallet thereby disabling some of its functionality. In an alternate embodiment, the master wallet server may push a consolidated value of the entire wallet to each shadow wallet which draws from the master so that the shadow servers may be aware of how much they may still draw from the master wallet without an overdraft contingency.

In an embodiment, if a shadow wallet fails, the system may be configured to let the master wallet grant a transient, overdraft loan to said new shadow wallet where a loan state of the failed shadow wallet is unknown.

In an embodiment, there may be a computerized system for resource management comprising a master wallet wherein said system may be programmed to process a request wherein said request includes an identifier. The master wallet may be associated with a group of identifiers (master group). The master wallet may comprise a resource corresponding to a product which further corresponds to one or more identifiers. Upon receiving a request, the master wallet may create a shadow wallet corresponding to at least said identifier associated with said request. The master wallet may be programmed to allocate a subset of said resource (loan) to said shadow wallet. The request may be processed against said loan in said shadow wallet.

In an embodiment, there may be a back-up system in place. This tactic may speed up failover support. The wallet server/system may create a wallet on one server and it may create a second wallet on a standby server with part of the loan. On failure of the first server the standby server has a shadow wallet with some loan ready to go. This is not a simple mirror of the first shadow wallet—indeed, the amount of loan allocated to each may be different and each loan does deplete the resource existing in the master wallet. Here, a computerized system for resource management may comprise a master wallet and at least two shadow wallets (a first shadow wallet and a second shadow wallet). The master wallet may be programmed to comprise a resource. The master wallet may be programmed to allocate a subset of said resource (loan) to each of said at least two shadow wallets. The system may be programmed to process said request against the loan residing on said first shadow wallet. If the first shadow wallet fails, the system may be programmed to reroute said request to said second shadow wallet.

In an embodiment, a computerized system for resource management may comprise a master wallet and at least one shadow wallet. The system may be programmed to process a request wherein said request includes an identifier. The master wallet may be associated with a group of identifiers (master group). The master wallet may be programmed to comprise a resource. The master wallet may be programmed to allocate a subset of said resource (loan) to said at least one shadow wallet. The system may be programmed to process said request against the loan residing on said at least one shadow wallet.

BRIEF DESCRIPTION OF THE DRAWINGS

The accompanying drawings incorporated in and forming part of the specification illustrate several aspects of the present invention.

FIG. 9 illustrates one representative embodiment of the system.

For the purpose of promoting an understanding of the principles of the invention, reference will now be made in detail to the present preferred embodiment to the invention, examples of which are illustrated in the accompanying drawings and specific language will be used to describe the same. It will nevertheless be understood that no limitation of the scope of the invention is thereby intended toward such alterations and further modifications in the illustrated device and such further applications of the principles of the invention as illustrated therein as would normally occur to one skilled in the art to which the invention relates.

DETAILED DESCRIPTION OF SEVERAL
EMBODIMENTS OF THE INVENTION

The system (900) (computerized system) employing the method may be implemented over a variety of computer systems, using a variety of computer readable mediums (including, but not limited to, hardware, software, firmware) which contain computer executable instructions (routines, programming, modules, coding, etc.), and over a variety of networked arrangements (comprising one or more computer systems in communication with one another) including but not limited to the Internet. The computer systems may comprise end devices and servers. Servers may be considered as a computer program that provides services to other computer programs in the same or other computers. It may also be the computer that a server program runs in (though it may contain a number of server and client programs). In the client/server programming model, a server may be a program that awaits and fulfills requests from client programs in the same or other computers. A given application in a computer may function as a client with requests for services from other programs and also as a server of requests from other programs.

Various security measures may be employed to protect the integrity of the files transferred. The term modules, as used in this application, may be directed toward a discrete set of programming instructions, a routine, a program or a set of programs. Modules defined by this invention may be combined or further delineated as necessary to achieve optimum performance. For ease of reading, entities in the system (900) may be referred to in the singular or plural; it may be to be understood, however, that such entities may exist in the singular and/or plural within the system (900).

The embodiments presented here offer a relationship-centric system which may be applied to various customer service applications. It facilitates the distribution of rights across the individual users within a single entity to achieve optimal throughput and availability through the use of logical partitioning and mapping to physical resources. Embodiments of the current invention may be designed to support authorization for telecommunications, digital rights management, banking/credit card, and equivalent markets.

Walkthrough

Figure 9:
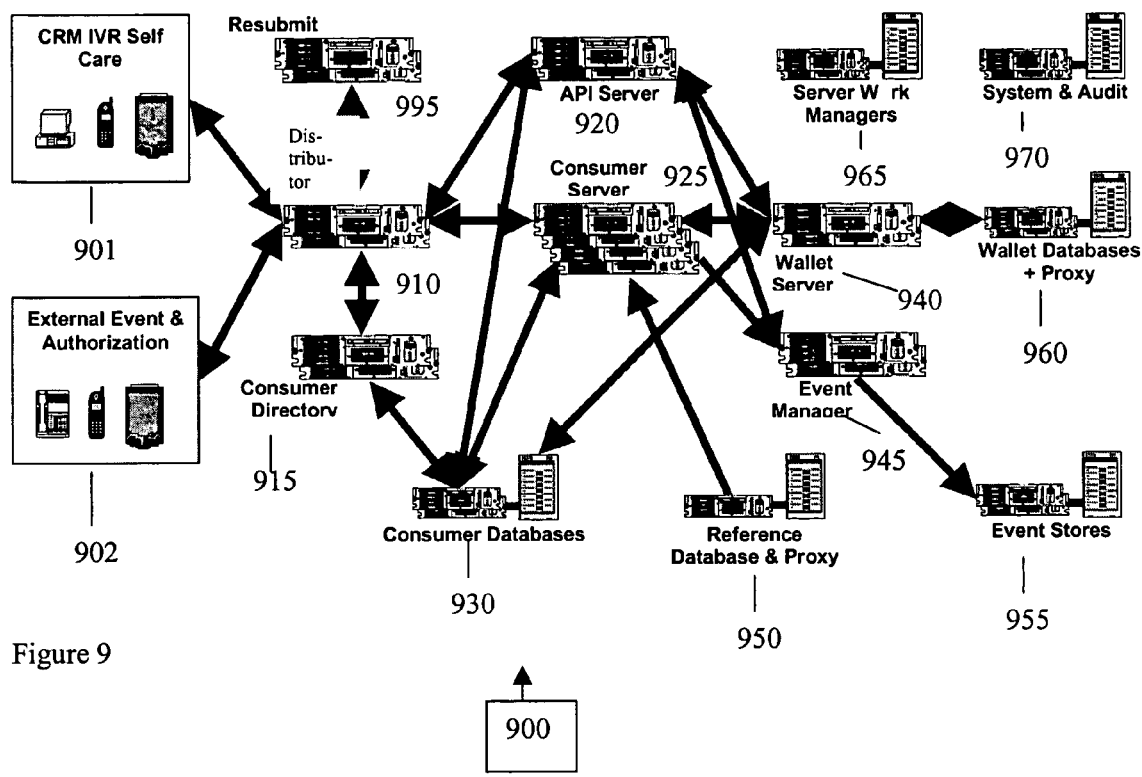
FIG. 9 comprises a representative diagram of one embodiment of the system. In the drawings.

Referring to FIG. 9, the elements of one embodiment of the architecture may shown. These may include the following or a subset thereof: Distributor (910); Consumer Directory (915); Consumer Server (925); Reference Database/Proxy (950); Wallet Server (940); Wallet Database/Proxy (960); Reference Database/Proxy (950); Event Manager (945); Event Store (955); System and Audit Database (970); API Server (920); Resubmitter (995); Server Work Managers (965). This exemplary architecture will demonstrate the variety of inventive concepts embodied in the invention.

Referring to FIGS. 9 and 17-32, consider the path of a Request received from the external network (902).

Network Requests (e.g. authorizations, events, e-commerce transactions) (902) may be received by the Distributor (910) and the Distributor (910) may journal requests for revenue assurance and SLA (service level agreement) control.

Figure 17:
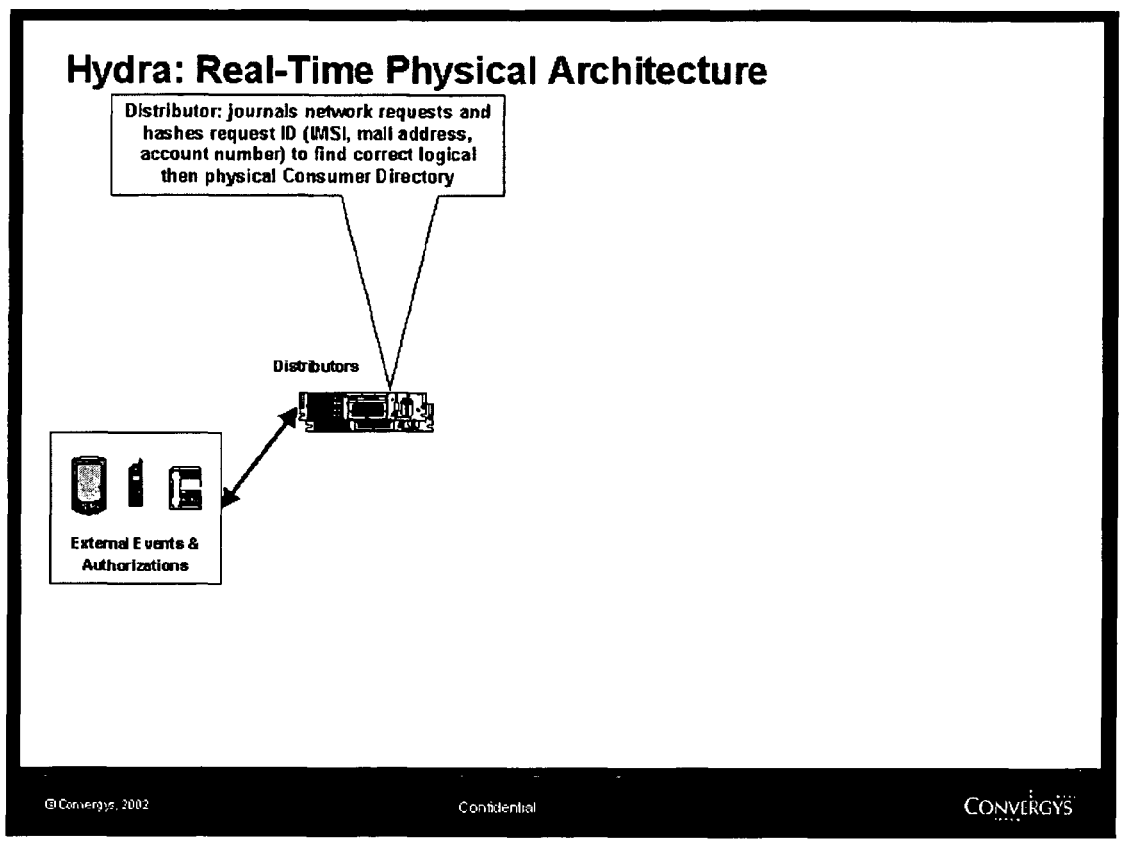
FIGS. 17-33 diagram a process flow of the embodiment of the system displayed in FIG. 9.

Referring to FIG. 17, the Distributor (910) extracts a value—the external consumer identifier (IMSI, mail address, account number) from the Request and, using directory information from the Consumer Directories (915), passes requests to the correct logical Consumer Server (925). The value may be hashed to find the correct logical Consumer Directory. The logical to physical server mapping information for the Consumer Directory held in the Distributor may be then used to route the request to the correct physical Consumer Directory (925), and FIG. 7 (720).

Figure 18:
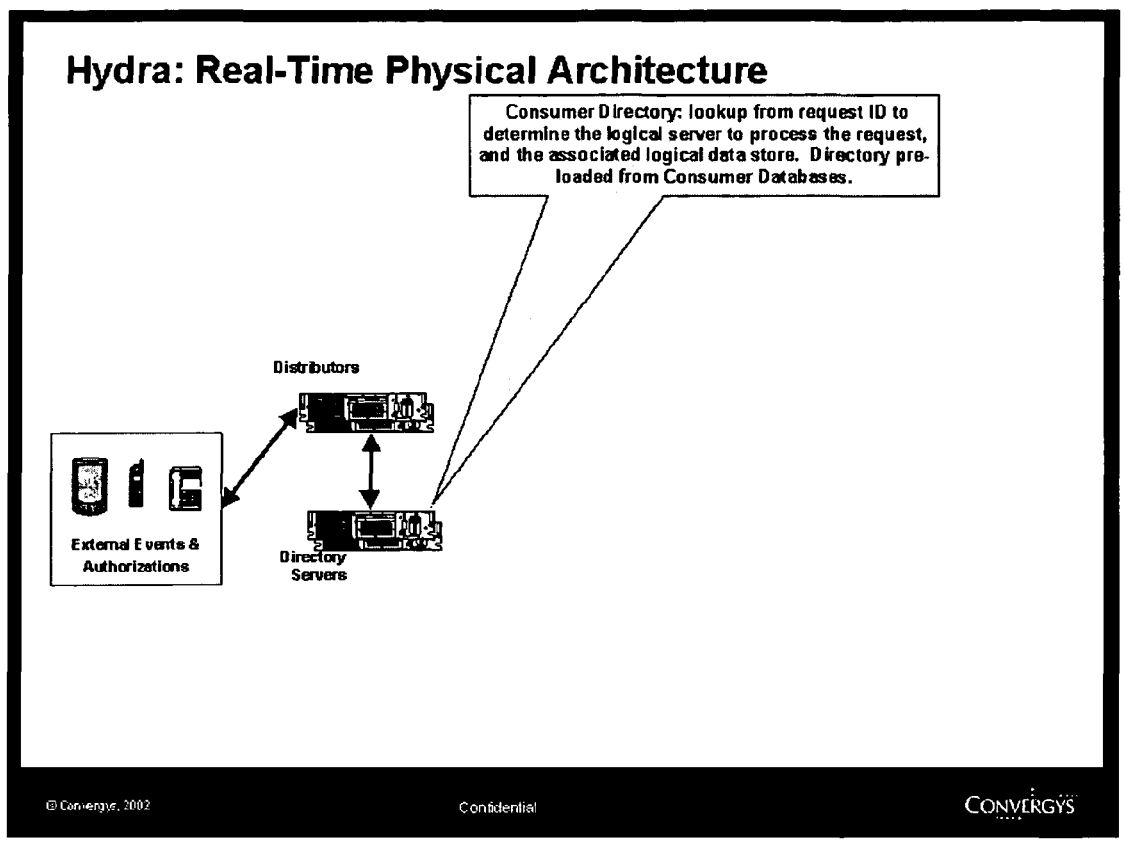
Figure 19:
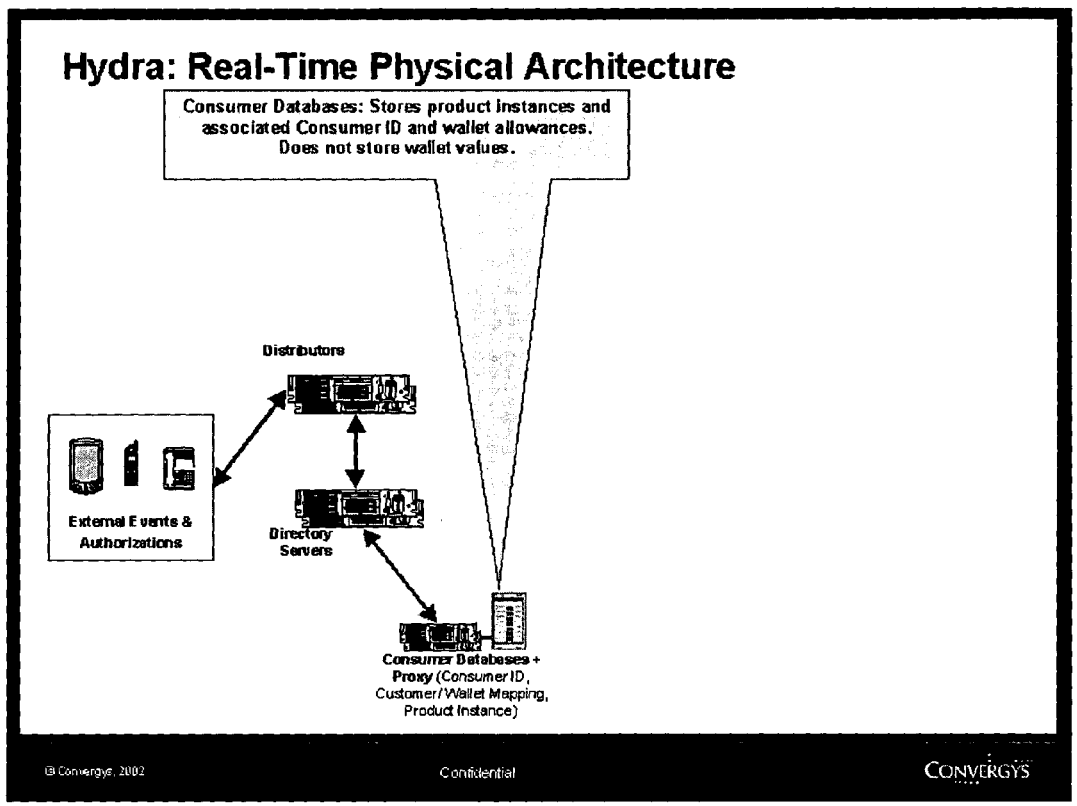
Figure 20:
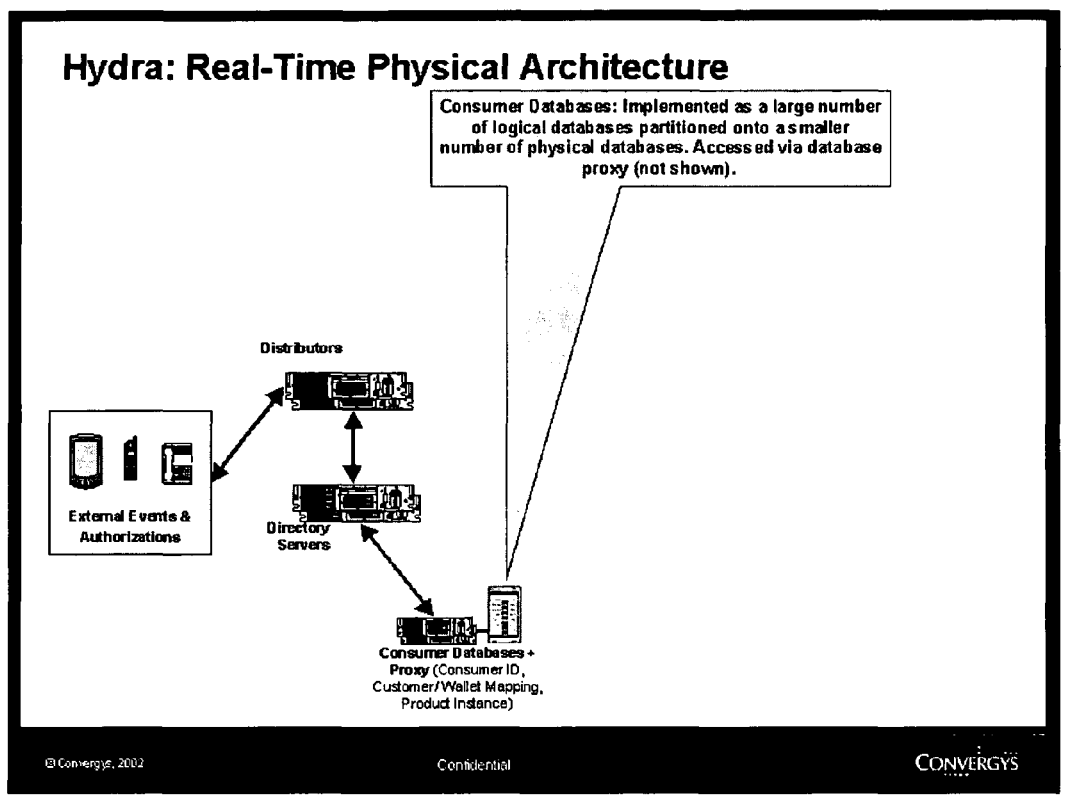

Referring to FIG. 18, the Consumer Directory (925) may perform a directory lookup using the external key value (external consumer identifier) to determine the identity of the logical Consumer server (LCS) to process the request and identify the associated logical data store (LDS) that contains data associated with the consumer identifier. Additionally the directory server will provide a translation of external consumer identifier to internal consumer identifier. The internal consumer identifier is fixed, but the external consumer identifier can vary to allow for telecom features such as number portability. Additionally, the directory server may provide a version number for dependent data within the Consumer Databases [the LDC and LDS and version number for dependent data being added to the request passed to downstream servers]. These directories may be preloaded from the Consumer Database (930) to facilitate faster processing. Referring to FIG. 19, the Consumer Database (930) stores product instances and associated consumer identifiers as well as "wallet allowances" (see, infra). "Wallet values," however, may be stored elsewhere (see, infra). The Consumer Database (930) also stores the consumer/wallet mapping. Referring to FIG. 20, the Consumer Database (930) may be implemented as a large number of logical databases partitioned onto a smaller number of physical databases. These may be accessed via a database proxy which may be integrated into the calling server.

Figure 21:
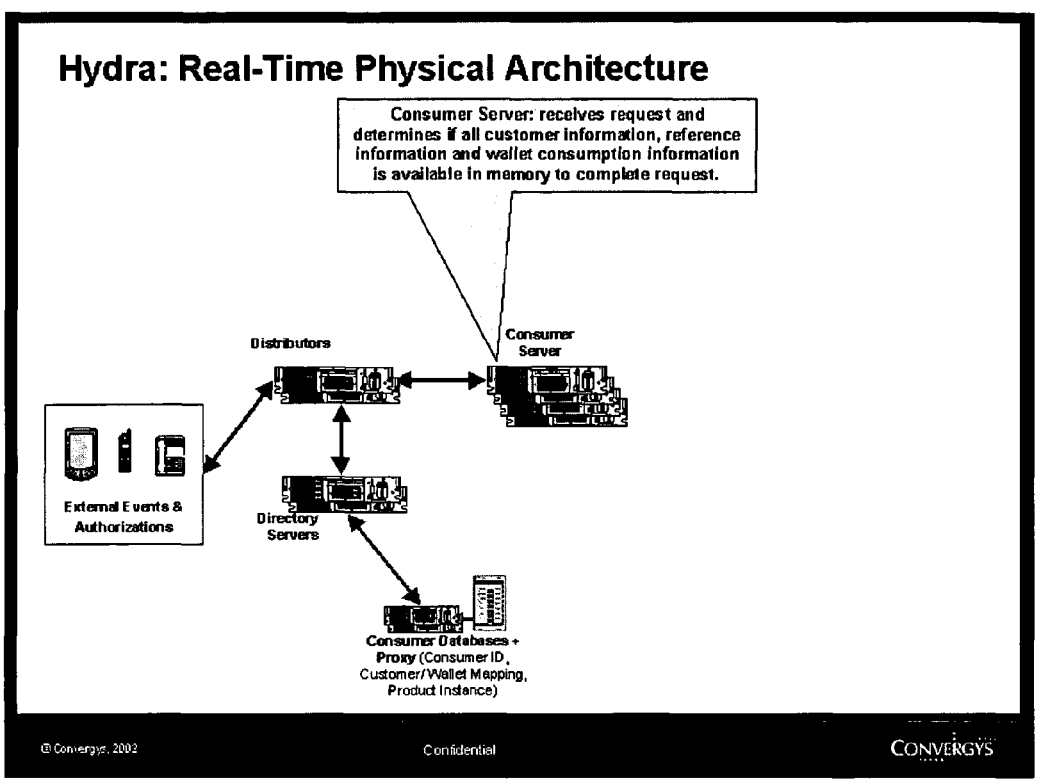
Figure 22:
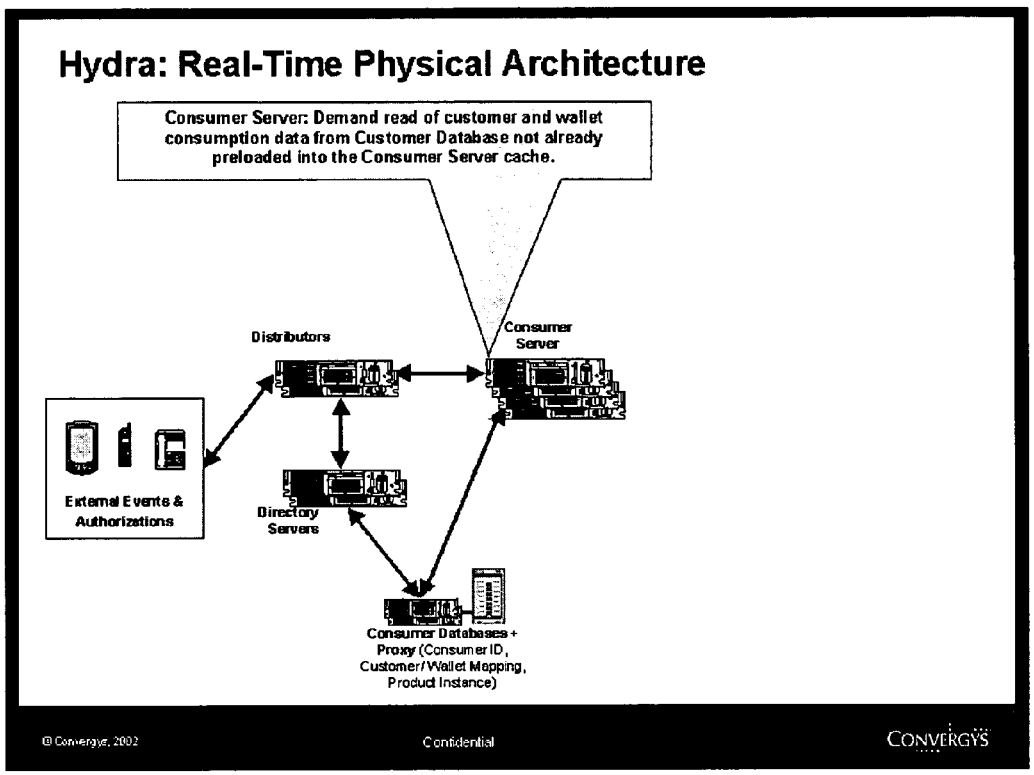

The logical Consumer Server (925) can process the Request undertaking both generic and network/market specific plug-in processing. Referring to FIG. 21, the Consumer Servers (925) are organized such that Requests are routed to specific Consumer Servers (925) such that all of the reference data, consumer data, and sufficient resource data (a.k.a., wallet consumption) may be normally pre-loaded memory within the Consumer Server (925) to complete the Request. Referring to FIG. 22, to support this operation the Consumer Server (925) will both pre-load and demand-load information from the Reference Database (950) and Consumer Databases (930) that is not already preloaded into the Consumer Server cache (925). This preloading may be either directly from the database or, for speed, from some indexed flat file extracts from the database. The Consumer server will use the version number for dependent data recovered from the Directory Server to determine if it has the latest version of the customer data. If the latest version is not present then it may be loaded from the flat file database extract. If this version is not recent enough, it may be loaded from the Consumer Database [therefore when consumer data may be updated it is first written to the Consumer Database with an updated version number and the Directory servers are then updated so that subsequent requests will be tagged with this updated version number allowing the Consumer Server to detect it has the latest copy of the data]. While the Consumer server could always go to the database for the updated customer data the extracts are searched first as this minimizes the database load. These extracts allow Consumer Servers to be quickly loaded through file sequential reads and are periodically refreshed from the database (either by replacing the extract file, or by appending updated data to the end of the extract file).

Figure 23:
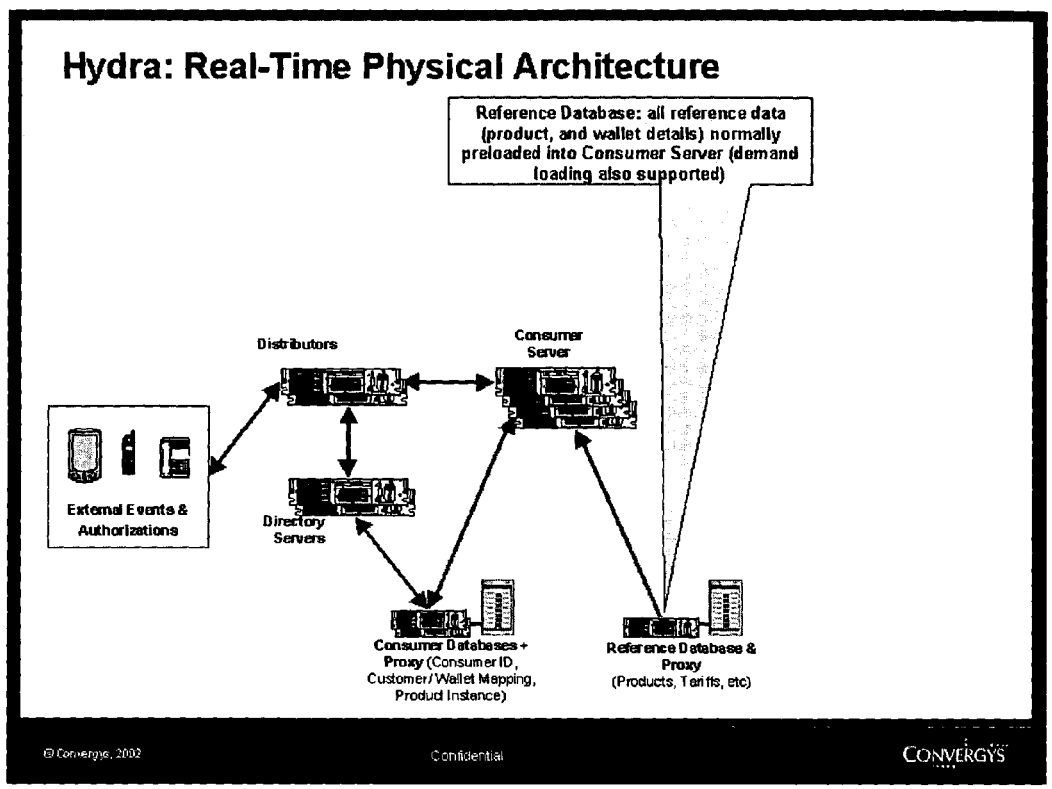

Referring to FIG. 23, the Consumer Server (925) may also communicate with the Reference Database/Proxy (950) which stores products, tariffs, wallet details, etc. This reference data may be normally preloaded into the Consumer Server (925); however, demand loading may be also supported.

Figure 24:
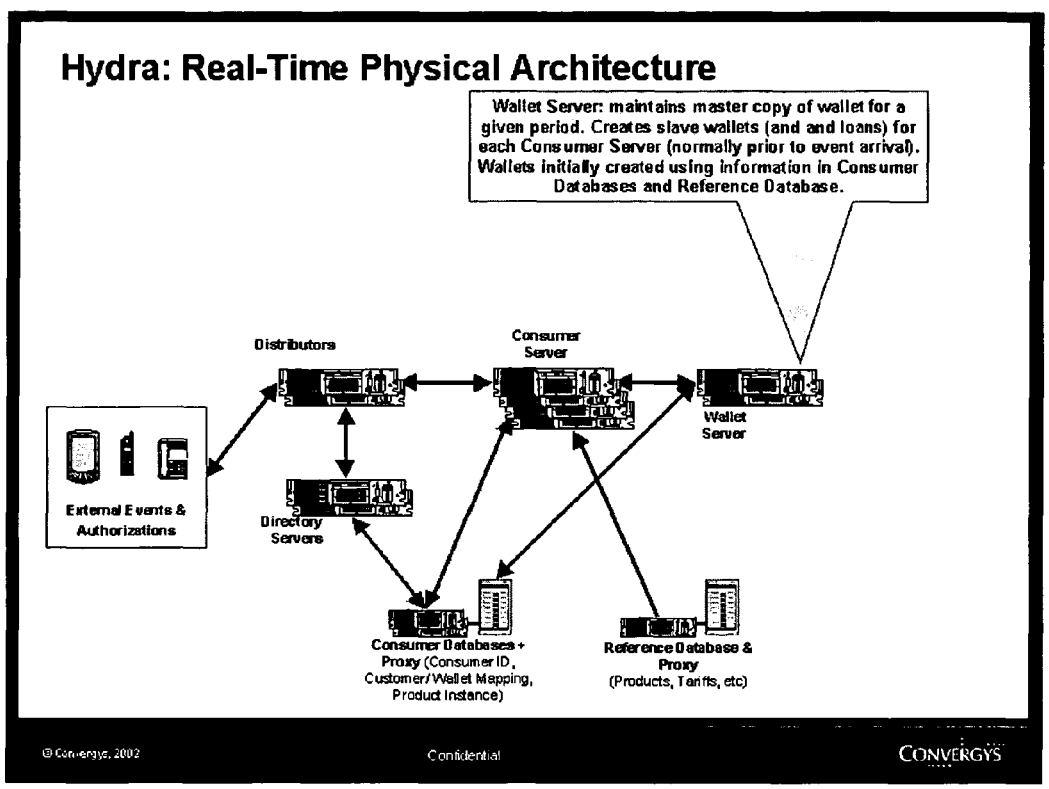

Referring to FIG. 24, the Wallet Server (940) maintains a master copy of a wallet for a given period. The Wallet Server (940) also creates "shadow" wallets (and/or loans) for each Consumer Server (925). This may be preferably accomplished prior to arrival of an Event/Request but may occur anytime during the cycle. Wallets are initially created on the Wallet Server (940) using information in Consumer Databases and Reference Database.

Within the Consumer Server, a wallet may only have a charge registered against it if it has a resource/loan greater than or equal to the charge. If the Consumer Server (925) determines that it does not have the necessary resource/loan to complete a Request then, based on assigned wallets determined from the Consumer Databases (930), the Consumer Server may communicate with the Wallet Server (940) to obtain additional 'loans' of Wallets containing usage resource. If the Wallet Server has sufficient resource to satisfy this increased request, this resource may be returned directly, otherwise free resource may be recovered from any other Consumer Servers with a sister shadow wallet in a peer-to-peer embodiment.

Figure 25:
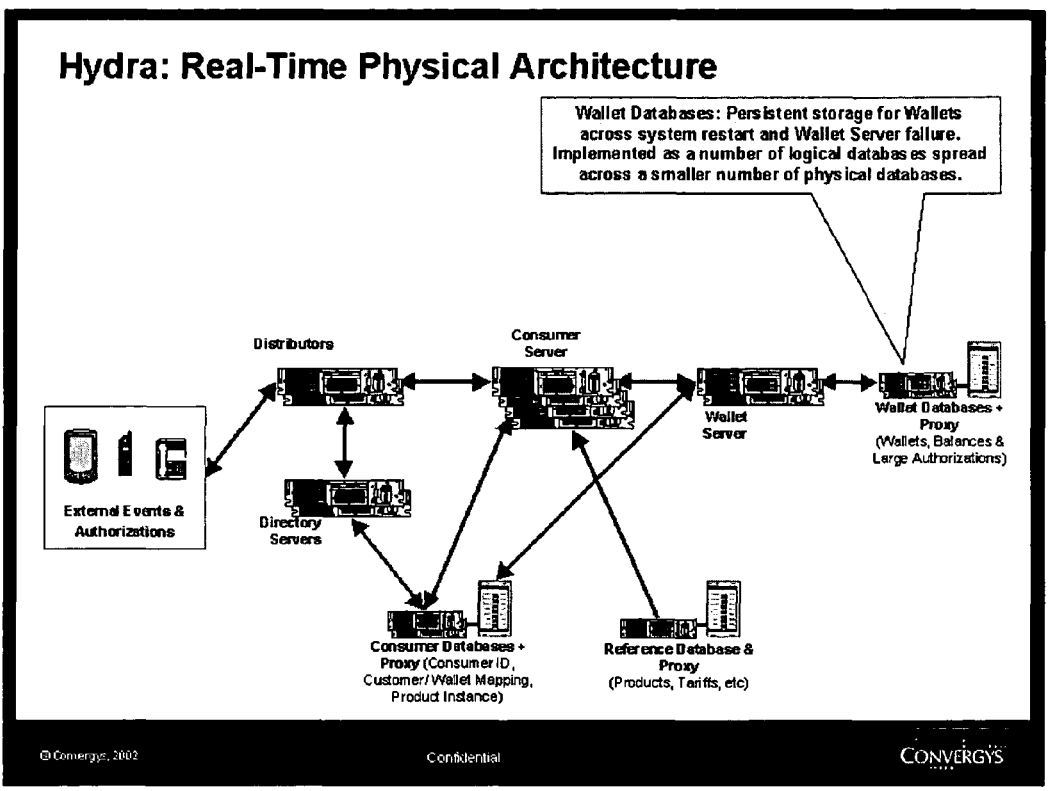

Referring to FIG. 25, the Wallet Server (940) may interact with a Wallet Database/Proxy (960). The Wallet Database/Proxy (960) may serve as persistent storage for Wallets across system restart and Wallet Server (940) failure. They (960) may be implemented as a number of logical databases spread across a smaller number of physical databases.

Figure 26:
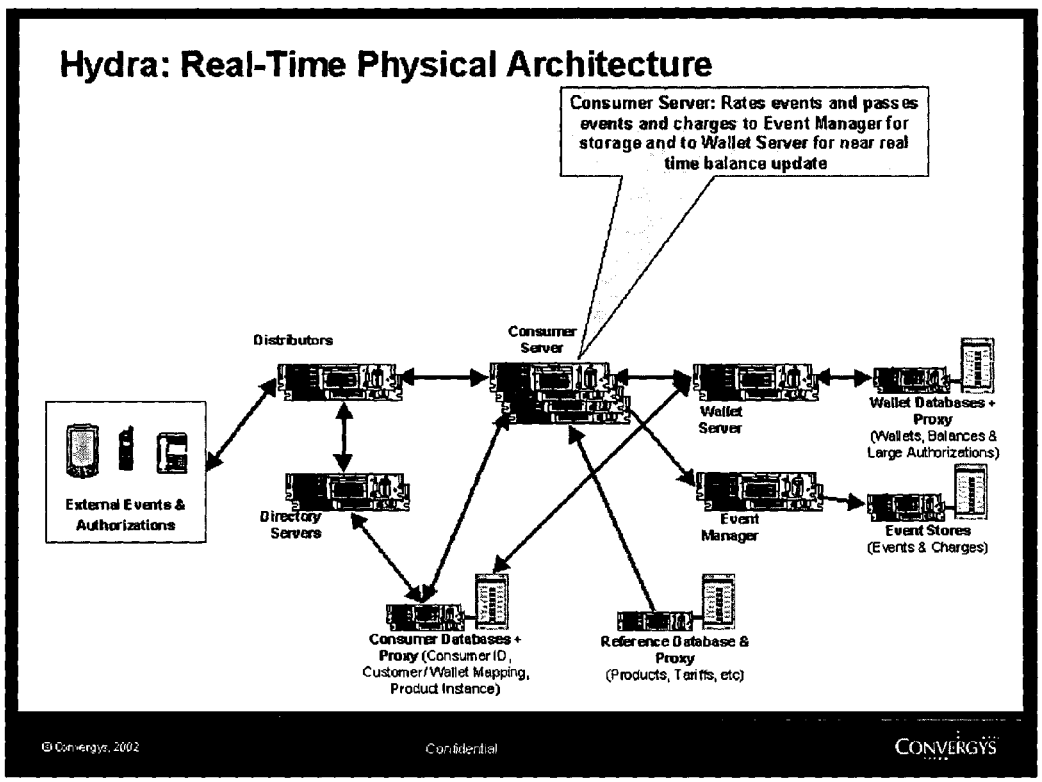
Figure 27:
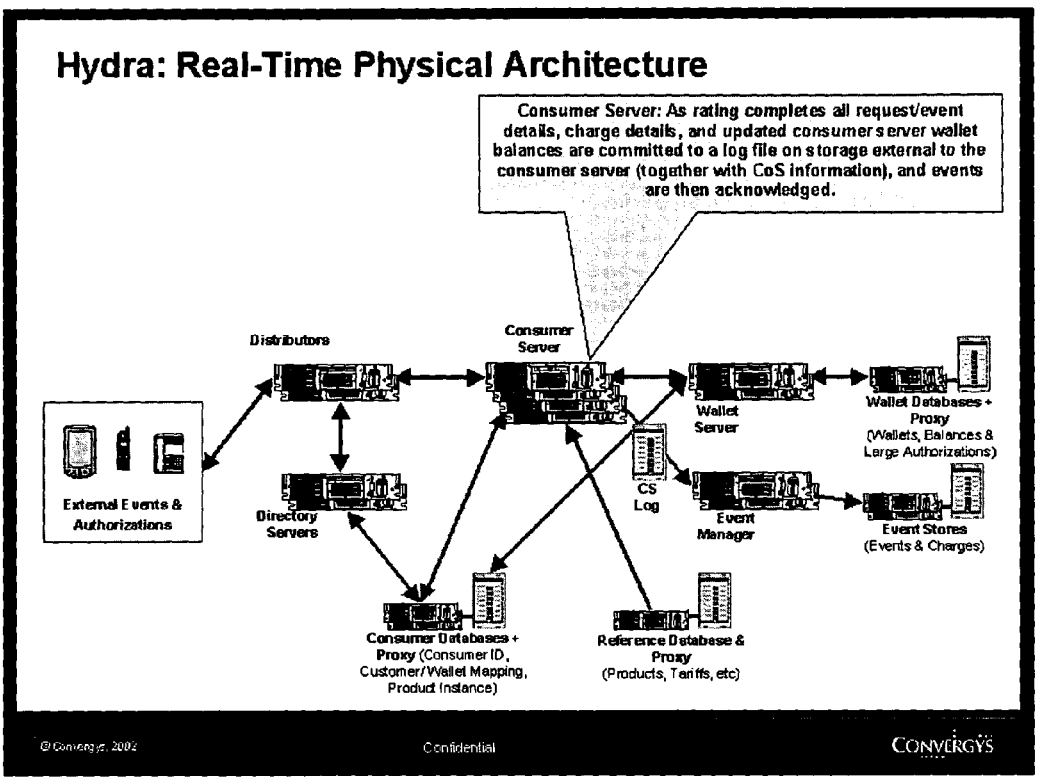
Figure 28:
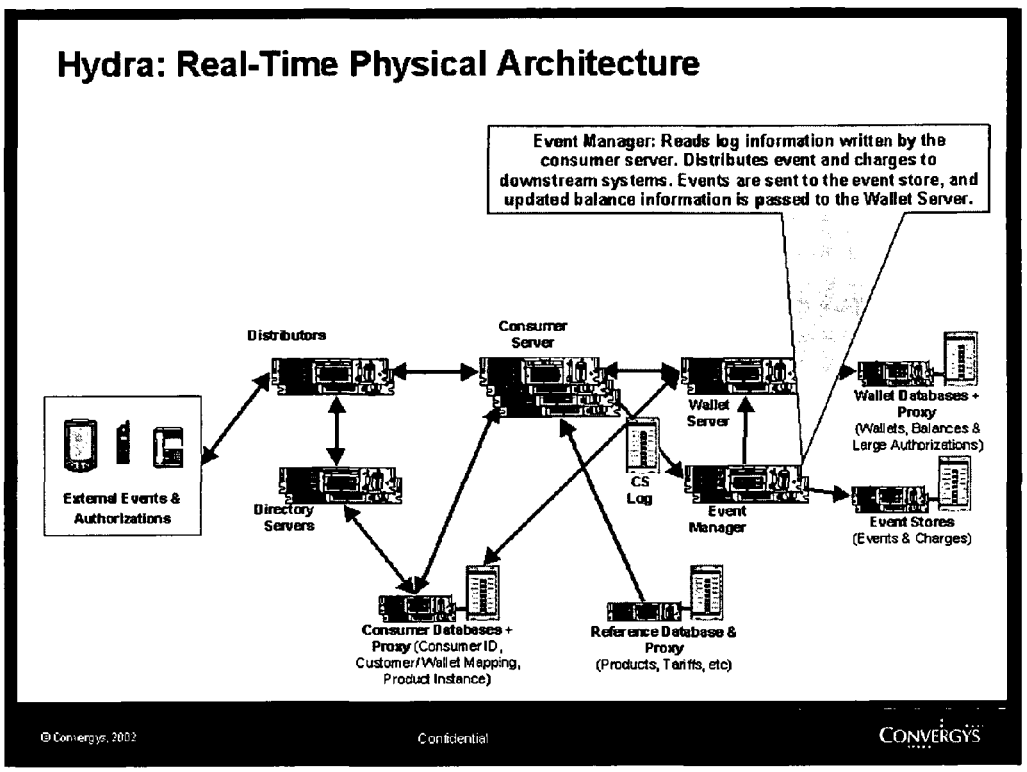

Referring to FIGS. 26-28, when Requests are processed/rated/authorized, any usage details, charges and additional network or market information are journalized by the Consumer Server (925). The Event Manager (945) may read the journal files from multiple Consumer Servers and consolidate the results and write multiple output files for each of the Event Stores (955). The Wallet Server (940) may be updated in "near real time." The journalizing of the event details, event charges, etc. (including the changes made to logical wallets and current wallet values) may assist failure recovery, and may be a centralized point that information may be archived or passed offsite for disaster recovery. The journal write by the Consumer Server may be considered a commit point, i.e., the updated state of the consumer server for that event may be written to an external persistent store, before requests are acknowledged to the Distributor (910). The Event Manager (945) may filter the information from the Consumer Server (925) determining the information that may be passed to the Event Store (955), Wallet Server and to external systems. The Event Manager (945) may then update the balance information in the Wallet Server (940). The communication between the Consumer Server, Event Manager and Event store may be file based using overlapping writes and reads to allow the Event Manager to start reading a log file before the Consumer Server has closed the file.

To facilitate fast recovery of a failed Consumer Server (925) (or, in an alternative scenario, during repartitioning of the logical Consumer Server (925)), the Wallet Server (940) may maintain historical information allowing it to identify frequently accessed wallets. This information may be used to allow the Wallet Server (940) to proactively load new, frequently-accessed wallets into a Consumer Server (925), or to allow the Wallet Server to push a set of wallets into a standby Consumer Server in anticipation of a failure.

Figure 29:
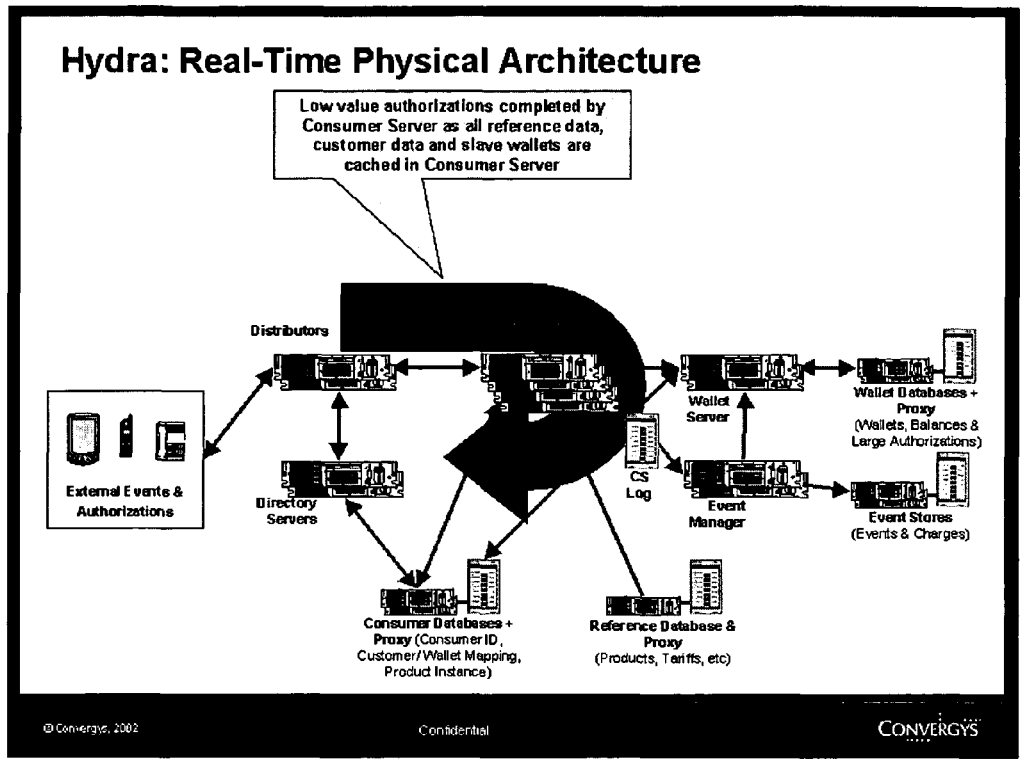

Referring to FIG. 29, low value authorizations completed by the Consumer Server (925), including all reference data, consumer data, and Shadow wallets, may be cached in the Consumer Server (925).

Figure 30:
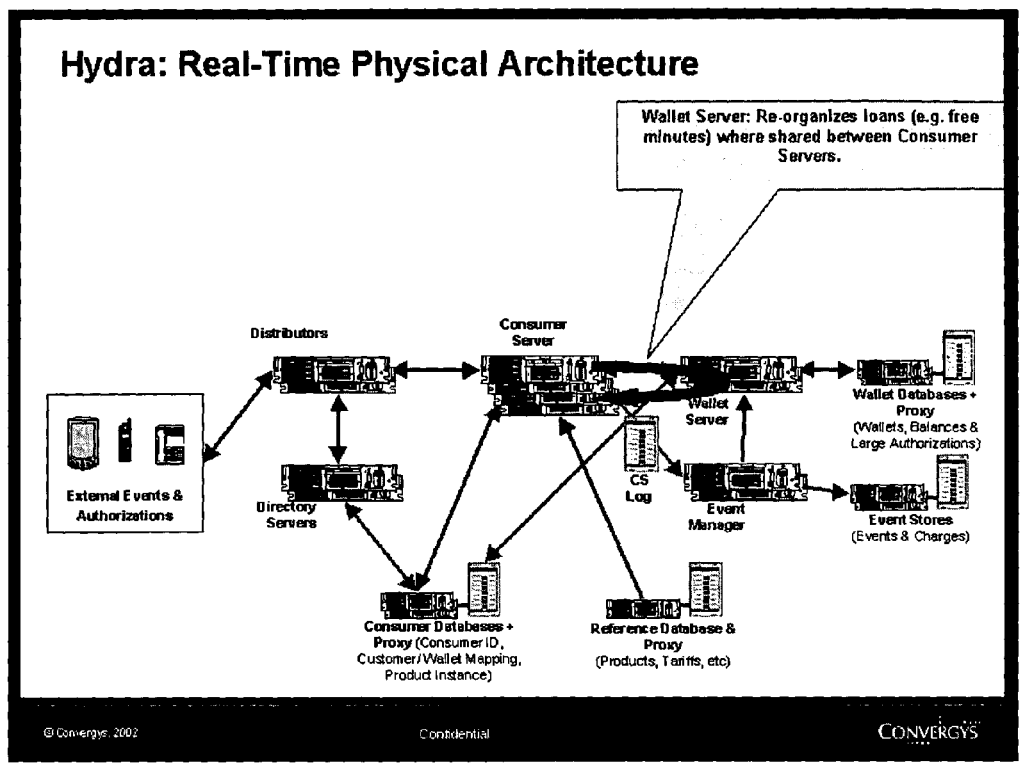

Referring to FIG. 30, preferably, the Wallet Server (940) will proactively manage the sharing of any Wallet usage allowances across multiple Consumer Servers (925) for complex account structures (i.e., corporate accounts) by reorganizing loans (i.e., including free minutes) shared between Consumer Servers (925). The logical server and database allocation algorithms in the system (900) consider wallet consumption patterns and in most cases do not require distribution of a wallet resource across multiple Consumer Servers (925). To manage the consumption of the last remaining part of a Wallet shared across Consumer Servers (925), the Wallet Server (940) may be in the request-processing path. This will happen for a very small percentage of requests. For example, the last few requests which exhaust a wallet shared across thousands of consumers may result in the Wallet Server only handing out sufficient resource to satisfy each request.

Figure 31:
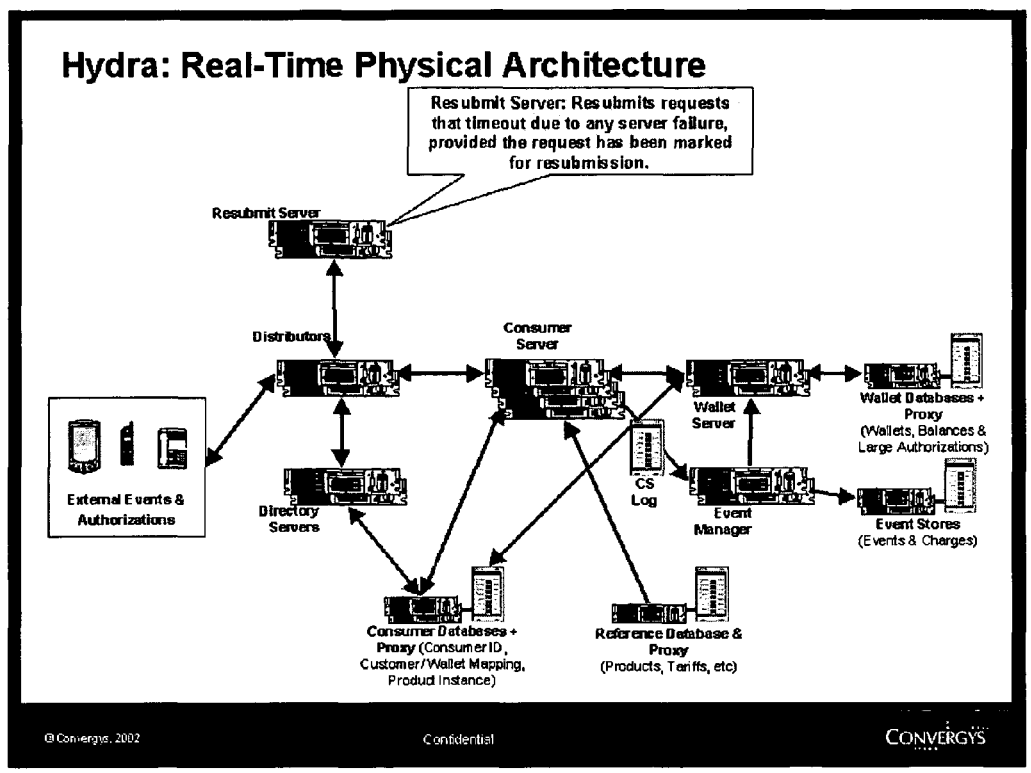

Referring to FIG. 31, the Distributor may receive a response from the Consumer Server for every request processed. This response may comprise a reply to be sent back to the network, including internal control information to allow the Distributor to determine if the request succeeded, or failed, and may need to be resubmitted. The Resubmit Server (995) (a.k.a. the Resubmitter) may resubmit Requests that timeout due to any server failure so long as the Request has been marked for resubmission. The Distributor will locally generate failure replies to the network if the Consumer Server does not respond within a timeout. The Distributor can therefore pro-actively revenue assure every request, and police latency SLA requests.

Figure 32:
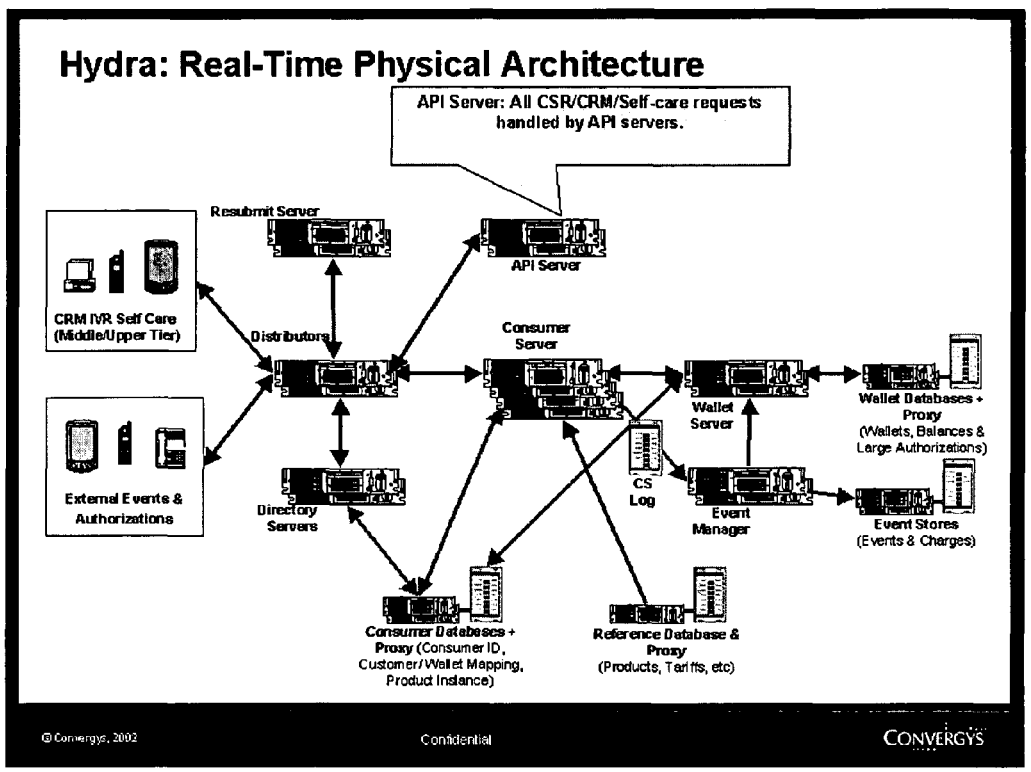
Figure 33:
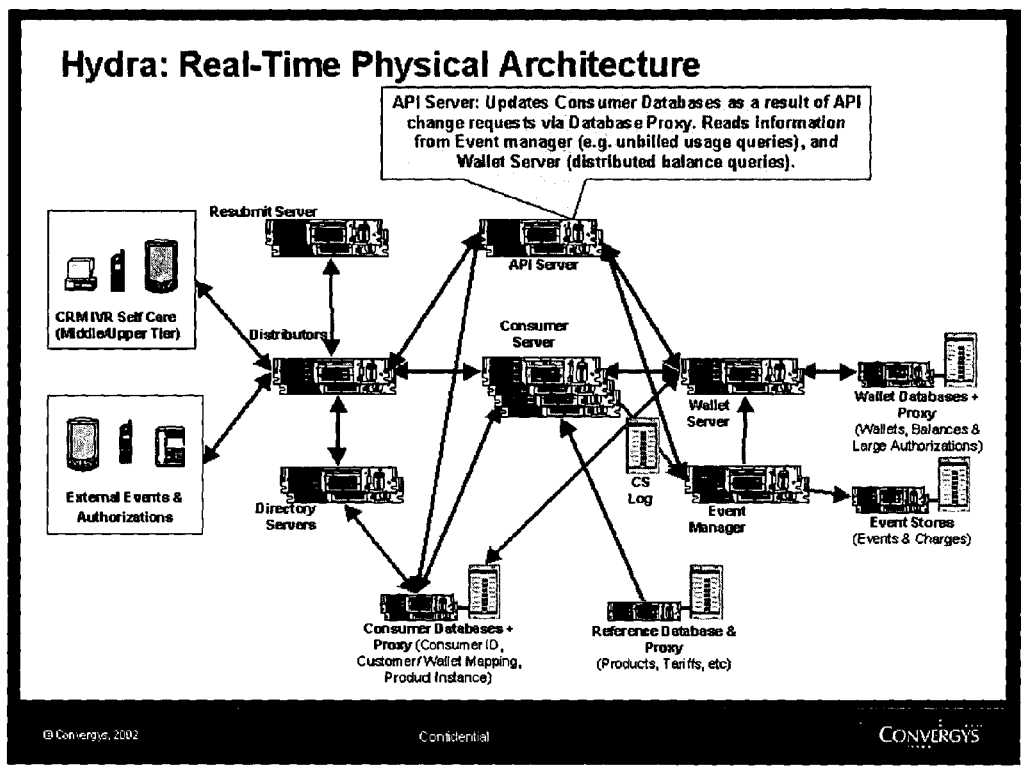

Referring to FIGS. 32-33, note that API Requests received from external systems such as CRM (901) follow a similar path, entering the system (900) at the Distributor (910) via an API Server (920). The API Server (920) may also update the Consumer Databases (930) as a result of API change Requests via a database proxy. The API Server (920) may read information from the Event Store (945) (i.e., unbilled usage queries) and the Wallet Server (940) (i.e., distributed resource queries). The API server may be alternately deployed where requests are not routed through the distributor.

Figure 34:
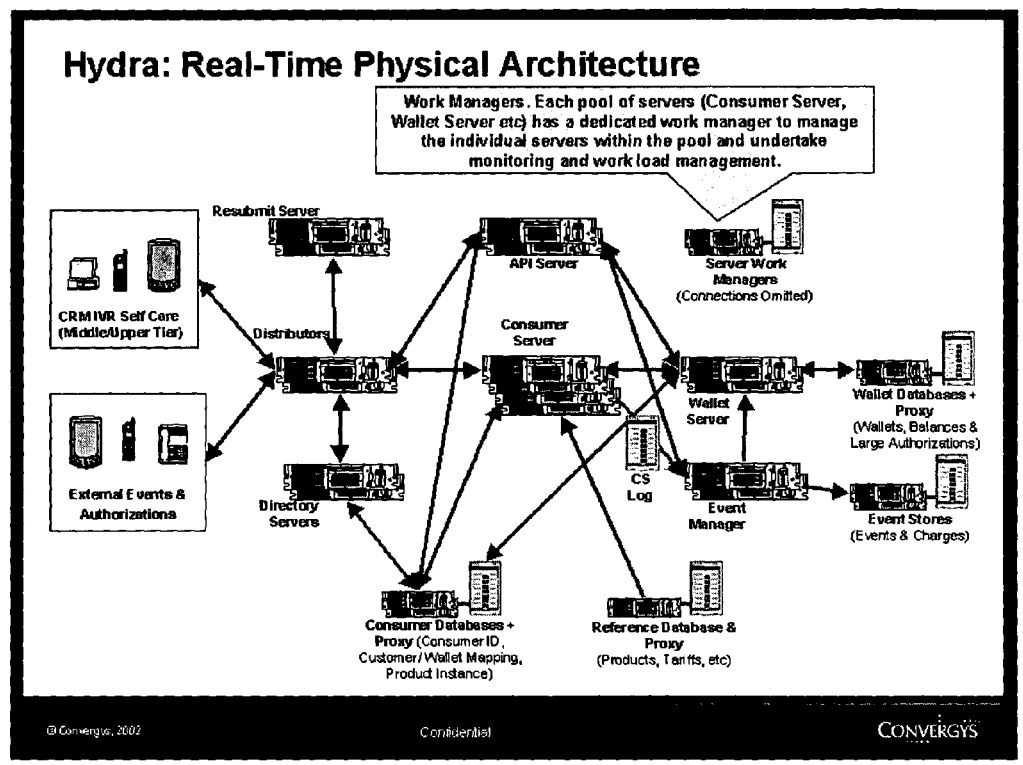
FIG. 34 illustrates the Work Managers. Each pool of servers (Consumer Server, Wallet Server, etc.,) has a dedicated work manager to manage the individual servers within the pool and undertake monitoring and work load management.

Referring to FIG. 34, Server Work Managers (965) are represented. Logically a dedicated Server Work Manager (965) exists for each pool of servers (Consumer Server—925, Wallet Server—940, etc, though these control functions are typically collapsed into a smaller number of processes backed by a persistent data store. These entities (965) manage the individual servers within their pool and undertake monitoring and workload management.

Figure 35:
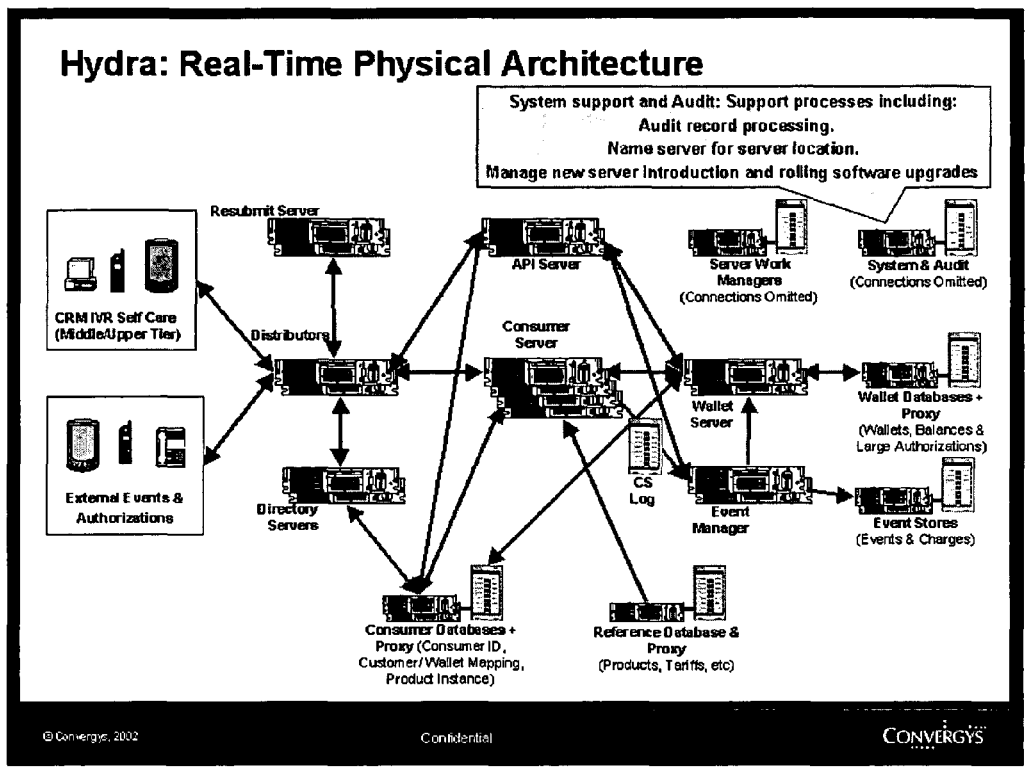
FIG. 35 illustrates the system support and audit. Support processes including audit record processing. Name server for server location, and manage new server introduction and rolling software upgrades.
Figure 36:
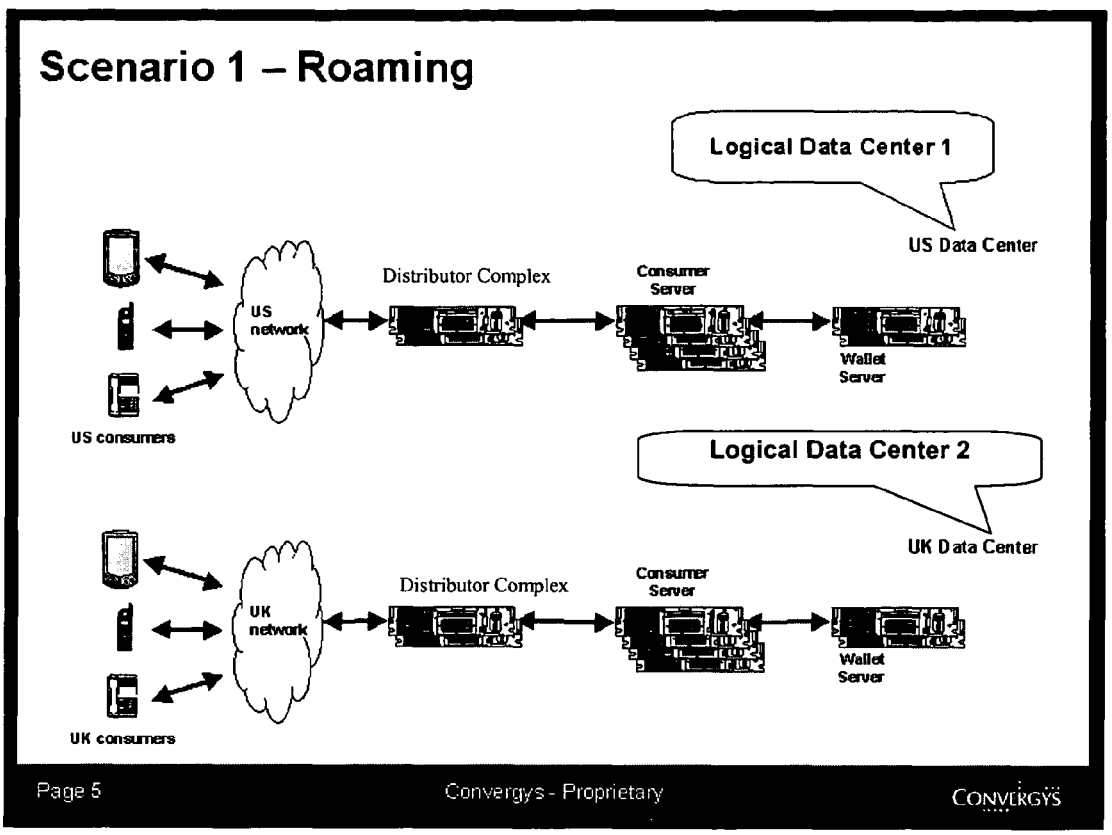
FIGS. 36-39 diagram the relationship between two logical data centers in a roaming environment.
Figure 37:
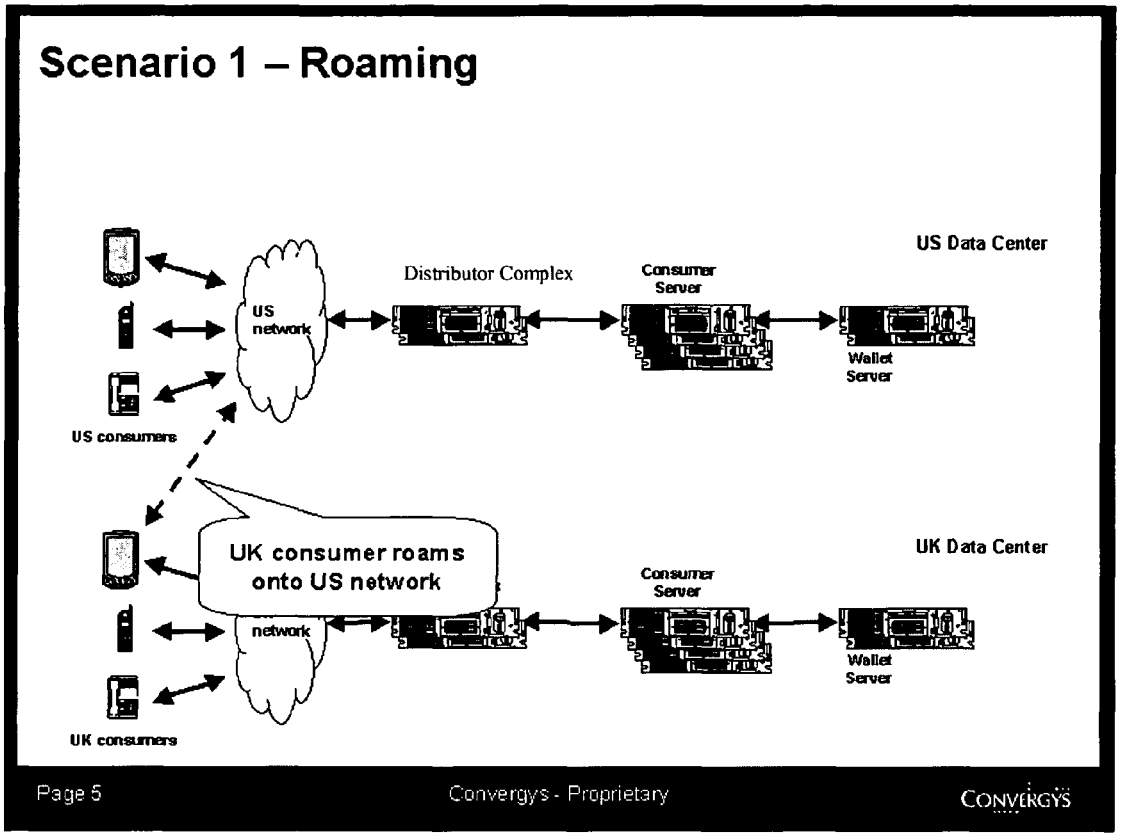
Figure 38:
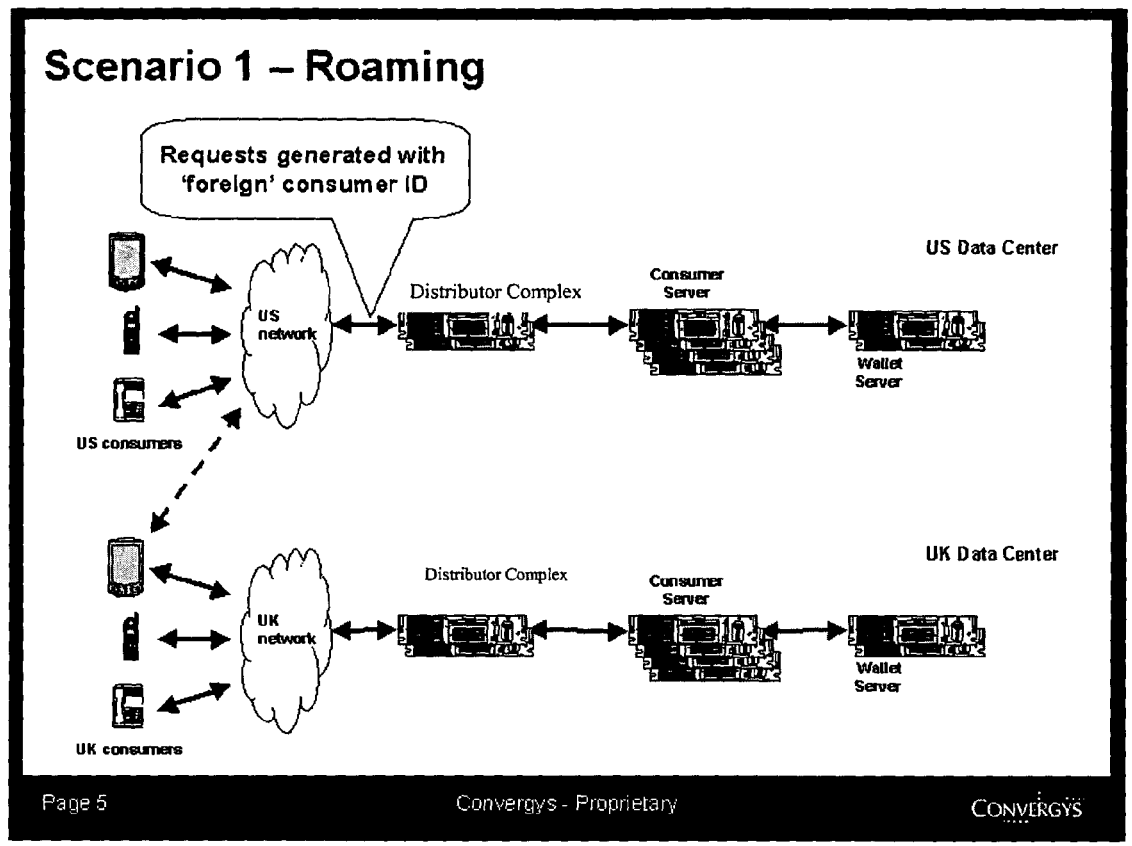
Figure 39:
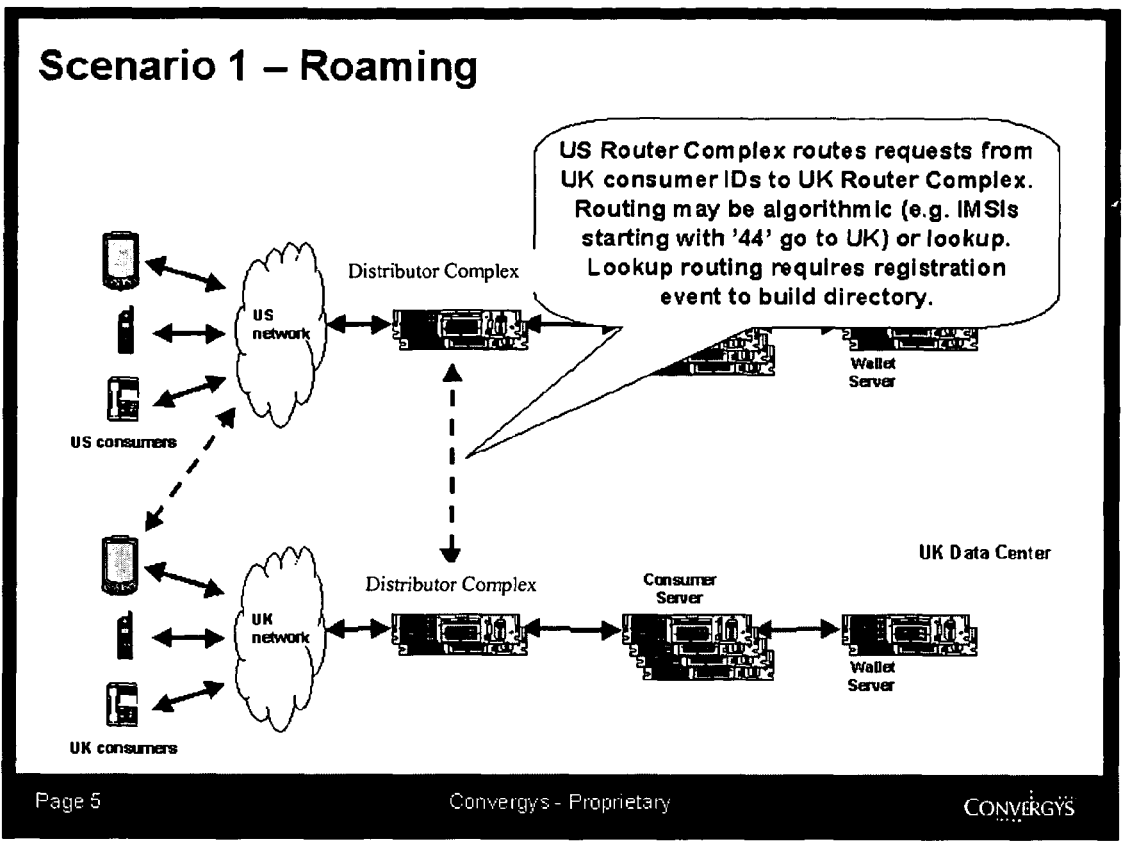
Figure 40:
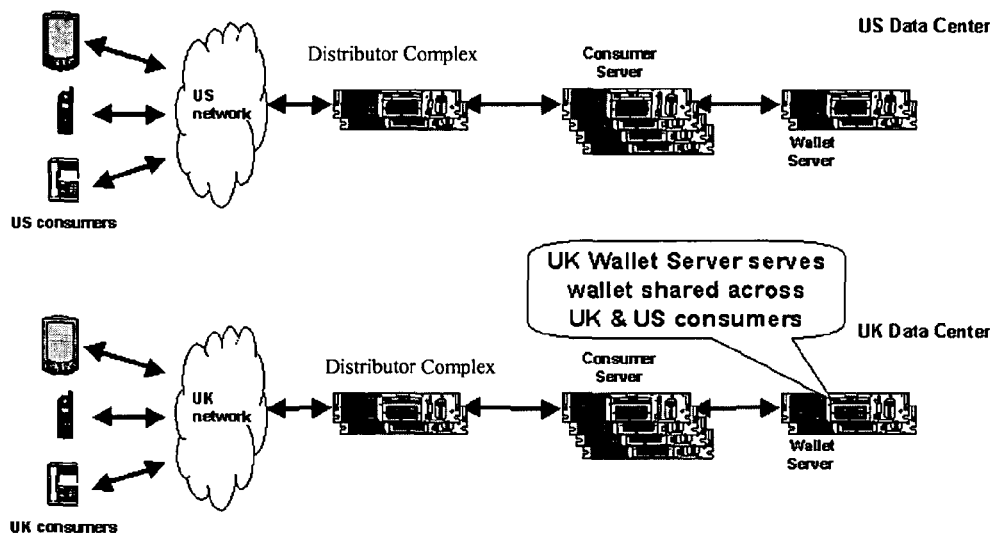
FIGS. 40-43 demonstrate how wallets may be shared across logical data centers in a roaming environment.
Figure 41:
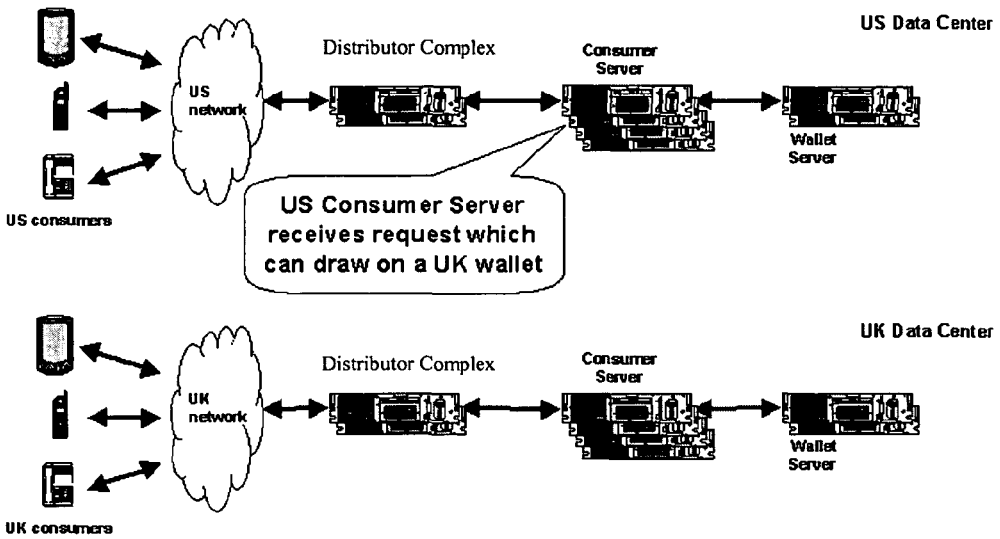
Figure 42:
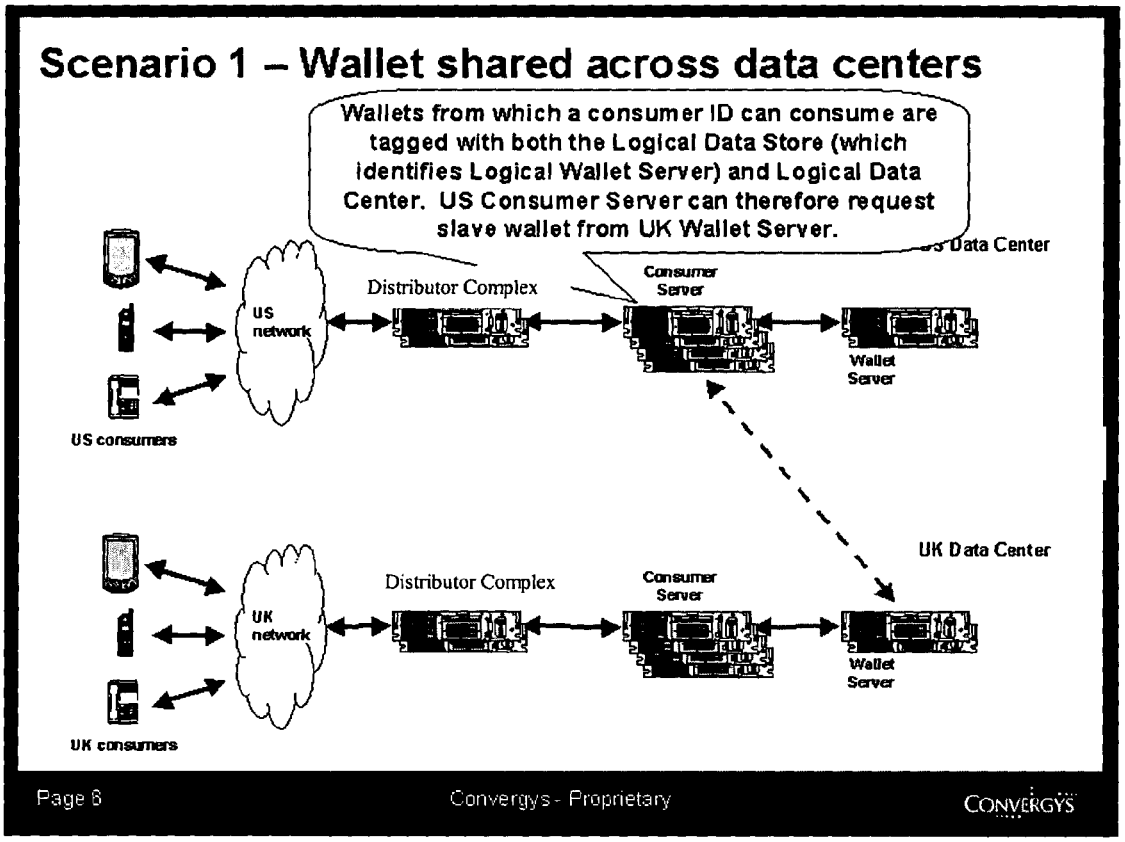
Figure 43:
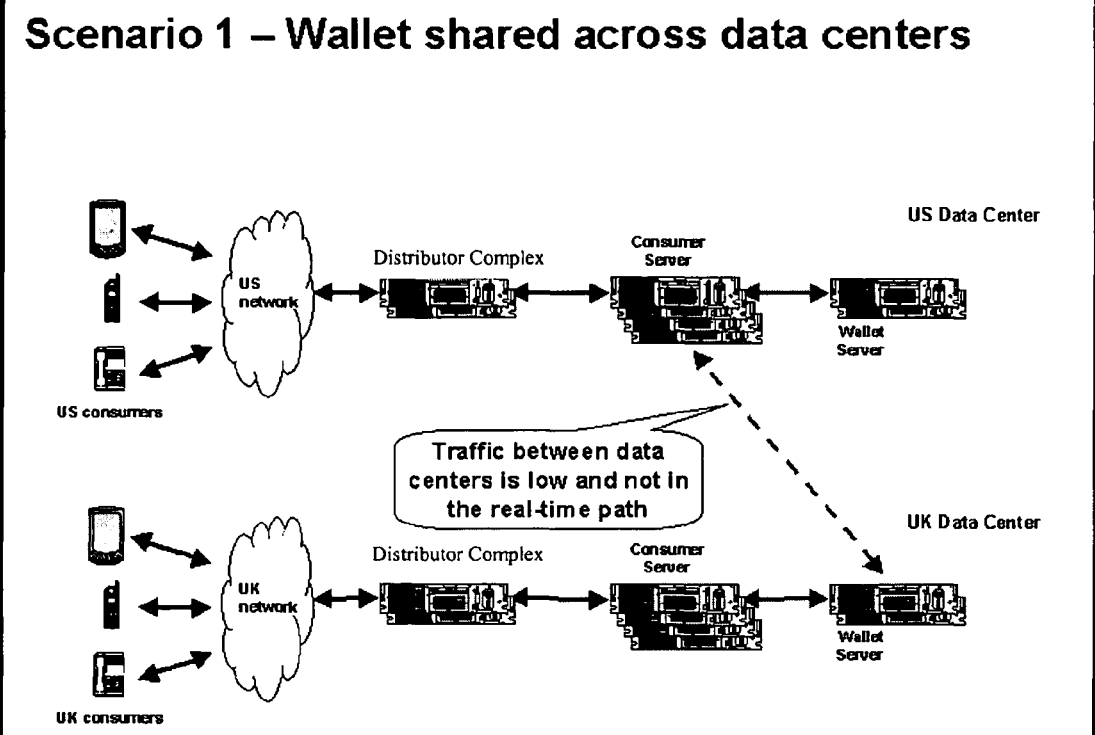

Referring to FIG. 35, all information related to SLA, performance and revenue assurance may be written to the System and Audit Database (970). The System and Audit Database (970) may be responsible for support processes including auditing record processing, naming server for server location, and managing new server introduction and rolling software upgrades.

Further referring to FIG. 35, in a preferred embodiment, certain elements of the system may be preloaded with databases and/or information necessary for processing requests. In one embodiment, the speed of the real-time processing may be increased by pre-loading components in an abbreviated path of the entire system such as External Event/ API-->Distributor-->Consumer Directory/Consumer Server.

Partitioning

In an embodiment, the system (900), through partitioning, can both optimize simple residential and small business billing while allowing complex consumer relationships to be modeled. Not all of the complexity described below may be necessary to support only simple residential consumers but this system will allow simple residential accounts to be easily linked into large corporate environments where bundling and sharing may be at the highest level of the consumer/account hierarchy.

The data held within the system (900) may be vertically partitioned into four major storage entities, three of which may be partitioned into a large number of logical data stores that are in turn mapped onto a small number of physical data stores.

Figure 5:
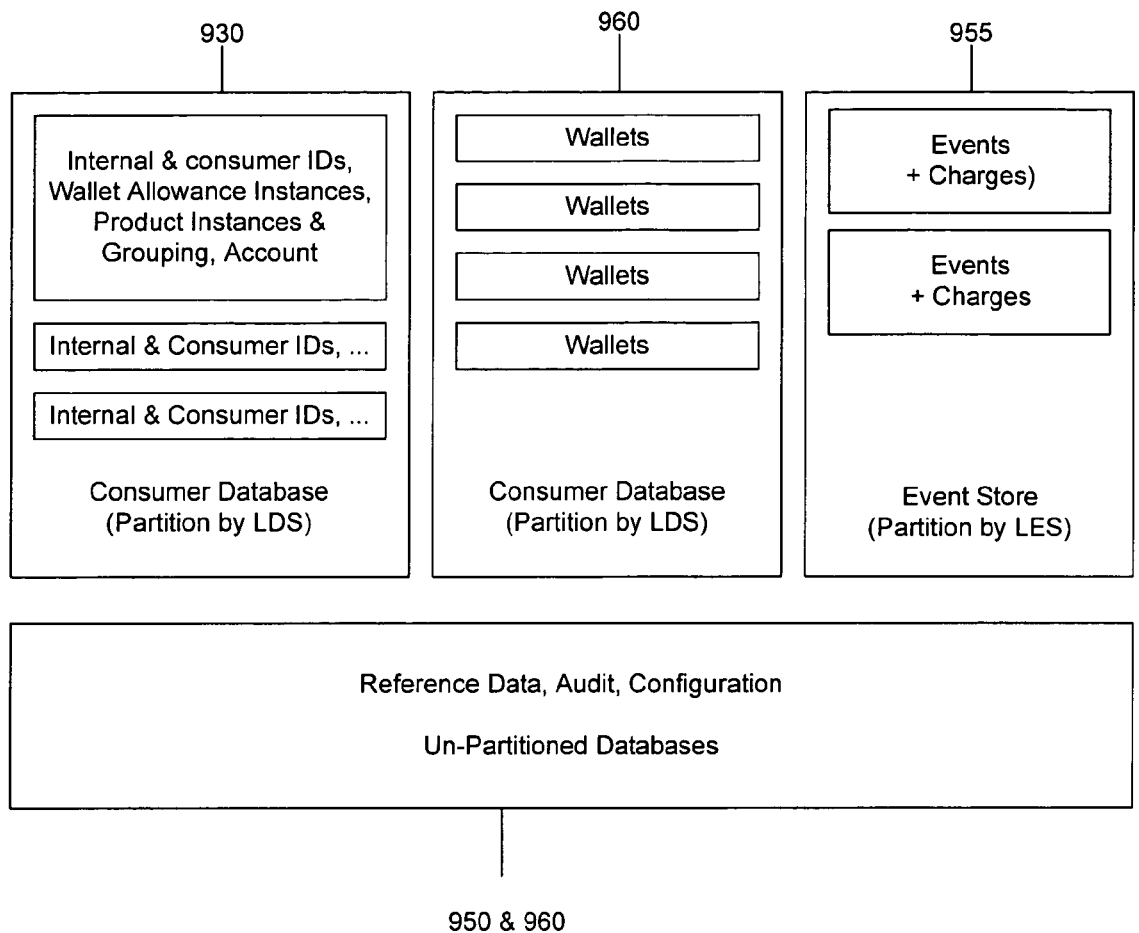
FIG. 5 represents the use of partitioning the consumer database, wallet database, and event store into a plurality of virtual/logical entities that may be mapped back to a smaller number of physical entities, and demonstrates that a single system has multiple different partitioning dimensions.

Referring to FIG. 5, the processing may be partitioned using logical servers. The storage entities are:

Consumer Data Store (Database) (930): Storage of all of the key per-product instance and consumer instance information. The logical partitioning key is the 'Logical Data Store' (LDS) value. The LDS may be assigned and manipulated on product instance and account and creation/modification by the API server (920) to localise related references (e.g. all members of a family may be on the same LDS). Under normal circumstances the LDS of a particular product instance will not change, though data from a number of LDS might get moved to a separate physical database to relieve overloaded databases.

Wallet Data Store (Database) (960): Storage of the wallet values (e.g. cash resources, bundles etc). Again partitioned by 'Logical Data Store' (LDS) value in common with the Consumer Data Store. However due to the higher update rate there may be more physical databases to serve the required number of shadow wallet Data Store.

Event Store (955): Events are stored into partitioned storage according to the Logical Event Store value.

Un-partitioned: reference, audit and management information may remain un-partitioned.

The partitioning used by one aspect of the system (i.e., databases) does not necessarily track partitioning used in other parts of the system (900) (i.e., processors). For example, the Consumer Servers (925, 926) are partitioned by 'Logical Consumer Server' (LCS). The partitioning keys in an embodiment of the system (900) may include:

LDS—Logical Data Store: Logical storage partitioning used for all consumer and wallet related data. However the consumer and wallet database may use different logical to physical partitioning. Related products will optionally, but not necessarily, be in the same LDS.

LES—Logical Event Store: Logical partitioning used for event storage.

LCS—Logical Consumer Server: Logical partitioning used to drive the consumer server to process requests for a particular consumer ID. There is normally a simple structural relationship between LCS and LDS for new products and accounts (i.e., it may be preferable to minimize the number of data stores that a particular Consumer Server (925) will access). However LCS may be seen as far more dynamic than LDS and LES. For example if two individuals establish a relationship they may remain in their individual LDS store, but may be placed onto the same LCS to be processed on the same Consumer Server (925). Note that unlike the LDS and LES, the LCS may be used to partition processing, not storage.

Additional (different) partitioning exists. For example the Directory Servers (915) are separately partitioned to support the hashing of external ID hashing used by the Distributors (910).

Partitioning optimizes data access and localization of cached information. The system (900) should be able to process requests where data is not optimally partitioned. For example, within a simple residential account all of the family members will normally be assigned to be within one LDS, LES, LCS (though not necessarily each with the same numeric value). The system (900) will, however, operate correctly even if this preference is not met.

Figure 6:
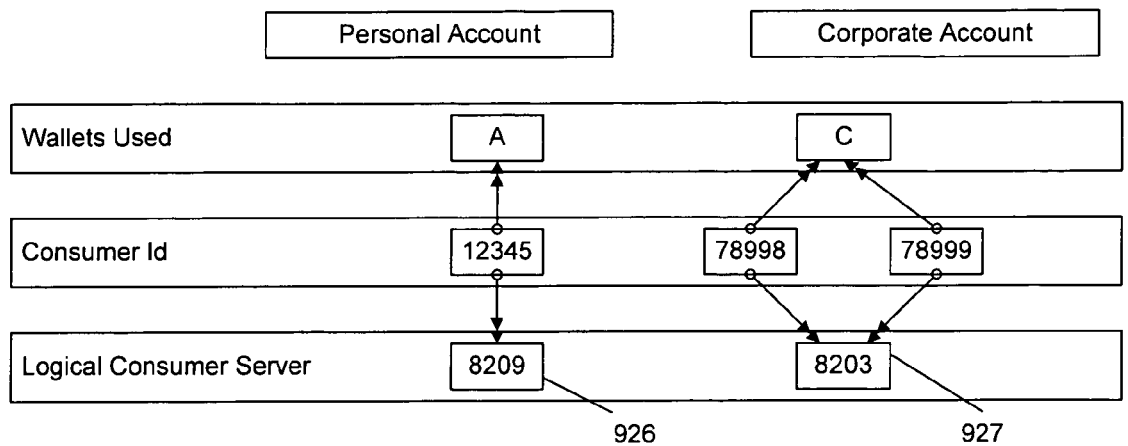
FIG. 6 demonstrates the reallocation of a particular consumer from one logical consumer server to another due to a CRM modification which specifies that the two, heretofore unrelated consumers, now share a single wallet.
Figure 6:
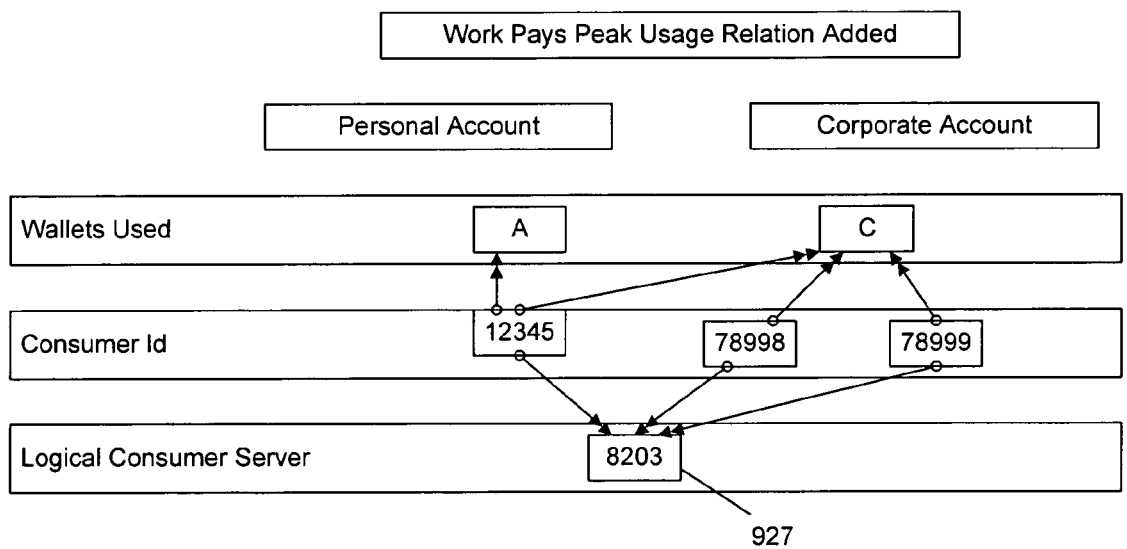

Referring to FIG. 6, to support complex Consumer hierarchies not all the information associated with one product/ consumer/account needs to be contained within one LDS. There are very controlled cross linkage points between LDS to allow large and complex entities to be mapped. FIG. 6 illustrates consideration of wallet consumption in determination of the Logical Consumer Server (LCS) (926, 927). Two consumers (12345, 78998) allocated to different Logical Consumer Servers (926, 927) are provisioned to the same Logical Consumer Server (927) if a CRM modification causes them to share a common wallet (C). Under normal operating conditions, this capability to manage resources across multiple Consumer Servers may be only required when the consumers allocated to share wallets cannot be managed within a single logical consumer server, for example, a very large account with many consumers sharing a single resource. The mechanism may be also used when Consumer Server fail-over occurs.

Figure 7:
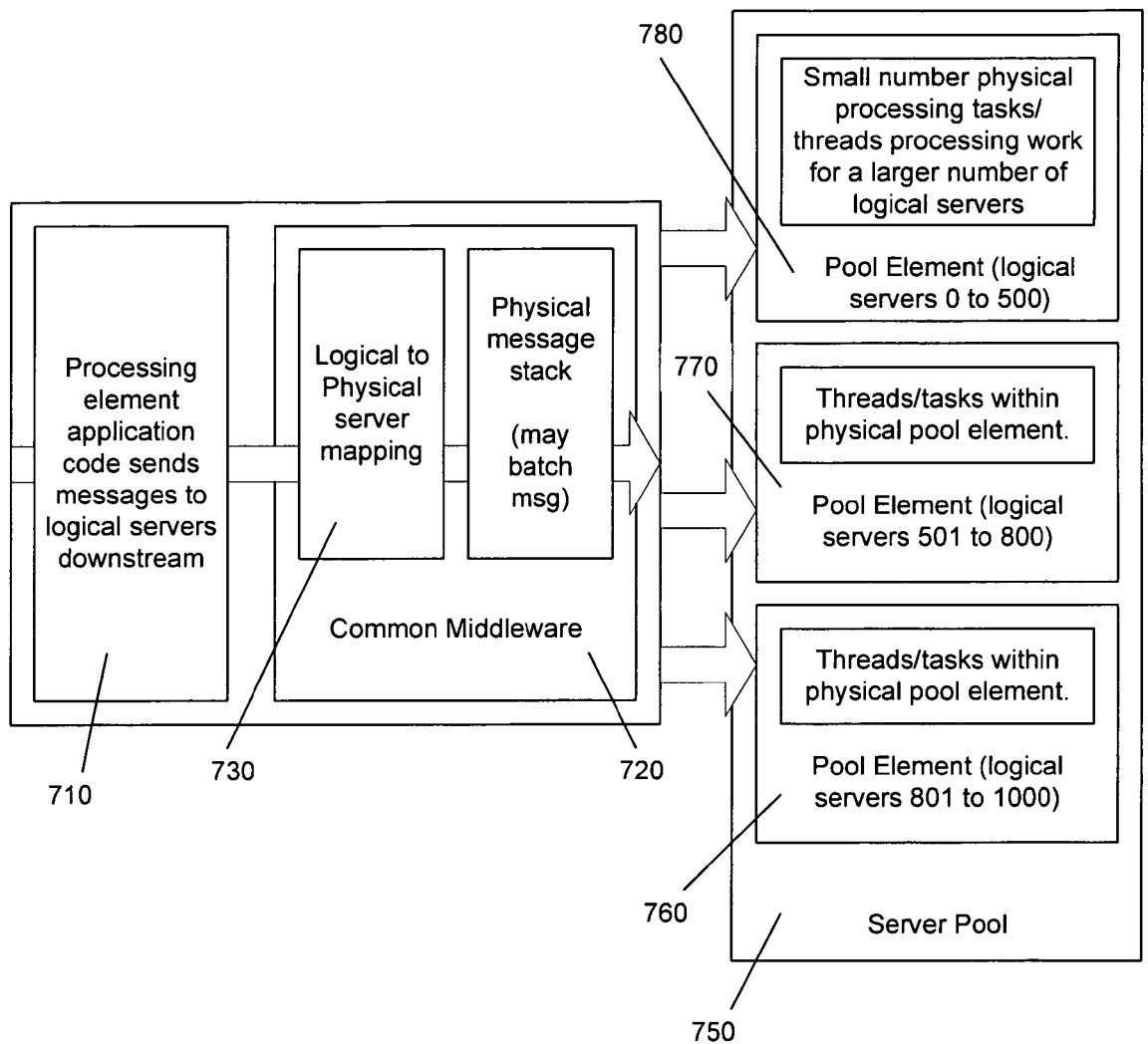
FIG. 7 illustrates the concept of a server [communicating with a large number of logical servers that reduce to a small number of processing tasks] pool comprising a plurality of logical pool elements.

The system (900) extends both the process and the database model concept of partitioning by transforming the system (900) into a large number of logical servers and databases with a common framework code to map both the large number of logical process and databases onto a smaller number of physical processes and databases. Referring to FIG. 7, a processing element (710) may write to a downstream logical process that may be mapped to a physical process using common middleware (720).

The logical to physical server mapping (and vice versa) (730) may be hidden from application code, as may be the structure of any downstream process (e.g. thread or processes based). An application only sends to a logical server within a server pool (750) via an interface common to all of the system's (900) applications.

'Work' that should execute together may be 'marked' to execute on the same logical server and use the same logical database. For example the external IDs (IMSI, phone number, e-mail addresses) for a family would be marked with the same Logical Consumer Server number so that all requests are routed to be processed on the same Logical Consumer Server (i.e., 927), and, typically, all the product and wallet instances associated with a family would be stored in the same Logical Data Store and all of the events in the same Logical Event Store. A large corporate entity, however, may have one or more dedicated logical servers and databases, that may for example cross a number of physical databases.

By repartitioning the logical to physical mapping, associated units of work can be 'moved' between servers. Each set of partitioned servers has logical to physical server mappings that may be maintained by the respective Server's Work Manager (965). Other servers will, via the common communication infrastructure, register for this logical to physical mapping, and be able to dispatch messages to a logical server within the server pool using common messaging primitives. The application programmer therefore only sees logical servers. Databases can then be incrementally upgraded or repartitioned by operating on each logical database in turn, rather than the complete physical database.

A preferred embodiment may be designed to be distributable, but does not mandate that it is distributed. The use of the logical partitioning and the mapping of those partitions onto physical machines allows the consumer to decide on their preferred hardware strategy including: single enterprise class server (or small number of such machines); multiple mid-range servers; enterprise class servers partitioned into multiple servers; blade servers; and many twin or quad CPU PC class machines. Load-balancing between nodes using the logical to physical mapping may be extremely straightforward. Capacity planning and increase may be simpler through the introduction of additional nodes. Existing hardware does not have to be taken offline and upgraded, new nodes can simply be introduced. Even if not distributed on physical machines, the distribution strategy allows the processing to be broken up into smaller units so that the impact of a process failure within a single machine may be reduced.

Physical Server Partitioning

By partitioning work across multiple physical servers, the system (900) may use partitioned cache/shared memory to cache data to speed processing. In a preferred embodiment, however, any server can process any external request, although throughput may be reduced as additional data may have to be demand loaded from the supporting databases.

Referring to FIG. 7, each of the processing tasks within the system (900) may be undertaken by a number of processing services or Pool Elements (760, 770, 780) organized into a Server Pool (750). For example each Consumer Server (925) would be considered a Pool Element (760-780), and all of the Consumer Servers (925) a Server Pool (750).

Figure 8:
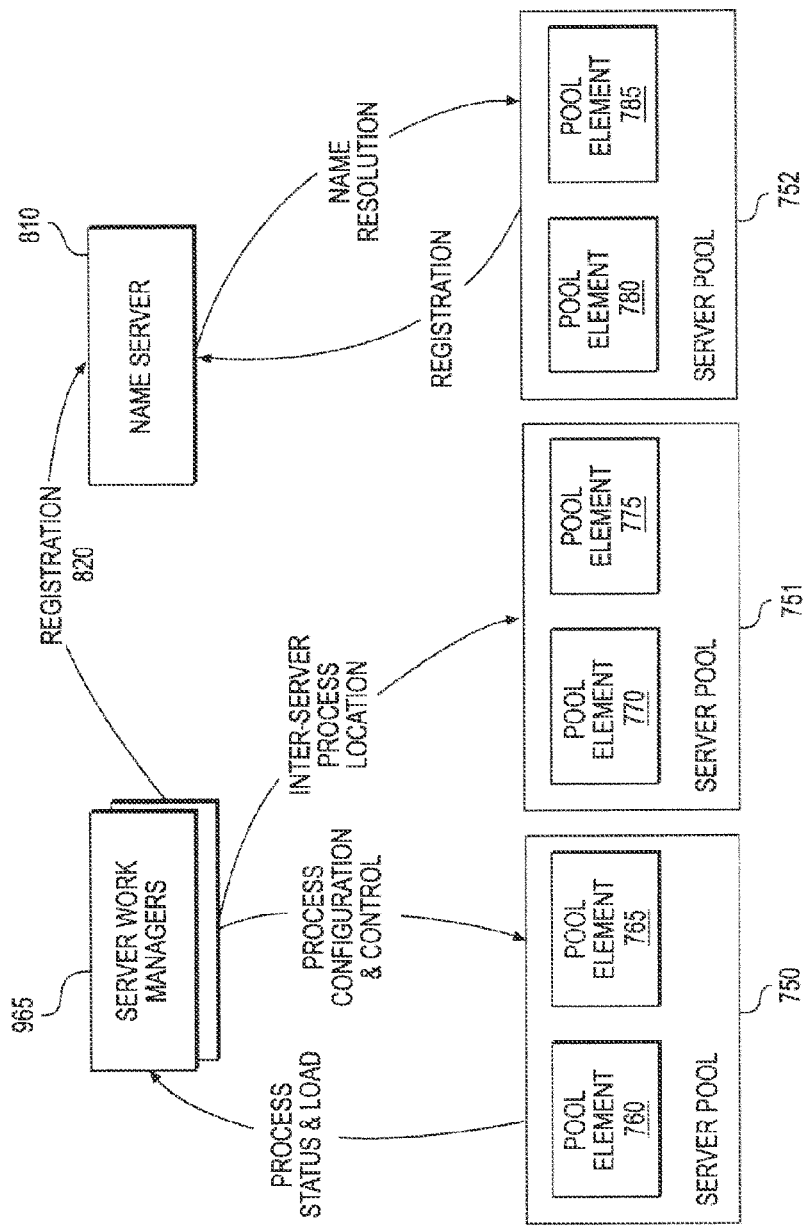
FIG. 8 illustrates the logical partitioning of the control plane of the system where there may be a centralized naming service and associated with each server pool a work manager that may be responsible for re-partitioning logical work across the physical server pool and communicating the logical to physical partitioning information to interested adjacent servers. Physical implementations may collapse all of the logical control entities into a smaller number of processes with an associated persistence data store (not shown).
Figure 13:
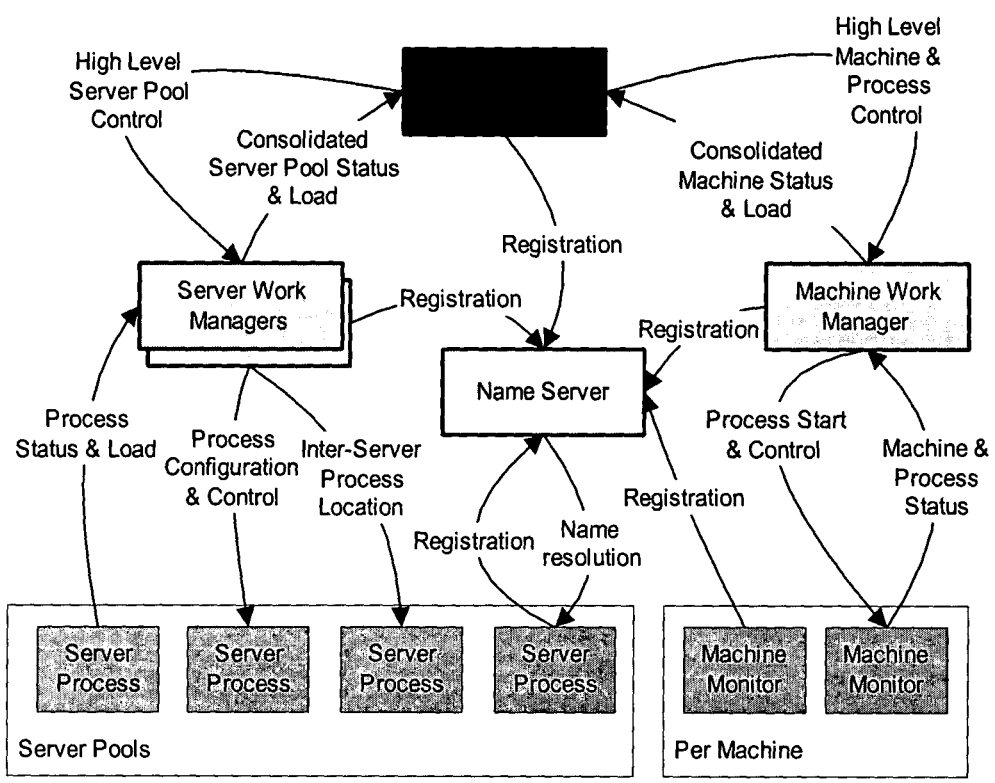
FIG. 13 is a more detailed view of the interactions between the components illustrated in FIG. 8. See comments on FIG. 8.

Referring to FIG. 8, there is shown an embodiment in which associated with every Server Pool (750-752) undertaking a particular task there may be a supervisory Work Manager (965) and the Server Pools (750-752) share a common Name Server (810). The registration (820) of Server Pool (i.e., 750) with the Name Server (810) defines a system. All servers (supervisory and processing) register with the Name Server (810). Two complete systems could conceptually be run on a single machine but each system would have a number of distinct Server Pools (750 . . . ) communicating with a Name Server (810). Referring to FIG. 13, Work Servers register with and are clients of their associated Server Work Manager and the Server Work Managers are clients of the System Reconfiguration Server. Each Machine may have a Machine Monitor Server.

All servers share a common set of functionality which may be implemented (and/or encapsulated) within a common set of classes used by all the system tasks. These, in turn, make use of a common set of inter-server messaging classes. These common services include: server configuration; common control services to start, stop and load control physical and logical servers; and server status monitoring, and statistics.

Individual servers also implement additional functions as described in the following sections. FIG. 8 comprises one possible functional illustration—FIGS. 8 and 13 may also be collapsed onto a small number of applications responsible for system control and reconfiguration with an associated 'application control database' that holds process configuration and state together with the associated machine processing and state.

Referring to FIG. 8, the Name Server (810) may be responsible for maintaining the master repository server identities to Network Addresses (and also allocating network ports if required). This server may comprise the central server to which ALL other servers within a system may connect and register as individual servers come online (including the servers listed directly below). One Name Server (810) may exist per instance, though, in larger systems, the Name Server (810) may be federated across a number of machines.

Generic Work Manager(s) may be responsible for the oversight of the load across a single server pool. The work manager may also be responsible for partitioning work across the type of server pool, monitoring for failed servers, controlled introduction of new servers, controlled server shutdown, and replacement of failed servers. The work managers may also be responsible for requesting additional server resource from the Reconfiguration Manager. The work manager may collect statistics to identify overloaded servers. The Work Manager may maintain the Local Server Mapping information for partitioned servers and distributes this mapping information to servers that have registered an interest. Many Work Managers may store 'configuration state' to quickly allow server configurations to be restored after a system dead start.

Machine Monitor Server may be a simple common process running on each machine (per domain using that machine) and may be responsible for basic machine management including machine health monitoring, network connectivity monitoring, and server task launching. The Machine Monitors all communicate with a common Machine Work Manager that supervises all machines state.

The Reconfiguration Server may be responsible for high-level control of the orchestrating system configuration and load balancing across multiple Work Managers. It also uses the individual Machine Monitor Server to start new server process. This server may also ensure that the different server pools are upgraded in the correct order.

Operational monitoring may be file and report based. Real time reporting may be by SNMP and/or proprietary poll and push statistics reporting which may be file or message based. Within the Distributor, high-level SLA information may be maintained. This information may include number of records, distribution of records, latency and wall clock measurements. In addition, more detailed performance numbers may be captured and returned to the Distributor from the downstream processes. This information may be used to identify and correct performance bottlenecks. A GUI may be placed on the Distributor infrastructure to provide a real-time view into the operations of the system (900)—perhaps via windows.

Invoicing comprises the production of output based on charges from stored events related to the account being invoiced. Periodic invoice charges may be generated prior to Invoice generation and are stored as events. Re-rating of events, required by changes in the product catalogue or consumer product configuration, may be performed prior to the invoicing process.

Figure 14:
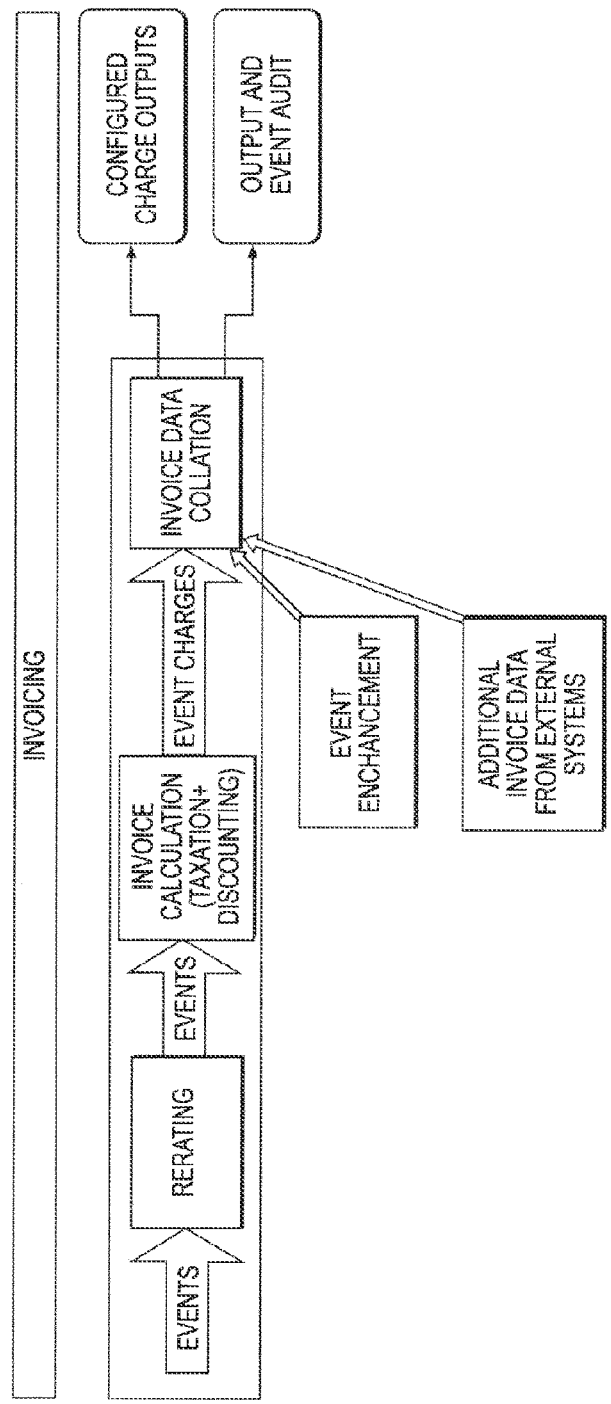
FIG. 14 illustrates the invoicing process.

Referring to FIG. 14, the invoicing process comprises identification of accounts to be billed; retrieval of events for accounts to be billed (these events may contain rated charges that are not modified by the invoicing process); generation of periodic discounts based on invoice period aggregation of charges; generation of taxes for retrieved charges including applicable discounts; enhancement of charge information (internally or externally) required for output generation (including invoice presentment information, financial reporting information, commissions or settlement information; and audit information to ensure that 1) all delivered outputs can be transactionally delivered to external systems, and 2) all delivered events that should be invoiced have been.

These Server Pools (750 . . . ) may be managed by a common infrastructure: Parallel Servers, Partitioned Servers, and Single Servers.

Parallel Servers comprise a pool of parallel servers where work may be shared across the servers, and where any server can undertake the work (e.g. Distributor (910).

Partitioned Servers comprise a pool of partitioned servers where a large number of logical servers exist (typically a few thousand), that are mapped down to a small number of physical processes running on one or more machines.

Single servers may exist (typically undertaking supervisory functions) where, under normal operating conditions one server exists, but they still participate in the high availability infrastructure for fail-over support and to locate other servers. From the system (900) design perspective a single server may still be modeled as a Server Pool (750 . . . ) containing one server.

To support the logical server and database model, and to provide resilience from database technology changes and database structure, processes may access the databases that surround the system (900) via database proxies via neutral interfaces (preferably based on XML unless the overhead of XML is unacceptable for a particular access), and the proxies will hide most physical database partitioning, and physical database access. The proxy functions may also be absorbed into the calling processes.

Additionally, the proxies can be used to hide technology changes between test and production implementation. For example, most storage may be functionally prototyped in a relational database, but high volume storage (e.g. the Event (955) and Wallet (960) database) can be moved to lower cost non-relational storage by changing the proxy.

The interface to the Wallet Database and Proxy (960) may be persistent. Therefore, if all or part of the Wallet Database/Proxy (960) becomes unavailable, the system (900) may continue to operate. However, the transactions from CRM (901), via configuration, can be marked as Resubmit. If marked as resubmit, the Resubmitter (995) shall continue to process the transactions until completion.

The system (900) may service requests of two types (including equivalents thereof) Network Requests from external service delivery platforms (902) and API requests from external OSS systems such as CRM, IVR and Self-care (901).

Breakdown of Components and Processes

Network Requests

To support different market applications, the system (900) may support a request interface that can be mapped to many different external business transactions. These may include:

Simple post-event accounting (with optional charge, and per use remaining resource reporting).

Conditional event processing (process event if sufficient credit or refuse to process event).

Interface to real time metering systems, e.g., telephone call metering, with a call set-up request, continuation request and termination request.

Support for point of sale credit card style transactions supporting both monetary and unit-based transactions. Basic primitives include: Authorization (potentially long running or high value); Authorization adjustment and authorization reversal (i.e. multiple authorizations are allowed per purchase); Capture (complete transaction/sale); capture reversal (cancel previously completed transaction optionally with no record on consumer bill); Credit (partial or complete credit of previously captured transaction); reversal of previous credit. Note that unlike a credit card system the system (900) could authorize 10 Mbyte as well as $15.

Cross transaction authorization (also known as inter-event authorization). This allows external systems to reserve credit to be used against a number of subsequent events (e.g. multiple purchases per authorization). Required for loose integration with many systems with limited billing functionality.

Digital rights primitives. These will include requesting or extending a specific 'permission to use' (many of these primitives will be similar to a lease).

Many of these requests may not generate a billable event, and those events that are directly billable may be accumulated rather than treated as a conventional CDR.

Distributor

The Distributor (910) may be responsible for:

a. Journalizing Requests for revenue assurance so that they can be resubmitted as required.

b. Routing all Requests to the corresponding Consumer Server (925) or API Server (920) processing elements with support from the Consumer Directory (915).

c. Routing replies from the processing elements back to the requesting network.

d. Policing the latency and revenue assurance SLA ensuring that (a) replies are generated to network elements and time sensitive API requesters, even if the downstream servers have not responded in the required time interval; and (b) any requests that are not acknowledged by the processing element are subsequently resubmitted for re-processing by the Resubmitter (995).
e. Passing key information recovered from the Consumer Directory (915) to optimize the Consumer Server (925) operation (for example the Logical Database Store of the associated Consumer Database (930) together with versioning information to allow the Consumer Server (925) to determine if it has cached out of date information).
f. Audit and statistics collection for all external requests.
g. Providing a pluggable software infrastructure to allow a number of different protocols supporting different request types and encodings to be supported in parallel. This may allow direct connection of the System to request sources. This may eliminate the need for a separate mediation system found in conventional transaction systems.

These services are available to both conventional network authorizations and events as well as to requests generated from CSR, self-care and EAI systems.

Input to the Distributor (910) may be via a common plug-in interface that terminates the external network/API message transport. One Distributor (910) can simultaneously support more than one plug in (from different network elements), decoding and encoding different protocols.

The routing plug-in may decode the minimum of information to allow the routing process to complete, and may decode additional information to prevent the downstream server from having to re-parse the raw input data (the message format between the Distributor (910) and the Consumer Server (925) allows for a mixture of parsed data in a common format, and unparsed data to be exchanged). In one embodiment, the minimum information to be decoded by the plug-in may include:

a. External ID to route the request (an external account number, IMSI, e-mail address).
b. Numbering space for the external ID.
c. Request date/time (may be null for some API requests).
d. External correlator information that is simply preserved by the system (900) and returned in any external reply to allow the external system to associate responses and replies in a system dependent fashion.

The plug-in may also pass additional information to the Distributor (910). These include flags indicating if a particular request should be resubmitted if failed and the priority of the request (typically to allow the Consumer Server (925) to prioritize the processing of telephony authorization events). The plug-in will also pass in information indicating the type of the request.

As part of the routing and revenue assurance process each request may be assigned a unique ID by the Distributor (910). This may be used both to allow duplicates through resubmission to be detected, and to support updates into external data warehouses.

Figure 10:
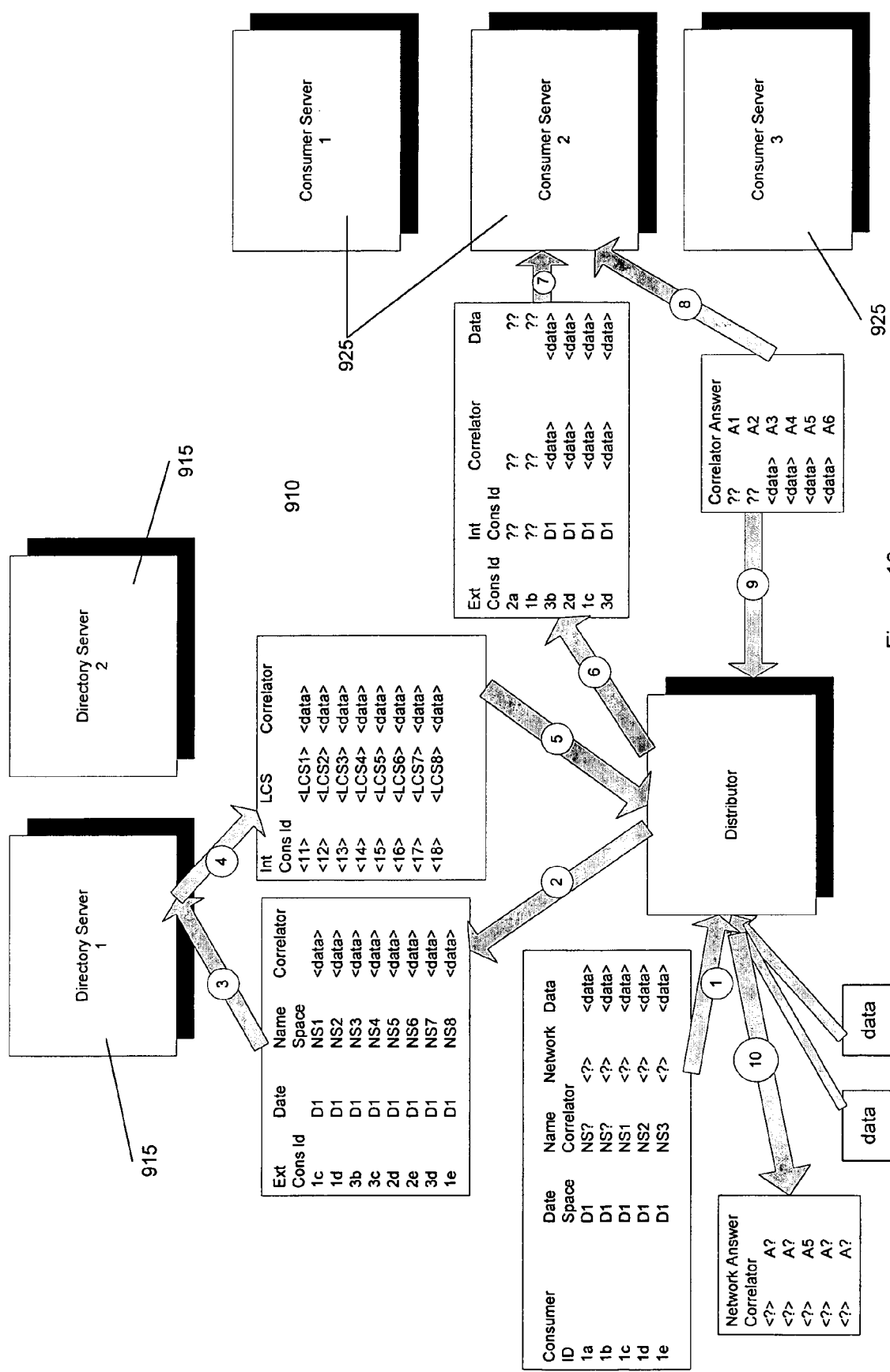
FIG. 10 illustrates a high-level functional diagram of the relationship between the distributors, director servers, and consumer servers.

Referring to FIG. 10, one high level functional design for the Distributor (910) is illustrated. It depicts three (3) batches of records being offered to the Distributor (910). These messages are correlated to the appropriate Directory Server (915). In this example, records from various batches are combined and transmitted to the Directory Server (915). Likewise, the information transmitted to the Consumer Servers (925) comes from a variety of batches and Directory Servers (915).

API Server

The API Server (920) processes API calls received from CRM (901) (and other external systems) via the Distributor (910). Its key roles are to hide the complexity of the machine topology and work-/data-partitioning from those systems and manage the allocation of entities such as accounts, product instances and consumer IDs to logical servers and data stores.

The API Server (920) may result in updates to data held in a number of locations in the architecture including the Directory Server (915) cache; Consumer Server (925) cache; Wallet Server (940) cache; and the Data (930) store.

Transaction integrity may be maintained without incurring significant processing overheads (multi-phase commit on transactions and/or registration of interest on the database). In one embodiment, updates, which affect the rating path, are written through the Distributor (910) and Directory Server (915) cache to the database. Examples of such an update may be the creation of a new consumer ID, allowing a consumer ID to consume from a new wallet, etc. Updates may increment a version number in the Directory Server (915) cache (and in the database) which may be passed back to the Distributor (910) and on to the Consumer Server (925) when an event may be routed. The version number which accompanies the event may be used by the Consumer Server (925) to check the validity of its cache and if necessary it will be refreshed (for that consumer ID). A registration event may be sent through the system (900) to prompt the cache refresh before an event arrives. This will ensure that latency does not degrade for the event which follows a consumer information change.

The API Server (920) may load-balance across the logical consumer servers and data stores. [Note that load-balancing across physical servers may be the responsibility of the Work Managers (965).] The API Server (920) may also implement locality of processing via wallet domain closure. This may be to ensure that, where possible, all 'related' consumer IDs are hosted on the same logical consumer server. The API Server (920) may be responsible for routing the API call to the correct node. Finally the API Server (920) may respond with success or failure to the Distributor (910).

For each API call, the server will determine the logical server manipulation required [For example, allowing a consumer ID to consume from a Wallet Allowance may result in the migration of that consumer ID from one logical consumer server to another.] The server may also determine where the resulting API calls should be routed.

The API Server may also be designed to bypass the Distributor and Director Server.

API Requests

The system (900) may handle a range of 'get' and 'set' API Requests required by CRM and other external systems. For example:

Add account
Add product instance
Add consumer ID to product instance
Allow consumer ID to consume from wallet
Change consumer ID from C1 to C2
Change liable account for a product instance
Return all events given a specified set of criteria e.g. consumer ID, event attributes
Return the current resource for an account
Return the wallet resources for a particular consumer ID The system (900) may also handle 'boxed' API calls where multiple calls are grouped into a single transaction. Such a group of calls will be routed to the same API Server (920) where any dependencies can be managed and there may be the possibility to optimize integrity checking. The API Requests may be vertical market independent and the integration may occur in the external application's middle tier.

Wallet Server (940)

The Wallet Server (940) may provide lifetime control, consolidation and backup (in conjunction with the Wallet Database and associated Proxy (960)) over the distributed loans and resources on the Consumer Servers (925) through the distribution and management of Shadow wallets (320 ... ).

The Wallet Server can be broken into a number of related functions:

(1) Distributed Loan Manager: Management of internal loans within Shadow wallets (320 ... ) across multiple Consumer Servers (925 ... ) enabling distributed use of 'bundled' usage. The Loan Manager can operate in both a proactive mode balancing loans in anticipation of future usage and in a reactive mode to satisfy an outstanding loan request.

(2) High Value External Authorization Manager: Central storage of high value authorization requests (e.g. credit card style authorizations) allowing high value external authorizations to be consumed or amended from any Consumer Server (925).

(3) Distributed Resource Manager: Resource consolidation for near real-time resource management by processing delta changes from the Consumer Server (925). A background process also ensures that the absolute values within the Consumer Server (925) remain synchronized with this process. Generation of action requests based on wallet resource thresholds. Persistence and archival of resource information in the Wallet Database (960). The Distributed Resource Manager also notifies the Consumer Server (925) of the update periods of any Shadow wallet (320 ... ) (e.g. periodically, on trigger or every change).

(4) Reactive Wallet Generator: Wallet generation control logic (policy) invoked to determine if a loan or new wallet request can be satisfied in response to a request from a Consumer Server.

(5) Proactive Wallet Generator: Background process to try and create wallets in advance where associated with active product instances prior to usage being processed against those wallets.

(6) Complex Threshold Management: Threshold management across multiple consumer servers, and delegation of simple threshold management to the Consumer Server.

The Wallet Server may implement the 'Partitioned Server' model where the Logical Data Store determines the Shadow wallet Server that any Wallet should be served by. Supporting the Wallet Server (940) may be a Work Manager (965) that partitions and manages shadow wallet Servers (940) across multiple physical Wallet Servers (940).

The Wallet Database (960) provides the long-term persistence for the Wallet Server (940) supported by any local journalizing required to support the overall system revenue assurance.

Distributor

The Distributors (910) may serve as the ingress point into system (900). They may also provide the revenue and SLA assurance of events, authorizations, and CRM/middleware integration to the core system (called 'Requests'). All of the Distributors (910) can handle any Request and are implemented as a number of servers in a pool for capacity and resilience, though it may be anticipated that different large external networks and CRM/EAI systems will have one or more dedicated Distributors (910) (including backups). The Distributor (910) may be designed to undertake a fast common fragment of Request processing; therefore, most systems will not commonly have to frequently upgrade the Distributors (910), and there will be more Consumer Servers (925) and API Servers (920) than Distributors (910).

The communication between the servers may make use of priority with the distributor classifying the requests with different priorities, and the servers may also use the priority in their processing and queuing, and support independent traffic flow control mechanisms per priority.

Directory Servers

The Directory Servers (915) access a number of Consumer Databases (930) that are used to resolve Logical Consumer Server and Logical Database Server information for every External ID.

Additionally the Consumer Directory (915) will also hold a very limited number of key values for some External ID. These are used to version information associated with a given ID to identify out of date information cached by the Consumer Server (925).

Figure 1:
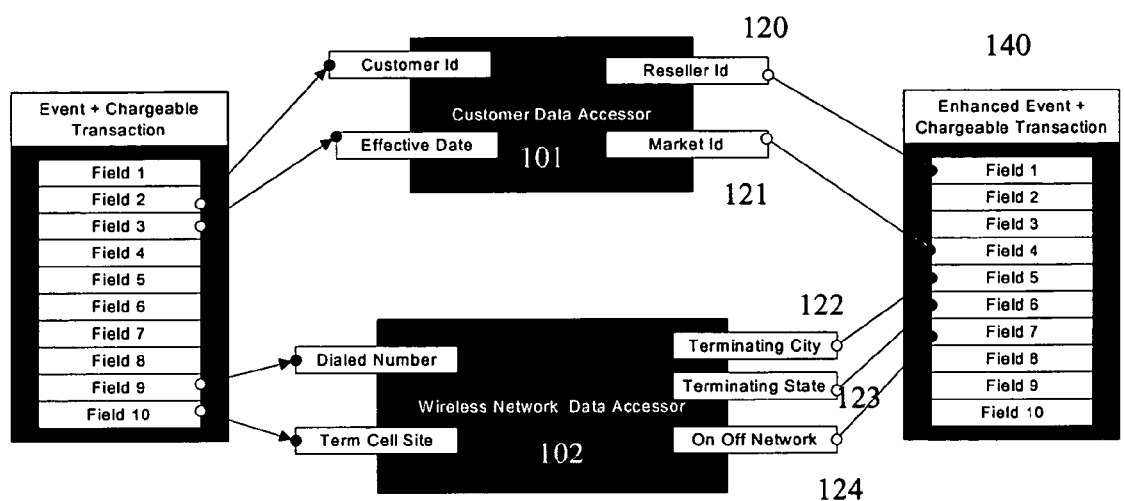
FIG. 1 demonstrates the use of Data Accessors to enhance event information. These may also be configured process requests for different vertical markets.

The Consumer Server (925) processing element has a highly extensible structure for charge determination and output attribute generation, while other processes (e.g. the Distributor (910) and Wallet Server (940)) are designed to be market agnostic. For example, within the Consumer Server (925), data accessors (101, 102) encapsulate access to vertical market specific database entities and the code that provides access to these entities. Referring to FIG. 1, one embodiment shows an example of two data accessors (Consumer Data Accessor (101) and Wireless Network Data Accessor (102)) configured to provide output information (120) for event enhancement (140).

The Consumer Directories (915) are implemented as logical server pools as described above to split the memory cache requirement and processing load across multiple machines.

There is normally no duplication between information held in the separate Directory Servers (915)—all Distributors (910) will access all the Consumer Directory (915). A hash of the External ID may be used to determine the logical Consumer Directory (915) that can service each request. The External ID may represent a phone number, login name, device address or any piece of information that can be used to identify the consumer associated with this event.

Each Consumer Directory (915) may be loaded on system start-up by query of all of the Consumer Databases via their associated Database proxy. Any information not loaded when a request for directory information may be received may be demand loaded.

In a preferred embodiment, the Consumer Servers (925) and API Servers (920) are the key processing elements in the real time path. The Consumer Servers (925) process requests where significant use can be made of data cached for an individual external ID. This may be typically authorization and usage processing, and some information requests. Requests processed by the consumer server include: post event usage rating; pre-pay call authorization/continuation/termination; e-commerce primitives (including longer term higher value authorizations and credit card support primitives); and evolving support for Digital Rights Management primitives that are anticipated to be required by the software and entertainment industries.

The Consumer Servers (925) complete their work supported by the Wallet Server (940), Event Manager (945), Reference and Consumer Databases (930). As outlined earlier, the Consumer Servers (925) are designed so that most requests can be completed with information previously loaded into Consumer Server (925) memory without reference to other components such as the Wallet Server (940).

Logical server information setup by the API server (920) and read from the Consumer Directories (915) may be used to ensure that requests for the same External ID (and in many cases for the same account) will be passed to the same Consumer Server (925) to take advantage of cached information in the Consumer Server (925).

Further in that preferred embodiment, however, any request will be correctly processed if routed to any Consumer Server (925), though information required might be demand loaded. Additionally, large accounts can be efficiently split across Consumer Servers (925) with shared usage bundles, and personal accounts can draw effectively on usage allowances from other family members or corporate accounts.

To complete each request the Consumer Server (925) may perform one or more of the following functions:

1. Complete any parsing/processing not undertaken by the Distributor (910) to recover information from the incoming request.

2. Use the appropriate market/network specific plug-in to determine any service specific enhancement information. This may result in access and optional cache of information from external service-specific databases. Note that this plug-in, in common with the other system (900) plug-ins, does not allow direct external database access. The plug-in provides a common external resource access service that provides a framework for caching, and rescheduling of event processing while awaiting the response.

3. Determine the chargeable transactions associated with the request (if any).

4. Recover and update of any reference or Consumer data not already cached by the Consumer Server (925) to complete this request.

5. Determine the billing period into which any charge generating request will normally be processed.

6. Provision Wallets (310) and any internal loans for bundled usage allowances needed to complete the rating process, together with any interaction with the Wallet Server to increase any usage allowances and to persist high value and/or longer term authorizations.

7. Determine the charge taken from each Wallet to satisfy each chargeable transaction (i.e., one request from the Consumer Server may generate one or more chargeable transactions, and each chargeable transaction will be satisfied by a number of charges, with each charge taken from one Wallet).

8. Journal request details, charges, updated resources, and market/operator specific information (for example but not limited to tax summary, commission and settlement information) for subsequent processing by the Event Manager and the Wallet Manager, and providing sufficient information for the Event Manager to determine the correct logical event store for this event. Additionally the Consumer Server may tag any information (for example the market/operator information) so that the Event Manger may correctly route and consolidate such information.

9. Generate any response information to the external network to be returned via the Distributor and acknowledge all requests to the Distributor for revenue assurance.

10. Undertake any simple threshold processing delegated to the Consumer Server by the Wallet Server (see Wallet Server discussion).

Note that the above processes do not have to be implemented in a strictly sequential manner. Where practical, lazy evaluation may be used within the Consumer Server (925). This prevents lookup and calculation of unnecessary derived data. To support this, the Consumer Server (925) may implement some sophisticated data driven scheduling to allow the processing of one request to be paused and another request continued while waiting for data from a Database Proxy, external database or the Wallet Server. This same scheduling system enforces a batching/ticketing process to both support revenue assurance and to batch journal file and network access, and to also allow request priority to be honoured for high priority requests received from the Distributor (910).

Event Manager

The Event Manager (945) provides for the long-term persistence of the real time rating products delivered by the Consumer Server (925) (independent mechanisms to journal Consumer Server (925) results to recover from Consumer Server (925) failure may also be incorporated). The Event Manager and the Event Store may also be separated. The Event Manager (945) therefore relieves the Consumer Server (925) from responsibility for persisting the products of rating. This separation of the Consumer Server (925) and event storage responsibilities allows independent partitioning of the event stores; independent optimization of event storage configuration; removal of the event storage delay from the processing path for external requests; and implementation of more advanced event storage strategies making use of event accumulation, or consolidation, without changing the Consumer Server (925). As part of the storage of such rating products the Event Store may save all of the change information that may be sent to the Wallet Server. This provides both an independent storage of charges for audit and recovery, and allows parts or all of the Wallet Server to be eliminated if real-time resource (loan) control and/or balance reporting is not required.

The Event Manager (945) and associated event storage may be built in the same logical server and database model as used elsewhere in the system (900). The events are partitioned using a Logical Event Store (LES) that allows events to be steered to a particular event store. For simple residential accounts there may be a simple relationship between LCS, LDS and LES. The separate LES partitioning value recognizes that some very simple account structures may be associated with very high event volumes. We cannot therefore assume that the events for all consumer IDs served by a single LCS can be stored in a single LES.

Figure 11:
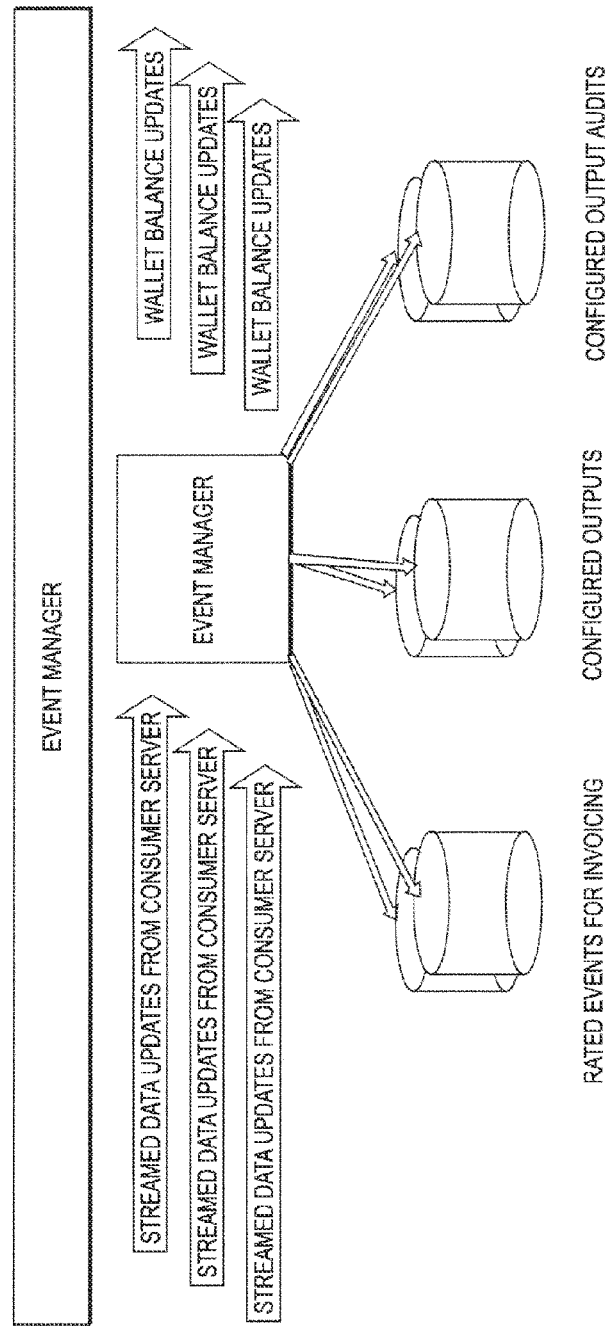
FIG. 11 diagrams the responsibilities of the Event Manager.

Referring to FIG. 11, the Event Manager may be responsible for one or more of the following:

1. Storage of rated event data in partitioned data stores as required for invoicing. This stored event includes charges determined by the rating process.

2. Delivery of near-real-time resource updates to the Wallet Server.

3. Registering the safe storage of the Consumer Server output with the Audit Database proxy.

4. Detection of duplicate events and correction/removal of downstream data delivered for these events.

5. Generation of output delivered to external systems. This output may include settlement or reporting information that may be required in near real time and can be based on the real time rating of events.

6. Delivery of events back to the Distributor when required for multi-stage rating. This provides support for multi-party billing where the wholesale or settlement rate may be dependent on the retail rate charged to the consumer. In this case the retail rated event may be stored for the retail account and the rated event may be routed back to the Distributor to guide and rate for the wholesale account.

7. Audit information for output delivered for external systems. This allows reconciliation of data generated for external consumption with the actual receipt of this data. This audit point may be useful for revenue assurance since output information may include financial reporting information, settlement data, or rated event records for invoicing by another invoicing application.

Data Model and Architecture

A preferred embodiment for the architectural strategy may be to provide an extensible architecture which allows the curiosities of particular vertical markets to be accommodated by extensions, rather than customization of the core code because transaction classification varies enormously from one vertical market to another. For instance, in wireless, network reference data may be used to determine if the call was in a home zone. In wireline, a distance classification may be often assigned, again based on network reference data. For other transactions such as credit cards, no such classification may be required. Therefore, in a preferred embodiment, the rating architecture may assume that the transaction classification is not provided as part of the core code. This ensures that no unnecessary processing is undertaken and no redundant configuration is required.

In a preferred embodiment there may be no customer data model. Instead, a consumption data model may be used to hold the relationships between consumers, products and wallets (scalar usage and cash values). A customer data model may be assumed to be within external CRM entities and linked to the system (900). When data may be changed in CRM these changes will be propagated to the system (900).

Customer care or CRM changes that assign products to customer are relatively infrequent and it may be planned that these changes produce replicated information in the data model to simplify the relationship between a network access device and the way that charges for that device are computed—consumption relationships. This separation of customer data structure from consumption relationships delivers significant efficiency gains when charges associated are calculated and consumed from wallets.

When customer product assignments are made, the resulting product instances are assigned to one or more product instance groups. These product instance group assignments allow automatic creation or modification of the orthogonal consumption relationships held within the system when customer structure changes are made externally in CRM and propagated to the system. There is no requirement that the consumption relationships be structurally similar to the customer structure. This provides complete freedom of wallet resource sharing, independent of the customer data structure.

Figure 2:
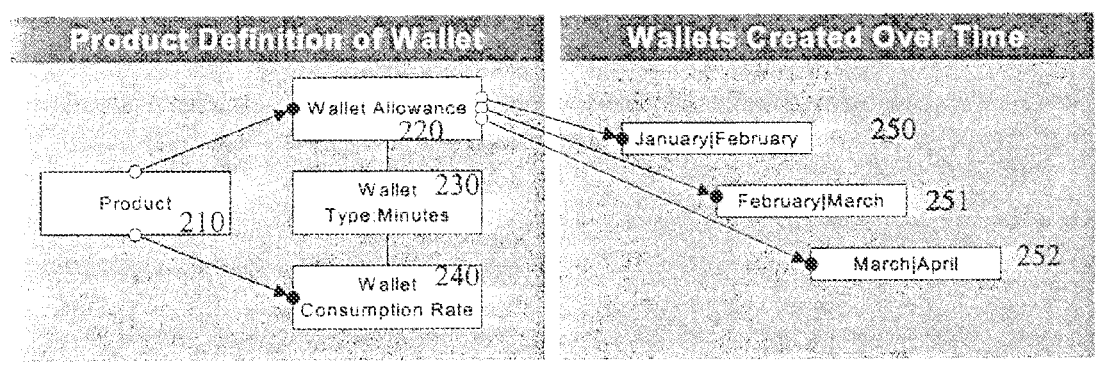
FIG. 2 demonstrates the relationship between a wallet and a product as well as particular features (allowance, type, consumption rate, viability) of the wallet.
Figure 12:
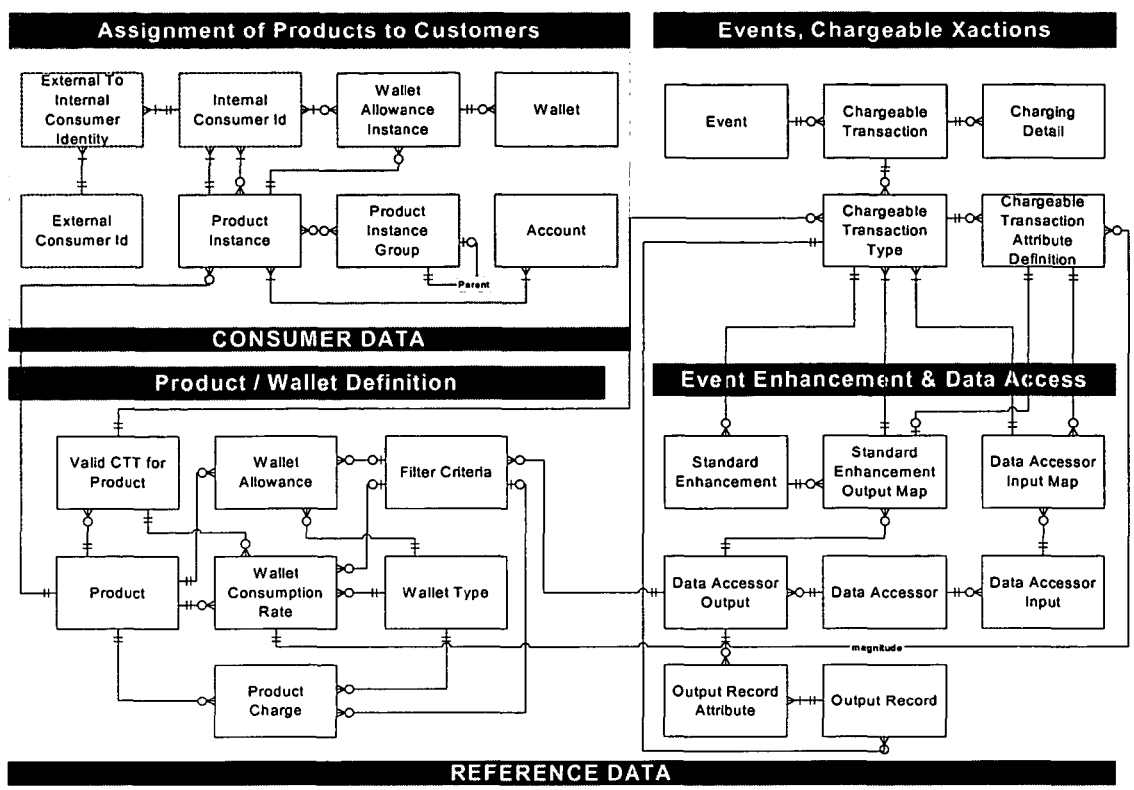
FIG. 12 diagrams the assignment of products to consumers and the associated relationships between product/wallet definition, events and chargeable transactions, and event enhancement and access.

Referring to FIGS. 2 and 12, the principal concepts of the Data Model are:

a. Wallets: Represent time bound resources with an arbitrary unit. For free minutes/units/money/widgets.

b. Products: Specifies the periodic replenishment of a wallet and the consumption rate from a wallet. Consumption rate designates conversion between event units to wallet units.

c. External/Internal Consumer ID: The external consumer ID may be the network identity and may be related to an internal consumer ID (one external to internal at any time).

d. Consumer ID has Product Instance: The internal consumer may be assigned products that define consumption from wallets.

e. Consumer ID has Wallet Instance: Separate relationship to a wallet so that multiple products may share a single wallet. Wallet instance does relate to a product that defines the replenishment for it.

f. Product Instance Group Relates to CRM Entities: Product instance group may be flexible means for mapping the CRM definition of consumer structure to the system (900). Grouping may be related to product instance which carries external identifiers to connect to CRM. It may represent person, organization, region, place, equipment or however the CRM structures information.

g. Event/Chargeable Transaction/Chargeable Transaction Type: Event may be envelope for repeating group of chargeable transactions. Chargeable transaction type defines attributes for a chargeable transaction.

h. Event Translation/Enhancement: Raw input records are turned to event envelopes with skeletal chargeable transactions based on plug in. Chargeable transaction type defines standard enhancements done based on data accessors. Rate factors and Output Records connect to data accessors with input map context determined by the chargeable transaction type.

i. Configurable Outputs: All vertical market data delivered through Data Accessors (see, FIG. 1). Context for the input maps for a data accessor may be the chargeable transaction type. Simple cascade model allows use of Data Accessor based on output from another Data Accessor (and may not be based on context). Content of output may be defined in "Output Record" and this may be generated from real time rating and billing.

j. "Logical" application and database partitions: The "logical server" tags the affinity for a segment of the system (900) processing. This logical identity may be associated with parts of the consumer data model in order to drive distribution of work for the application. For example may have a "logical consumer server" and a "shadow wallet server".

Products define how consumers are charged for services (events) through valid chargeable transaction types. These charges are tracked to wallets. Wallets may represent monetary resources but also may track "free" units of use that are periodically allocated (or allocated on a one time basis). The wallet may be the identity of a "charge bucket" for tracking charges of an arbitrarily defined currency. Products define charges for events through the identification of chargeable transactions on the event. Product charges also specify wallet consumption for non-event based charges. Filters specify the criteria for applying charges, wallet replenishment, and consumption. Wallet Allowance defines periodic or event triggered replenishment of a wallet. Wallet Consumption Rate defines the use of Wallet Units by chargeable transactions (e.g., it defines an exchange rate between event and wallet units, filters for conditional application of a consumption rate, prioritized to allow priority consumption from wallets, and allow "cascaded" application of consumption to wallets.

Events provide the envelope for delivery of charges/chargeable information from external systems. Events are related to different external sources through the event type. External Consumer ID may be stored on the Event and mapped to the active Internal Consumer ID for the Event. Raw event information may be transformed into ratable transactions (Chargeable Transactions) through plug-in code associated with the Event Type. Event analysis (tied to an Event Type) creates Chargeable Transactions on an Event. Chargeable Transactions are tagged with a Chargeable Transaction Type. Content of a Chargeable Transaction may be defined for each Chargeable Transaction Type. Additional reference or consumer data may be added to chargeable transactions through event enhancement. Rating filter criteria, invoice presentation, external outputs require information that may not be directly available on an Event/Chargeable transaction but which may be easily derivable from information on the event. Event enhancements are implemented through a combination of configured plug-ins and Data Accessors.

Assignment of Products to Consumers

The external consumer identifier may be delivered on event records and may be associated to an internal consumer identifier through the External-to-Internal Consumer Identity Entity (mapping process) Product Instances are assigned to the Internal Consumer Identifier through the Internal-Consumer-ID-Has-Product Instance. A separate independent path from an Internal Consumer ID to Wallet Allowance supports independence between the assignment of wallets that can be drawn from and the products that define consumption from those wallets. The current resource/allocation of a wallet may be tracked with the Wallet entity.

There may be an adaptive partitioning of Internal Consumer Identifiers to balance the load of consumer identifiers served by consumer servers and stored on the Logical Consumer Server. The Logical Database Server maps an Internal Consumer Identifier to a database partition. Internal Consumer Identifier may be assigned Wallet Allowance Instances through Internal-Consumer-ID-Has-Wallet-Allowance Instance.

The wallet may represent the periodically replenished Wallet Allowance such as monthly free minute wallet contains the initial quantity of minutes, the resource of available minutes, and the effective/expiration dates for the minutes.

Auditing and Revenue Assurance

Figure 15:
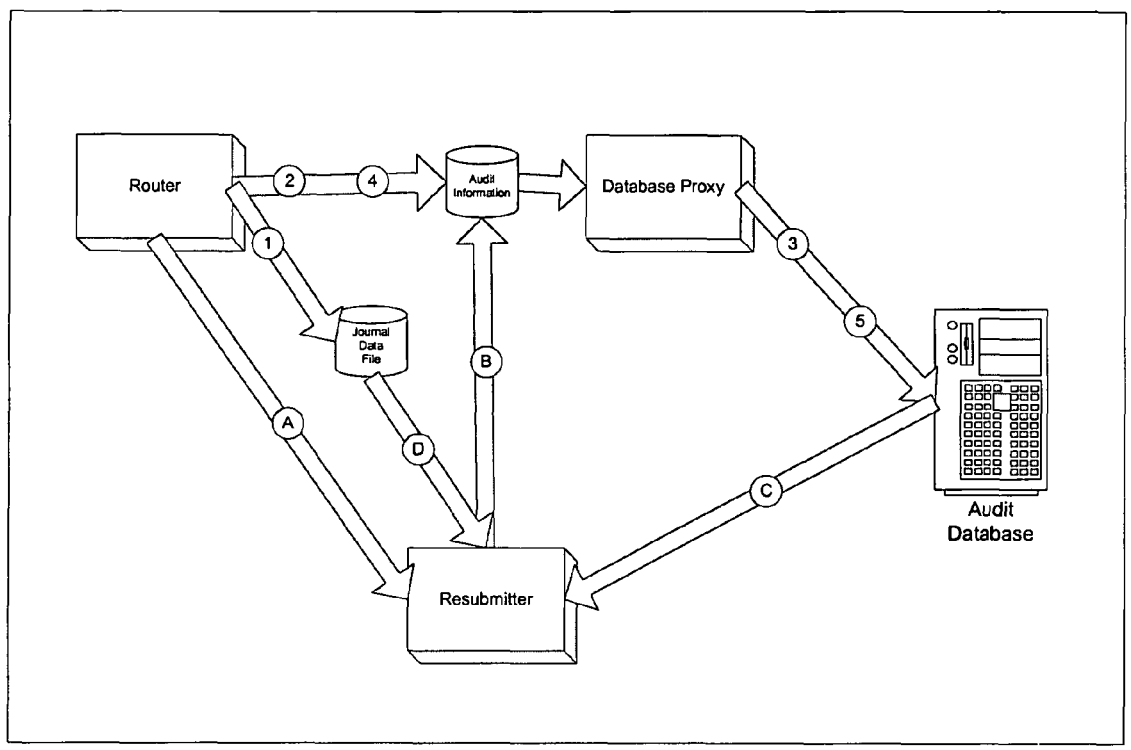
FIG. 15 illustrates the revenue assurance mechanism for the ingress of Network and API Requests.
Figure 16:
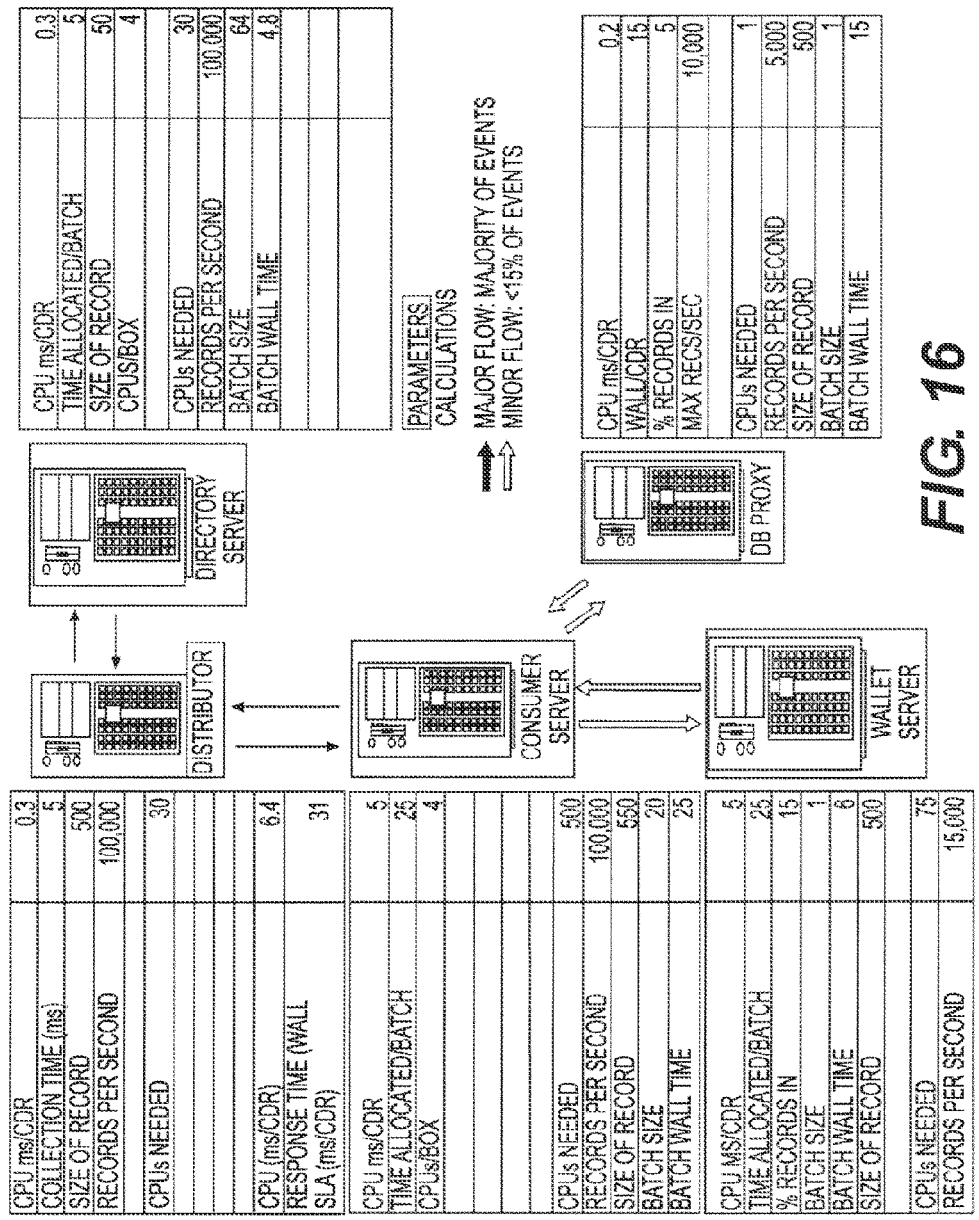
FIG. 16 illustrates interactions between a distributor, consumer server, wallet server, directory server and DB proxy.

FIG. 15 illustrates the revenue assurance mechanism for the ingress of Network and API Requests. Under normal circumstances, the Resubmitter is not involved. The Distributor initially journals its input to a file (see #1). Then, an audit trail may be created and the status may be set to 'In Progress' (see #2 and #3). Once all records in the audit have been processed, the audit trail may be updated to a 'Complete' status (see #4 and #5). An alternate embodiment may merge the resubmit functionality into the Event Manager. The Distributor then writes a file of events that must be reprocessed and this may be submitted to the event manager in a log file (in a similar manner to the log file written by the Consumer Server). The common file tracking and control system within the Event Manager can then filter and export those events that can not be reprocessed (were subject to fatal errors), and queue events for reprocessing back to the Distributor (the Event Manager already having such a path to allow the processing of events which are derivative of the original event— e.g. settlement).

In a preferred embodiment, the system (900) may be designed to be continuously available and fault tolerant. This includes automatic fail-over of work from one processing node to another. If a processing node fails, its work may be immediately distributed between the remaining nodes or re-allocated in its entirety to a stand-by node. Assuming the operator has not chosen for a fully redundant deployment, the effect on overall system performance (and impact to SLAs) will be limited to the partition of the workspace being processed by the failed node therefore authorization latency will only increase for a small percentage of the consumer base.

Only under failure scenarios may the Resubmitter be involved. If an individual record fails, the Resubmitter may be notified and the audit may be updated when complete (see #A and #B).

If the system (900) Distributor fails, the Resubmitter queries the database for all audit records 'In Progress' for the failed Distributor. All of the information may be extracted from the Journal Data File and may be resubmitted to an alternate Distributor (See #C and #D). The system (900) relies on its duplicate checking facilities to correct the partial completion of records.

There may be a fundamental need to audit the flow of data into and out of the system (900). This may be a fundamental need for revenue assurance. Input audits should support re-request of information and output audits should indicate the delivery of information to external systems and provide some tractability of outputs to real time rating/invoicing activities in the system (900). Audits for internally invoiced events must prove that all received billable events were, in fact, invoiced. To achieve this, an audit record may be maintained, the audit record may be a set of at least one work ticket that may be created on the receipt of an auditable batch of events by the system (900). As events are routed to unbilled pools an audit of the distribution of these records may be created. This audit must balance with the total of received records that are recorded in work tickets. Events allocated to an unbilled event pool are guided to accounts. When this is done an audit recording the number of unbilled events may be stored— indicating the number of unbilled events in the event pool for the account. The majority of output from the system (900) may be delivered in output files. These outputs could include data delivered to commissions systems, resellers, settlement systems, outcollect records, etc. The flexible output audit provides a mechanism for recording outputs intended for delivery to an external system and acknowledgement of receipt from the external system.

Wallets

Providing a reliable high performance recoverable mechanism for shared resource management may be one of the central challenges in the implementation of any real time rating/authorization system. In a preferred embodiment, Wallets (250 . . . ) generalize this resource tracking on one simple concept. Wallets (250 . . . ) are usable for real time/near real-time free minute tracking, unit based rating, any arbitrary currency (such as reward points or arbitrary internal units), real time/near real-time monetary resource limit management, event pre-authorization, free unit/monetary resource notifications and real time promotion delivery. These capabilities are implemented so that a large number of consumers (as needed for corporate/reseller/settlement accounts) can share a single resource and have this resource tracked in real time.

Referring to FIG. 2, Wallets (250 . . . ) may be created when a consumer buys a Product (210) which entitles them to a Wallet Allowance (220). This figure illustrates a Product (210) with a Wallet Allowance (220) and Wallet Consumption Rates (230) for a Free Minute Wallet (230). This diagram also illustrates the validity period for the Wallets (250 . . . ) associated with the Allowance (220). Each Wallet (250 . . . ) may be valid for two months, so during February both the January (250) and February (251) Wallets can be used.

Consumer IDs are used within the system (900) to model the identifier of the service user. Examples of Consumer IDs include the following as well as equivalent identifiers: phone number, e-mail address, social security number and credit card number. The system (900) models the relationship between Consumers and wallets explicitly. Thus a Wallet (250 . . . ) will have a list of Consumer IDs which can consume from it, and similarly, a Consumer ID will have a list of Wallets (250 . . . ) which it can consume from.

In alternate configurations we may have different classes of consumer drawing from the same Wallets (e.g. account) but where we want to guarantee the response time of a subset of those consumers. In this case we nominate some number of the logical partitions as requiring a better service level agreement. The key consumers (or a subset of products associated with the consumers) are then assigned to these logical partitions, and the remaining customers/products to other logical partitions. The partitions requiring the higher SLA can assigned priority compute and/or communication resource and the Wallets then allow the standard and priority to share resource. Typically this would then result in a physical configuration with 'high' and 'low' priority Consumer Servers each having Wallet fragments from the same wallets.

Event rating applies charges to wallets using the following high-level algorithm:

a. Wallets (250 . . . ) assigned to this Consumer ID are retrieved.
b. Consumption Rates (240) assigned to this Consumer ID are retrieved.
c. Chargeable transactions from the Event are considered in turn, the Consumption Rates (240) are filtered based on the chargeable transaction type.
d. Wallet Consumption Rates (240) are evaluated in priority order.
e. Applicable Wallet Consumption Rates (240) deduct from the appropriate Wallet (230) based on the Wallet Type (230) of the Wallet Consumption Rate (240). Such deduction may only proceed when wallets are distributed—where there may be sufficient loan in the wallet to cover the usage.

For example, consider a simple post-paid price plan of 100 minutes/month and 30 text messages/month. Overage minutes are $0.30 and overage text messages are $0.10. This may produce three Wallets (250 . . . ) for that consumer; two of which have monthly allowances: Voice Wallet (230) with 100 minutes allocated monthly, Text Message Wallet (230) with 30 SMS allocated monthly, Cash Wallet (230) with no monthly allowance. Four different Wallet Consumption Rates (240) may apply: Voice Chargeable Transaction Types against Minute Wallet, SMS Chargeable Transaction Types against SMS, Voice Chargeable Transaction Types that consuming $0.30/60 seconds against the Cash Wallet, SMS Chargeable Transaction Types that consuming $0.10/SMS against the Cash Wallet.

A key separation in the system (900) may be the partitioning of the rating process within the Consumer Server (925), and the management of Wallets (250 . . . ) within the Wallet Server (940).

Again this partitioning may be intended to deliver 'best of both worlds' flexibility: for simple residential consumers all processing for a particular account may be delegated to a single Consumer Server (925) with occasional interaction with a single corresponding Wallet Server (940). For large accounts and complex consumer relationships, multiple servers can interact with distributed sharing of bundled usage and distributed resource management without any of the significant cross rating engine interaction seen with current generation billing systems.

Wallets (250 . . . ) may be managed (e.g. created, stored and accessed) by the Wallet Server (940). Alternate embodiments may permit this functionality by the Consumer Server. The Wallet Server (940) holds the values associated with individual wallet instances (250 . . . ), though attributes of a particular wallet are held as common reference data. A number of Consumer Servers (925) may access a single wallet in a wallet server (e.g. large resources and bundled allowances) through the creation of Shadow wallets on each Consumer Server (925), preventing contention for single resource values.

Where a Wallet (250 . . . ) has a limited resource value shared across Consumer Servers (925) then there may be an internal loan mechanism that partitions the bundles across the servers. There are then both proactive and reactive mechanisms to redistribute the 'unused' part of the wallet. The proactive mechanisms will anticipate subsequent requests and try and ensure that the loan management mechanism may be rarely in the latency path. The reactive mechanisms handle exceptional requests and where the final fragments of a wallet allowance have been recovered to the Wallet Server (940) in anticipation of the final request that will exhaust a Wallet (250 . . . ).

Figure 3:
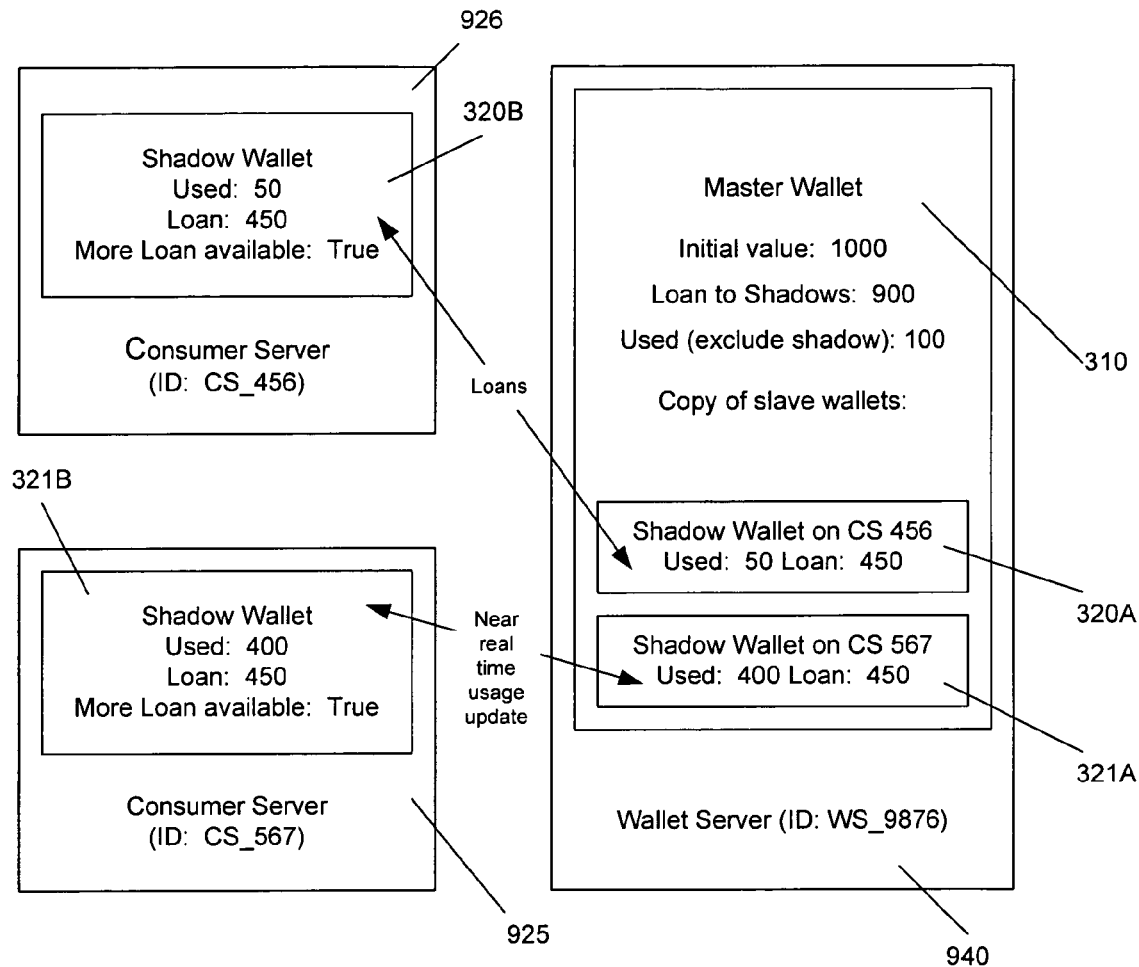
FIG. 3 demonstrates a preferred embodiment which utilizes shadow wallets to partition a resource across multiple servers.

Referring to FIG. 3, in an embodiment, a Consumer Server (925) may access a Shadow wallet (320 . . . ) created by the Wallet Server (940) in the Consumer Server (925). If a Consumer Server (925) fails, the Wallet Server (940) may recover any resource from that failed Consumer Server (925).

In this example, the Master Wallet (310) may have an initial value that can be consumed of 1000 min. The Master Wallet (310) has a 'used' value of 100 minutes that may be not associated with any Consumer Server (925). This may be the usage that was associated with the failed Consumer Server (925). On failure of a Consumer Server (925) the journalized usage in any Shadow wallet (320 . . . ) may be 'emptied' into the master wallet, and any unused loan value may be recycled. There may be therefore 900 minutes that can be loaned and consumed by Shadow wallets (320 . . . ) within the Consumer Servers (925-6). In this case 450 minutes has been allocated to each of the Shadow wallets (320 . . . ). The Consumer Servers (925-6) can therefore consume locally up to 450 minutes without reference to the Wallet Server (940).

A 'more loan available' flag may indicate to the Consumer Server (925) that there may be more loan available. For example the Consumer Server (925) could receive a request for 100 minutes and then reactively ask the Wallet Server (940) for a larger loan. If this flag may be cleared then the request for additional loan to the Wallet Server may be suppressed.

Thresholds (alerts) may also use the loan strategy, by setting a 'false' lower loan limit. For example, if a user has 1000 minutes across a number of Consumer Servers (925), the Wallet Server (940) may act as if the wallet limit was only 900 minutes and, when that limit may be consumed or substantially consumed (including any inter-consumer reallocation that may occur), the Wallet Server (940) may generate an alert and then release the final 100 minutes. Where only one shadow wallet exists, the wallet server will delegate threshold detection to the consumer server, and the consumer server will alert the wallet server once a limit may be exceeded.

As the Wallet Server (940) receives near real-time copies of the shadow usage, the Wallet Server (940) can also proactively redistribute the loans between Consumer Servers (925) prior to event arrival.

Each Wallet in the Wallet Server may exist in at least two states:

i. Open: Wallet fragments are or may be activated for this wallet.
ii. Closed: All wallet fragments have been consolidated into the wallet, and no further wallet fragments may be generated.

Figure 4:
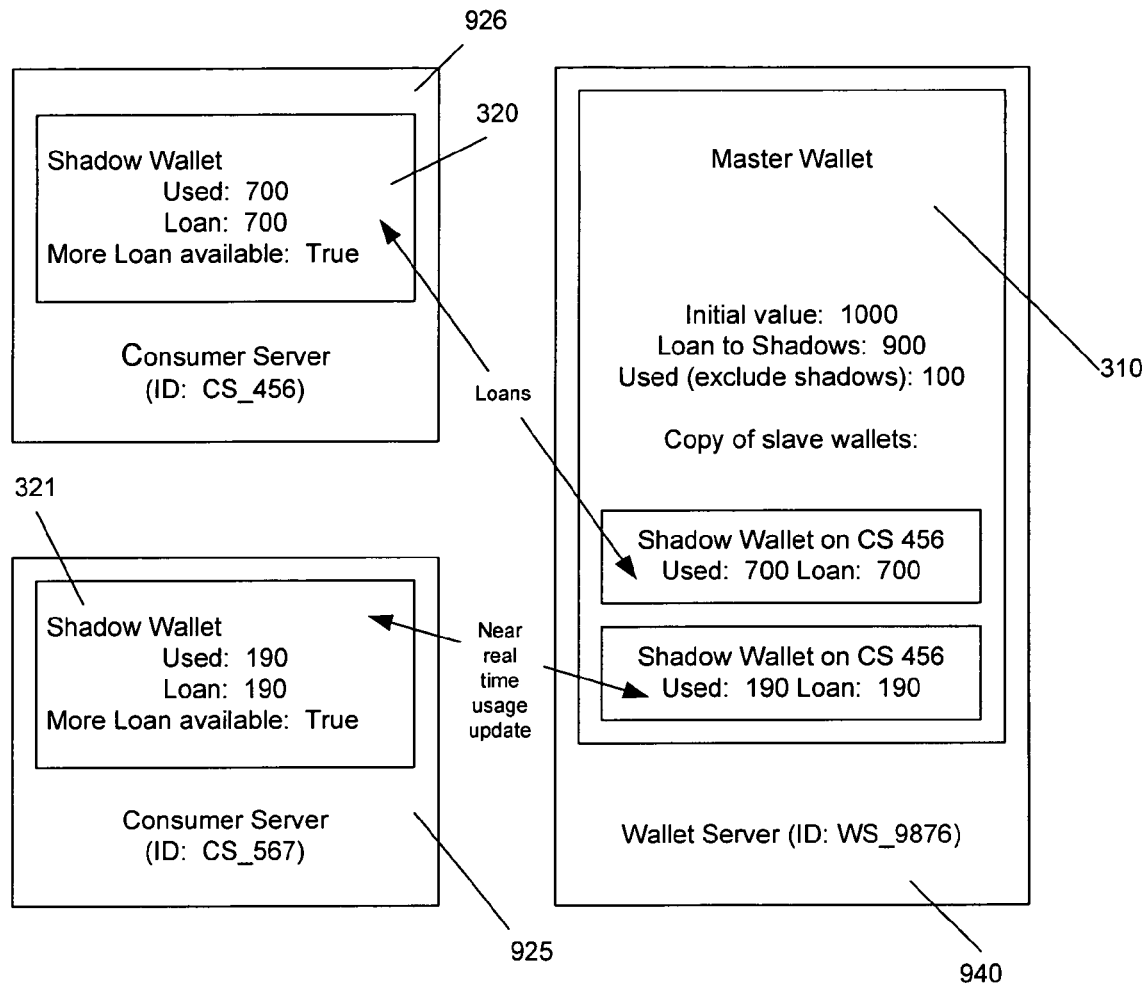
FIG. 4 demonstrates a follow-up to FIG. 3 after a number of events have been processed by the system.

Referring to FIG. 4, an illustration of one embodiment shows the state of the wallets after a number of events. In this case as only 10 minutes of the wallet was left (1000 minutes—100 minutes in master wallet—890 minutes in Shadow wallets), the Wallet Server (940) has proactively reduced the loans on each Shadow wallet to match their usage. The 10 minutes remaining may be now held centrally and requests for any more usage (loan) must be referred to the Wallet Server (940). The Wallet Server may be also up-to-date on usage in case of a logical server failure.

Then if the final call to consume the wallet of 10 minutes arrives, the Consumer Server (925) will request an additional loan to cover the 10 min, and then the 'more loan' flags in the Shadow wallets are both set to false by the Wallet Server (450)—the Consumer Server (925) then knows that the wallet may be exhausted even though the Consumer Server (925) never knew the total that could be consumed from the wallet (310).

Fragmented Wallets

Wallet Server (940) provides lifetime control over the distributed loans and resources on the Consumer Servers (925, 926), through the control and backup of the shadow wallets (320, 321) on the Consumer Server (925, 926).

Key Schema Entities

Figure 45A:
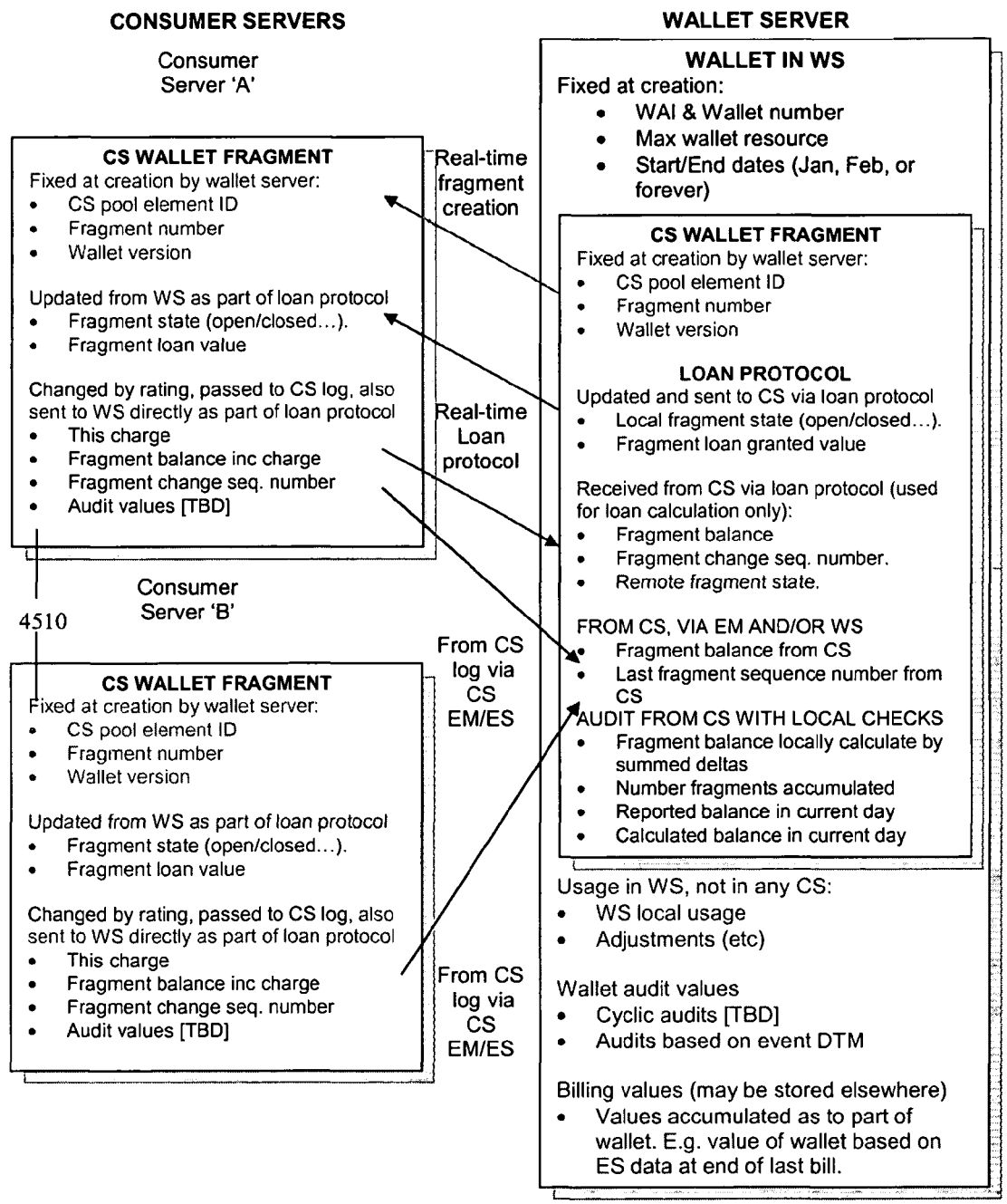
FIGS. 45A-45B illustrates an embodiment of the relationship between the Wallet Server and Wallet Fragments.
Figure 45B:
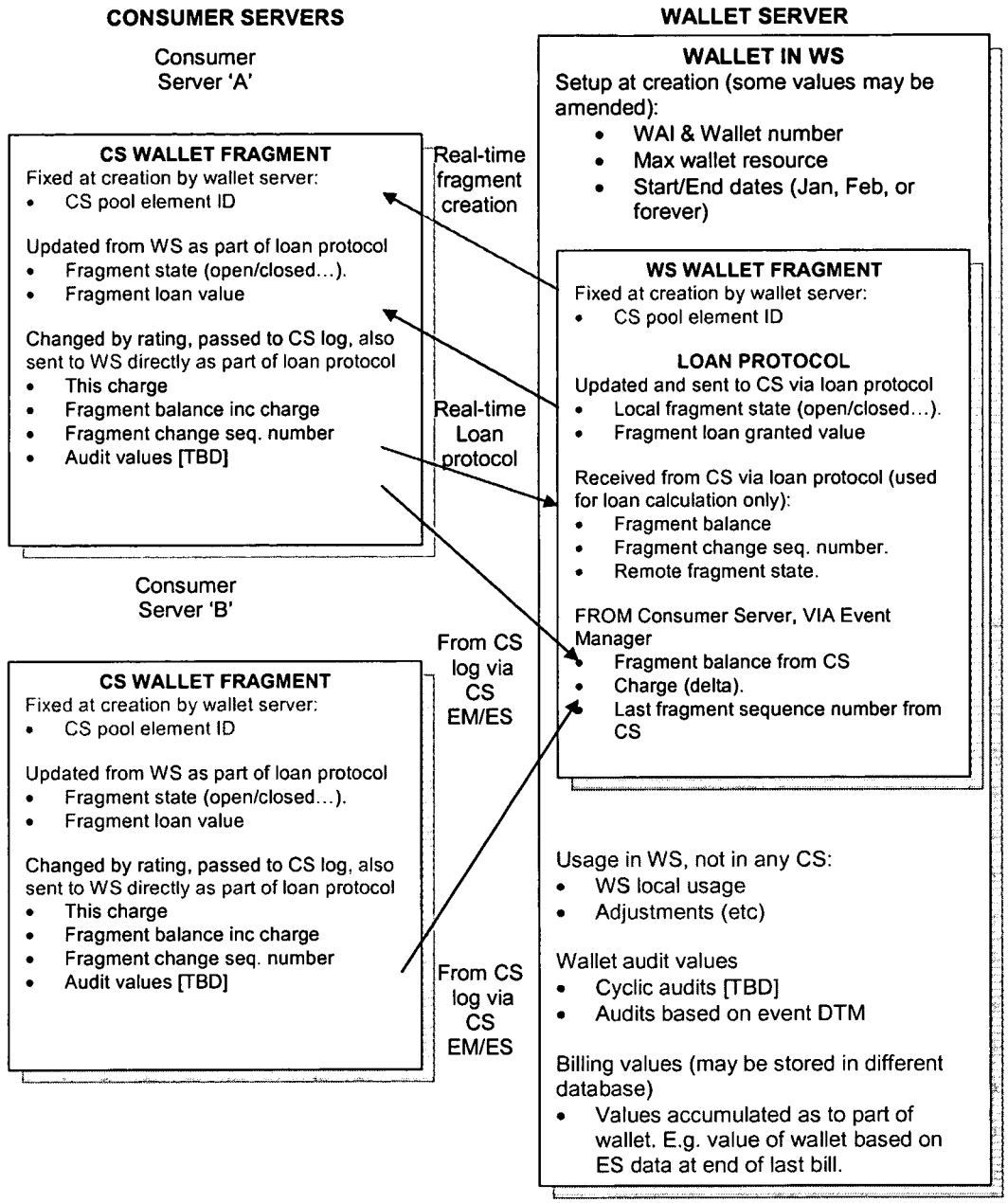
Figure 46:
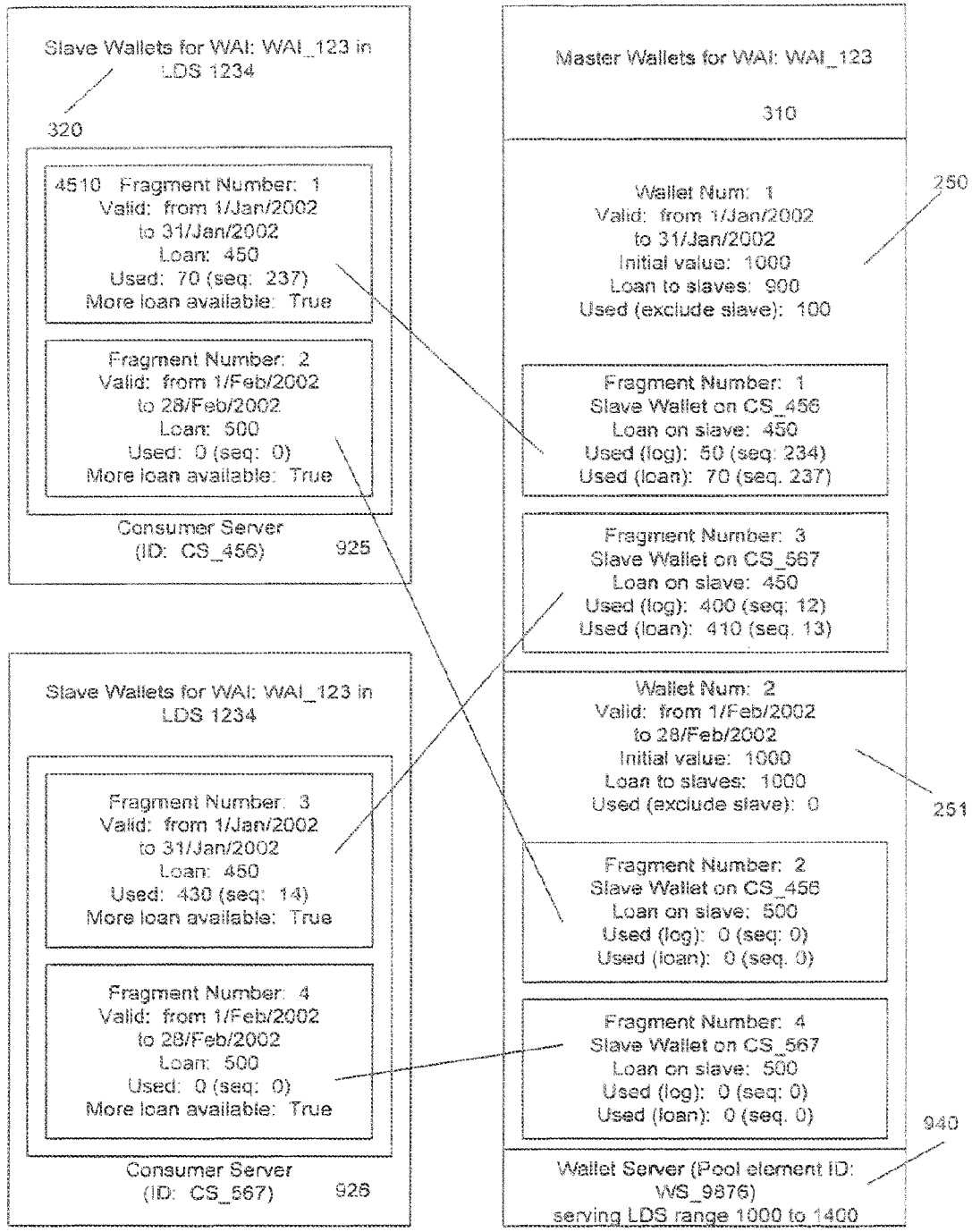
FIG. 46 illustrates an embodiment of the allocation of fragments between Master Wallets and Shadow Wallets.

Referring to FIGS. 45A and 45B, embodiments of the Wallet System (900) may include:

WalletAllowanceInstances (WAI): These may be created when a customer buys a Product (210) (and therefore gets a ProductInstance). The customer may receive a WalletAllowanceInstance for each WalletAllowance (220) which the Product (210) entitles them to.

Wallet: A WalletAllowanceInstance may result in many Wallets (250 . . . ) over time. For example a WalletAllowanceInstance of 100 minutes per month, each valid for 3 months would result in one wallet of 100 minutes each month. E.g.
January wallet—100 minutes, valid for January, February, March.
February wallet—100 minutes valid for February, March, April Wallet Fragment (4510). When a loan may be made against a particular Wallet (250 . . . ) (from the Wallet Server (940) to a Consumer Server (925)) a Wallet Fragment (Shadow Wallet on the Consumer Server) record may be created. A single wallet fragment (4510) may be therefore used by a single Consumer Server (925) to accumulate rated usage on behalf of a single Wallet (250).

Wallet validity (the ability to consume from a wallet) may be aligned with event date and time.

New Wallet Fragments (4510) may be generated by the Wallet Server (940) and sent to the Consumer Server (925) with zero resource.

More than one Wallet Fragment (4510) for the same Wallet (250 . . . ) can co-exist in a Consumer Server (925) at any one time, but, in a preferred embodiment, only one Wallet Fragment (4510) will be open for usage (and therefore will be passed to the Consumer Server rating code at a time).

The 'loans' in a Wallet Fragment (4510) may be greater than the usage. That is, the spend may be covered by a loan, however, there may also be a scenario where a charge has been forced onto the Wallets (250 . . . ) in excess of the loan by the rater.

The Wallet Fragment (4510) may be linked to the Consumer Server pool element ID, rather than the Consumer Server.

New wallet fragments may be generated by the Wallet Server sent to the Consumer Server with zero balance (in an alternative embodiment, wallet fragments may also be parked from the Consumer Server onto the Wallet Server—when wallets are 'unparked' they are returned to the Consumer Server with their parked value 'usage' value). Wallet parking may be used in place of closing a wallet.

Wallet fragments may be destroyed in the Wallet Server at least when
(1) The associated wallet may be closed.
(2) The associated Consumer Server has terminated, and all of the wallet fragment updates written by the Consumer Server to log file have been processed by the Event Manager and Wallet Server.

Wallet fragment state may be stored on:
1. Local view of the Wallet Fragment state within the Consumer Server.
2. Local view of the Wallet Fragment state within the Wallet Server.
3. Last reported Consumer Server wallet state as passed in the most recent real time request from the Consumer Server to the Wallet Server.

The 'master' copy of the Wallet Fragment state may be held by the Wallet Server. Under normal conditions, the Wallet Fragment state in the Consumer Server may mirror the Wallet Server (there may also be a transient state when parking a wallet where the Consumer Server state may lead the Wallet Server state).

Processes

Referring to FIGS. 47A-D, an embodiment is illustrated of the interactions occurring in a wallet infrastructure distributed between a Consumer Server (925) and a Wallet Server (940).

Figure 47A:
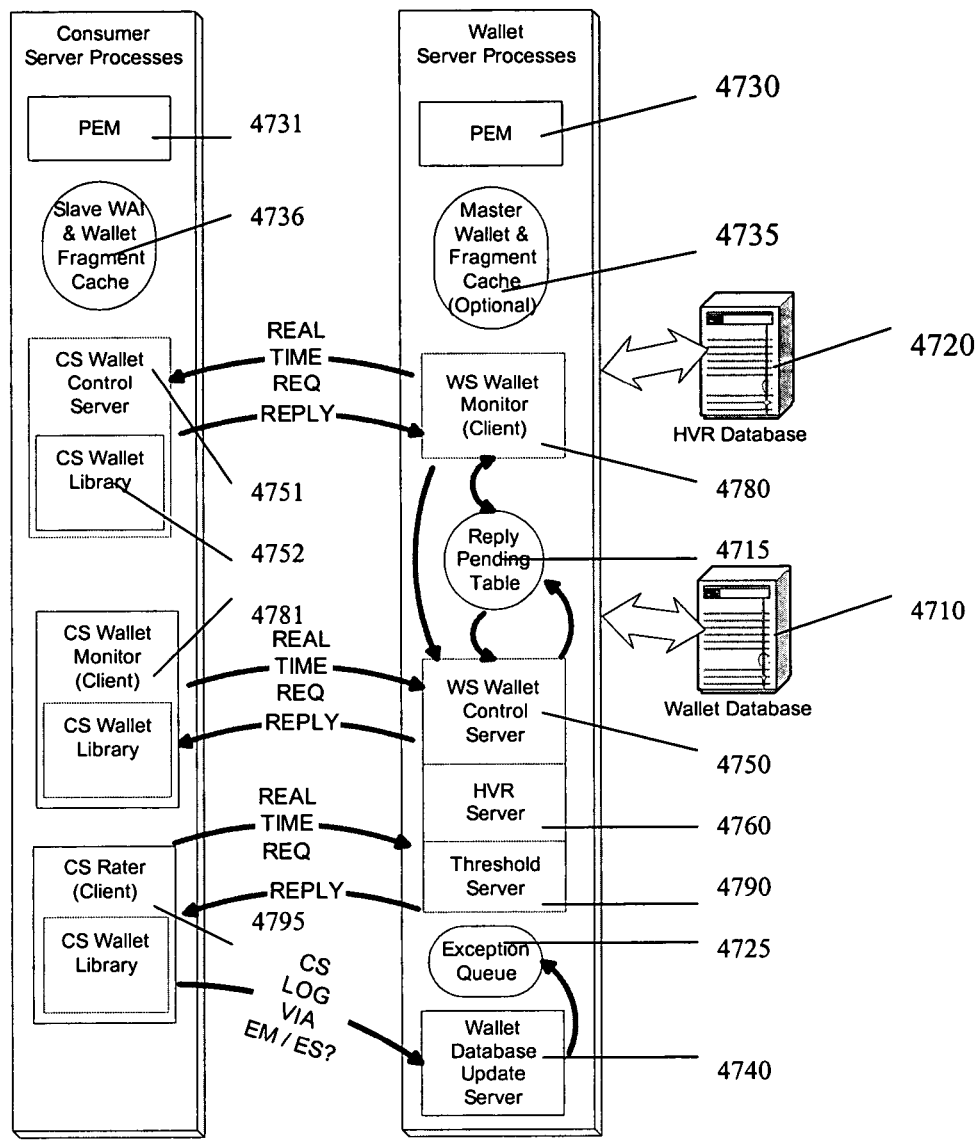
FIGS. 47A-D illustrates an embodiment of a wallet infrastructure including consumer server processes and wallet server processes.

In FIG. 47A, the Wallet Database (4710) may be a conventional relational database that may be used to hold Wallets (250 . . . ), together with near-real time copies of the associated Wallet Fragment (4510), and any copies of wallet fragment audit resources from the Consumer Server log files. The Wallet Database (4710) may also keep transaction watermarks for the events that have been loaded into the Wallet Server (940) for each Consumer Server (925). The Wallet Database (4710) design may anticipate migration to a lower cost transactional, non-relational database. The Wallet Database (4710) may be on the same physical machine as the other Wallet Server (940) components or be a separate machine in a conventional database HA configuration.

The High Value Reservation Database (4720) may comprise a high value reservation database. This may be initially physically part of or separate from the Wallet Database (4710).

Wallet Server Processes

The Wallet Server PEM controls the Wallet Server. The WS-Wallet Database Update Server may read wallet updates from the Consumer Server (directly, or via an Event Manager) and apply these updates to the Wallet Database. The Wallet Database Update Server may create and update the fragment record portions containing the committed spend. Additionally, the WS-Wallet Database Update Server may write to a wallet update exception queue (persistent store or database table) where updates have failed, events lost, out of sequence, or where Consumer Servers have closed. The server may be robust enough that it may be stopped at any time and be re-started keeping transactional watermarks in the Wallet Database. Code upgrade may be via stopping and restarting the current process. While not latency critical, the server may be preferably high-performance as, in a worst case, each event may result in a number of wallet updates. Given the high update rates and the narrow API to the Wallet Database it is anticipated that the WS-Wallet Database Update Server will update the Wallet Database via a very simple database access library that will be developed and linked on a per database vendor basis.

The WS Wallet Control Servers comprises a subset of the loan manager. Multiple copies of this server process requests from the Consumer Servers via the PEM to create and return wallets and to change loans on wallets (and other functions). The server may also process requests from the Wallet Server Wallet Monitor running within the Wallet Server. Some requests from a Consumer Server may trigger on-demand wallet generation and wallet fragment generation as well as requests being sent to other Consumer Servers. Each consumer request received may cause one of the following actions:
1. Simply update tables within the Wallet Server.
2. Generate a direct reply (acknowledgement) to the caller (typically a Consumer Server) if the request can be immediately completed (e.g. create a new wallet, or change a loan where sufficient loan may be available in the wallet).
3. Send 'dependent' requests to other consumer servers, and then on completion of these requests, return a message to the Consumer Server.

WS-High Value Reservation Server may comprise a server process that persists (and on request deletes) high value reservations on request from Consumer Servers.

WS Wallet Monitor may undertake the pro-active control of wallets, acting as clients to control other wallet control server processes. The WS Wallet Monitor processes may not be driven by external message queues but they may read and process the wallets database, and other in-memory control tables (e.g. Wallet Server reply pending table, and wallet update exception queue) driven off timers. None of these pro-active processes are in a low latency path. They may invoke server functionality in other parts of the Wallet Server, or Consumer Server to control and modify wallets. The Consumer Server may also have wallet monitor functionality.

Finally some control process may register with (at least) the Consumer Server work manager to be able to detect Consumer Server failures, and to be able to be able to detect changes in the LDS ranges for a particular Wallet Server. The functions undertaken may include:
i. Proactive creation of WAI, wallets, and wallet fragments;
ii. Pro-active cache of per WAI information needed by the Wallet Server;
iii. Pro-active creation of wallets in the Wallet Database (and Wallet Server cache);
iv. Pro-active creation of wallet fragments on Consumer Server (typically where an existing fragment in a high run rate wallet will shortly expire);
v. Pro-active creation of wallet fragments on a backup Consumer.
vi. Old wallet recovery/deletion (wallets where no additional usage may be anticipated). [Set a rule that if date now>x days past end valid date of wallet];
vii. Low run-rate wallet retrieval from the Consumer Server. [Wallet not used for . . . X days, only 1 event this months];
viii. Corrupt wallet detection and recovery.
ix. Pro-active balance of loans between CS where fragments exist on multiple CS.
x. Background wallet consistency checking
xi. High value reservation timeout.
xii. Collapse of closed wallet fragments (where all log file fragments have been received) into the core wallet. Move fragments into old wallet fragment table.
xiii. Wallet and Wallet Fragment Cache in-memory cache purging to Wallet Database (LRU).
xiv. Complex loan request monitoring. The process monitors the Wallet Server reply pending table to ensure that all complex Consumer Server requests are processed in a timely fashion; so that all open requests can be closed (the Consumer Server will run independent timers to timeout a request).
xv. [INC WAI valid date in CS may be all earlier wallets exhausted . . . also bitmaps on wallet fragments for validity].
xvi. Send balance value to allow CS to cache balance.

There may also be a WS Threshold Server, WS Balance Query, and WS Wallet Memory Cache. The WS Balance Query processes all external balance requests received by the Wallet Server. Some of these requests may be passed to Consumer Servers for processing. The WS Wallet Memory Cache may provide in-memory cache for wallets, and wallet fragments.

Consumer Server Processes

The Consumer Server PEM controls the Consumer Server.

The CS Wallet Library may be bound into the rating process, (and all other tasks invoked from Consumer Server needing access to wallets or to process messages from the Wallet Server). The library may encapsulate all of the Consumer Server wallet and wallet fragment cache, low value reservation cache, while providing all the locking to protect these caches. The LVR cache may be memory based only and may not be persisted in the case of a Consumer Server failure. The library may send requests to Wallet Server. The rater may then normally push the event or request being processed into a 'pending' list until the reply may be received by the CS Cache Updater. Each request will contain an ID generated by the rater process to allow any replies to be correlated with the requesting event.

The CS Cache Updater may process requests and replies generated by the Wallet Server updating the Cache. The updater process may also receive any correlations allowing the Consumer Server to 'unlock' the pending event for reprocessing. It may also generate replies to requests from the Wallet Server.

The CS Wallet Monitor may perform those functions not processed by the Wallet Server Wallet Monitor such as:
i. Generation of requests to return wallet fragments to the Wallet Server for a controlled Consumer Server shutdown.
ii. Freeing of cache memory where the corresponding fragments have been acknowledged as 'destroyed' by the Wallet Server can be freed in the Consumer Server memory.
iii. Request updates to wallets and WAI that have their cached values marked as invalid.
iv. Corrupt wallet detection (e.g. CRC/checksum error on cache entry) and recovery (return of wallet to Wallet Server, with a 'probably corrupt' flag set).
v. LVR timeout. This may be exception processing. LVR timeouts should be logged, with the reservation value or other measure to estimate lost revenue.
vi. Least recently used return of wallet to make space in cache for new wallets.

The CS Balance Query may process all external balance requests received by the Consumer Server.

WS Support Libraries

The Wallet Generation Library may be invoked by reactive and proactive parts of the Wallet Server to generate both new wallets and new wallet fragments.

Consumer Server Failure Recovery

The Consumer Server & Wallet Servers may be deployed in a number of configurations allowing different price performance tradeoffs.

Most recovery scenarios may follow this principle: Work may be moved from one Consumer Server to another. Dependent on the deployment options below, the varying amounts of data (reference data, customer data, and wallet fragments) may have been preloaded into the 'new' Consumer Server minimizing the failover time.

Additional protection can be implemented in the system during failover to reduce the overall load on the Consumer Server. For instance, the Distributor may be programmed to only propagate requests requiring a real time response to the Consumer Server during failover. Those requests which can be filtered and delayed may be passed by the Distributor directly to resubmission storage to be processed.

A number of different configurations (not intended to be an exhaustive list) are presented in the following sections.

Recovery Operation Overview

When a Consumer Server fails the Wallet Server may execute a recovery process (supported by the File Control Database and Application Control Database—collectively, the system) as follows (Consumer server 'A' may be the failing consumer server. Consumer server 'B' will take over the work):

The Wallet Server may continue to read any committed wallet changes written to the Consumer Server 'A' log file (passed to the Wallet Server via the Event Manager). If the Consumer Server suffered a fatal error the Consumer Server 'A' log file may not contain any 'failed' or 'reset' marker.

Once the Work Manager/ACD detects that the Consumer Server has failed, it may re-route requests to the replacement Consumer Server ('B') and publish that Consumer Server A's failure to the Wallet Server (The Wallet Server may have a list of all of the active and recently active Consumer Server Pool IDs. This may be published to the Wallet Server from the Work Manager/Application Control Database complex). The Wallet Server can then change its wallet loan allocation strategy to include an 'emergency' overdraft for Wallet Fragments created on replacement Consumer Servers. At this point in time the loans previously made to the failed Consumer Server 'A' may not be released.

Consumer Server 'B' may demand request new wallet fragments to support the new event stream (though in many cases the Wallet Fragments will have been preloaded into the replacement Consumer Server—see below). The loan allocations given to Consumer Server 'B' at this point may be pessimistic, however the 'emergency overdraft' may be set on certain wallets to allow an overdraft while the usage on Consumer Server 'A' may be unclear.

In an embodiment, the Application Control Database/File Control Database notifies the Wallet Server that Consumer Server 'A' has terminated. The log files for Consumer Server 'A' pass through the Event Manger. The log files from Consumer Server 'A' are consumed by the Wallet Database Update Server. Finally, the Wallet Server will have recorded the closing usage for all of the Wallet Fragments. The Wallet Server can release the loans associated with the failed Consumer Server wallet fragments. The returned loan value being the loan that was on Consumer Server 'B' less the closing spend on Consumer Server 'B'. The returned loan operation may also release any 'no more flag' that has been propagated to Consumer Server 'B' so that Consumer Server may be aware that more loan may be available. At this time any overdrafts may also be removed.

Repartition Work Across Existing Servers

In this embodiment, the work on the failed Consumer Server may be re-partitioned across existing servers and each Consumer Server will demand load the additional customer data and wallet fragments. On failure, this may be a simple and effective strategy as the overhead of loading customer data may be spread across the existing Consumer Servers. A GUI may also allow the load to be directly manipulated.

Note that exactly the same mechanism can be used to take a Consumer Server out of operation for software or hardware upgrade. However for controlled switchover it may not be necessary to switch all of the traffic from one Consumer Server to another—the failover can be undertaken over a number of seconds or minutes switching one or more logical partitions (LCS partitions) at a time and optionally providing the destination Consumer Server additional messaging that it can pre-load any data for a number of LCS before the event traffic may be re-routed by the Distributor.

Basic N+1 Standby

An idle machine may be kept and a partition may be moved onto the idle machine. This is not the same as traditional failover as wallets are not copied between the server, rather, new wallets are created. In this mode there may be a spare Consumer Server machine in a ready-to-run state (operating system loaded, Consumer Server tasks running but idle, and common reference data preloaded). The failure recovery may follow the two stage process where the wallet server will reactively create Wallet Fragments initially making use of any 'emergency overdraft', and will then release any loans from the failed Consumer Server once the failed Consumer Server log files have been read.

In this mode the recovery time may be dominated by the time to load the customer data, and new wallet fragments into the new Consumer Server. If the relationship, between the Consumer Servers and Wallet Servers, may be correctly configured then multiple wallet servers can serve as new Wallet Fragments to a replacement Consumer Server. Again exactly the same mechanism can be used to take a Consumer Server out of operation for software or hardware upgrade, and the switchover can be undertaken on a logical partition by logical partition basis.

Optimised N+1 Standby

The following accelerations can be implemented to speed up N+1 failover. Multiple Wallet Fragments may be reactively generated within a single database transaction within the Wallet Server. This may be accomplished by bulking requests onto a single database transaction or by delaying database insertion/update via an explicit journal file. The Consumer Server may also be designed to generate the Wallet Fragments. On notification of the Consumer Server failure, the Wallet Server may enter a pro-active mode to push new Wallet Fragments onto the replacement Consumer Server. The system may also be configured to detect high transaction rate wallets and pre-create Wallet Fragments stored within the Wallet Server ready to distribute to a replacement Wallet Server.

M:N Standby

In this embodiment, Wallet Fragments for the top percentage of active wallets (say 20%) are pre-generated by the Wallet Server and are pushed onto a standby Consumer Server. This would result in a pool of standby Consumer Servers (of the order of, for example, one standby for every five active Consumer Servers). When the Consumer Server takes over an LCS range the high run rate wallets are pre-loaded for the LCS range of interest and the other Wallet Fragments are 'discarded'.

One-to-One Hot Standby

In this mode there may be a dedicated hot-standby Consumer Server for every active Consumer Server. Whenever the Wallet Server creates a new Wallet Fragment on the active Consumer Server, it may push an additional new Wallet Fragment onto the standby Consumer Server. Each Wallet Fragment has an independent loan and the two loans may be of different values (the loan on the standby server only being big enough to cover any anticipated usage while data may be recovered from the server that was active, now failed). The existing pro-active and reactive loan mechanisms may be used to try and ensure that there may always be loan available on a standby Consumer Server. The standby machine does not process any load until failure.

This wallet push to the standby server can be undertaken when wallets are created, or when a second Consumer Server may be paired with an operational server (a demon process in the Wallet Server creating wallet fragments on a second Consumer Server to match wallet fragments on the first server, but with optional filtering so that wallet fragments with a low probability of receiving traffic may not be pro-actively created (but can still be requested be the Consumer Server and reactively created by the Wallet Server if required).

This is not the same as a traditional standby system as information is not copied from one Consumer Server to another on failure.

Active-Active Load Sharing

A variation on 'one-to-one' standby. A range of logical partitions that would normally be served by one Consumer Server may be split across, at least, a pair of Consumer Servers. Each Consumer Server may be loaded with all of the customer and wallet data for the whole LCS range, but each server handles half of the LCS event processing load. The proactive/reactive wallet mechanism maintains loan for each wallet on both Consumer Servers. Processing can be instantly switched so that one Consumer Server takes the whole load, however some events may be pessimistically rated while loans have not been recovered from the failed Consumer Server. Because no balances are ever transferred from the failed to the operational Consumer Server, any memory corruption in one Consumer Server is not propagated to the replacement Consumer Server.

This processing can even be extended to allow events from very high volume sources to be delivered to either server due to the loan sharing mechanism. Customer Data and Wallet Fragments may also be loaded into a number of Consumer Servers, a subset of which receive events from a given event source.

One-to-One Shadow

In this embodiment, each Consumer Server has a 'shadow' Consumer Server. While in standby mode the Consumer Server keeps its cached reference data and customer data current, and reads the log file written by the Consumer Server so that it can keep in memory a copy of the Wallet Fragment values (the log file being enhanced so that any Wallet Fragment updates received from the Wallet Server by the operational Consumer Server are passed to the shadow Consumer Server. On failure the shadow Consumer Server may be notified of the failure—reads any remaining log file, and starts processing events, and starts writing its own log file stream. The linkage between the two Consumer Servers could be via a direct cross machine inter-process link, however additional locking and control mechanisms may be required to ensure that there may be consistency between information passed over the network between the two machines and written to disk for downstream processing.

Figure 47B:
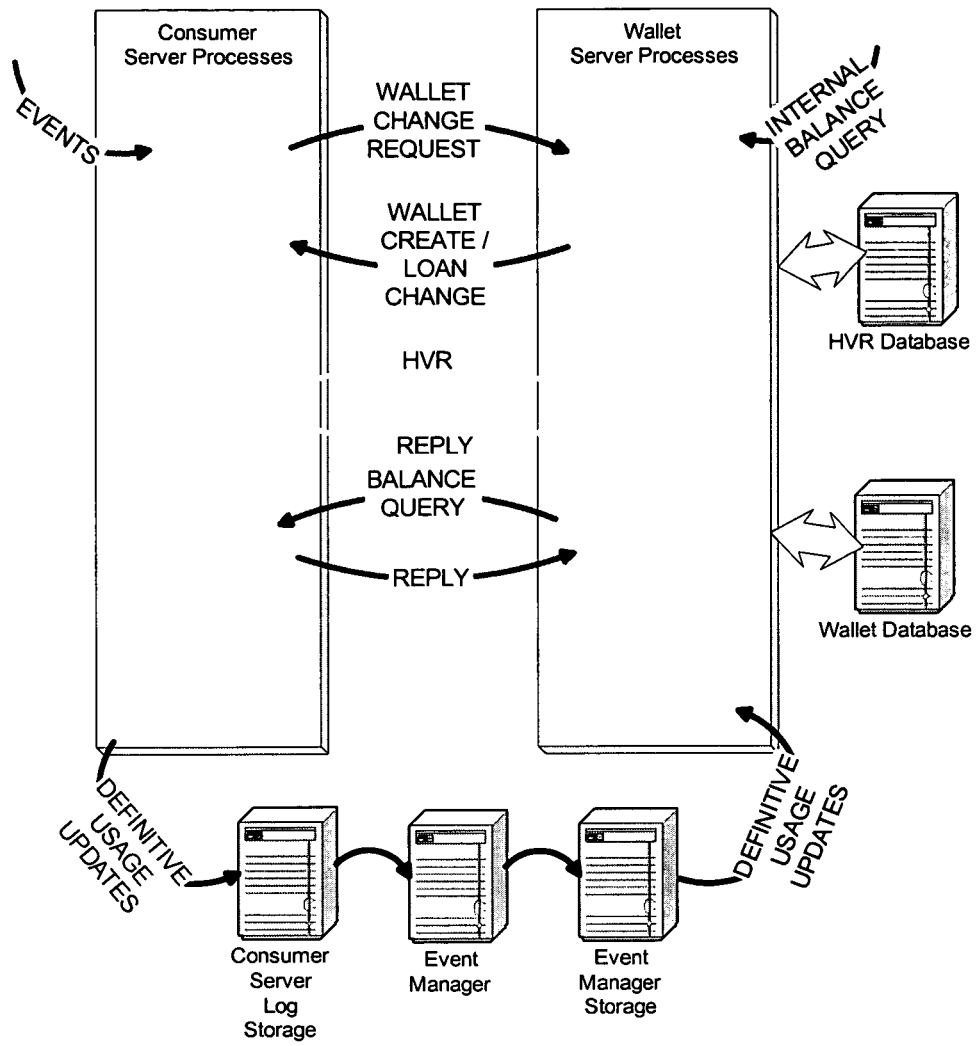

Real Time Path Between Consumer Server and Wallet Server for Loan Control/Wallet Usage Updates Referring to FIG. 47B, there is demonstrated the interactions between the Consumer Server and the Wallet Server for Wallet Change Request/Wallet Create/Loan Change; High Value Reservation (HVR); Balance Query; and CS Log.

A set of asynchronous messages (Wallet change request/wallet create/loan change) between Wallet Server and Consumer Server may provide the real time interactions to create wallets and to control the associated wallet loans. Some requests, such as loan changes, may be originated from either server and the other server will reply. The 'master' copy of the loans may be held in the Wallet Server and propagated to the Consumer Server. While Consumer Server may request changes to loans, the loan change may be mastered from the Wallet Server. Note that while this path may provide informational balance information for loan reallocation between multiple Consumer Servers, balance information received via this path may not be definitive.

HVR (High Value Reservation) requests may be generated by the Consumer Server. Replies may be generated by the Wallet Server. The Consumer Server may act as a synchronous client to the Wallet Server for high value reservations.

Balance Query requests that are externally submitted to the Wallet Server may be converted into real time balance queries to support external requests. The Wallet Server may act as a synchronous client to the Consumer Server. The API or other server may poll the Wallet Server, determine the wallet fragments and then the API server may poll the consumer servers directly.

Completed rated events may be persisted to the ES and Wallet Server via the Consumer Server log (CS Log) file and the Event Manager. This path may be file-based and near-real-time. The 'master' copy of this usage information may be the value persisted to disk by the Consumer Server. The Event Manger may consolidate updates from a number of Consumer Servers and partition the updates for the correct Wallet Server based on LDS information. The LDS information may be embedded in each event written by the Consumer Server. The Event Store may be used in systems with more than one Consumer Server and Wallet Server. The Event Manager does not modify the values of usage information passed from the Consumer Server to the Wallet Server.

There are at least two paths by which usage information may get passed from the Consumer Server to the Wallet Server:

A direct informational real time path where the current usage may be used as part of the loan rebalance mechanism.

A near real-time path via the Consumer Server log file and Event Manager for a definitive record of processed usage.

Wallet Control and Loan Processes

Figure 47C:
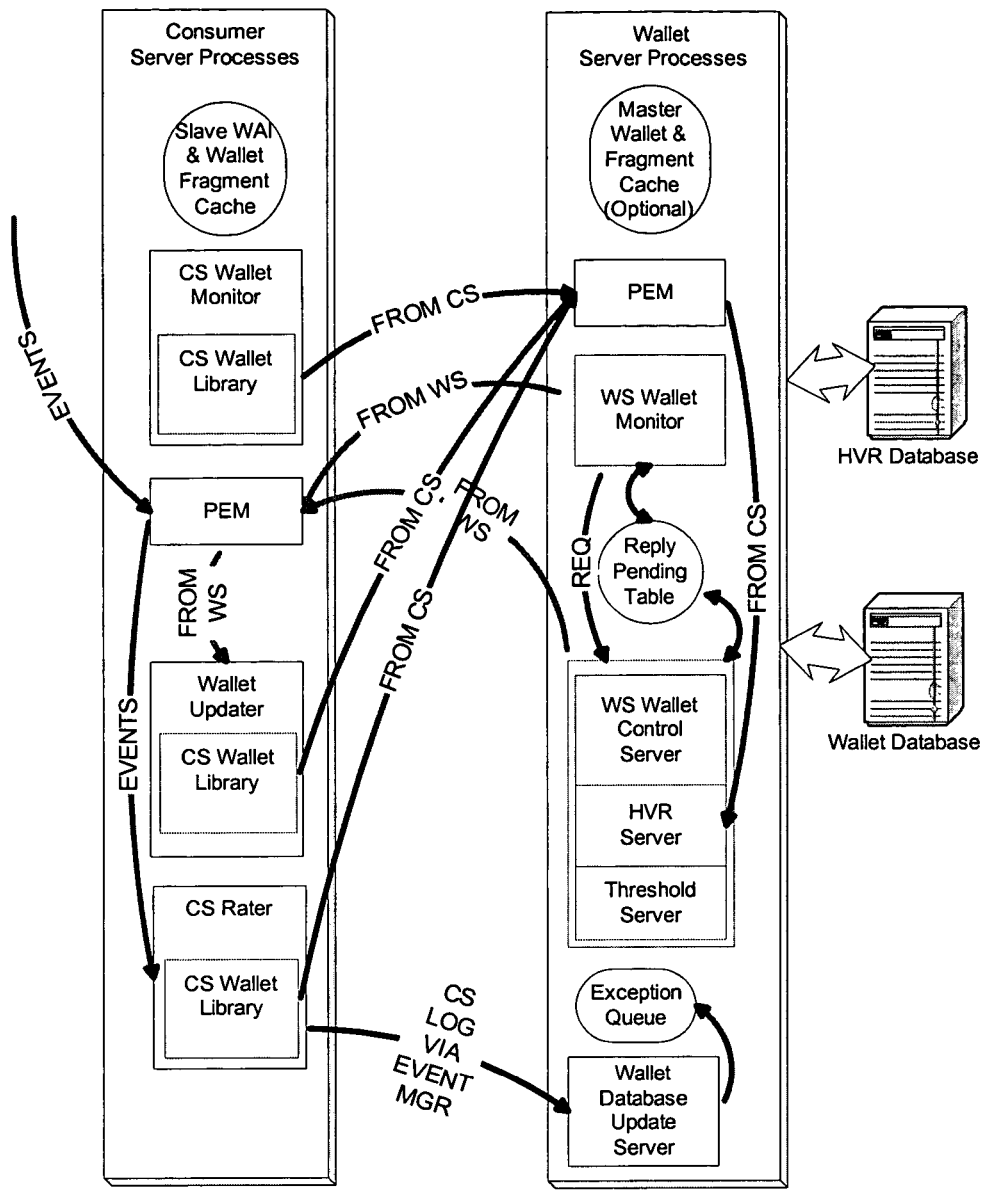

Referring to FIG. 47C, there is shown an embodiment which includes all of the paths for wallet and loan control but which does not include the paths used for internal balance queries that are sent to the Wallet Server.

The Consumer Server may provide near real-time balance information for a wallet and all fragments without the need for a round trip to the Wallet Server. This may support features such as Informative balance reporting on every request processed by the Consumer Server; and reverse rating where the balance may be translated into an allowable number of usage units (e.g. call minutes or MByte of download).

The Wallet Server receives usage updates from all of the wallet fragments in the Consumer Servers (either via the real-time path or via the Event Manager), The Wallet Server may be aware of any changes made to the overall resource or other key values in the master Wallet within the Wallet Server. The Wallet Server can then push back to each Consumer Server the consolidated value of the wallet (across the Wallet Server and all of the Consumer Servers) excluding the last known value for that Consumer Server. This can be undertaken either periodically or in response to a certain level of change seen by the Wallet Server. Additionally, if the update may be only periodic the Wallet Server can publish a time indicator so that the Consumer Server can report the aggregate balance as of a given time. The combination of this value reported by the Wallet Server and the latest values in the Consumer Server gives a near real-time value of the whole wallet. (There may be an alternate mode where the Wallet Server pushes same the last known aggregate value of a Wallet to all of the Consumer Server with the same Wallet and any recent changes in the local Consumer Server wallets are ignored for balances reported by the Consumer Server.

Additionally the Wallet Server may publish an 'invalid' value to the Consumer Server for the aggregated wallet values. The Consumer Server may then indicate that it can not locally report a balance. It may be anticipated that a most deployments will wish to severely control the update traffic and a common degenerate mode of operation will to only report the aggregated balance to the Consumer Server where only one wallet fragment exists (e.g. the update rate may be very low since the Wallet Server only needs to publish any balance in the Wallet Server if the Wallet itself may be changed—the Consumer Server may be locally aware of all balance changes). In this case, if a second wallet fragment is created, then the wallet server may send an 'invalid' value to the Consumer Server and Consumer Server wallet balance reporting may be disabled.

Internal Balance Query Processes

Figure 47D:
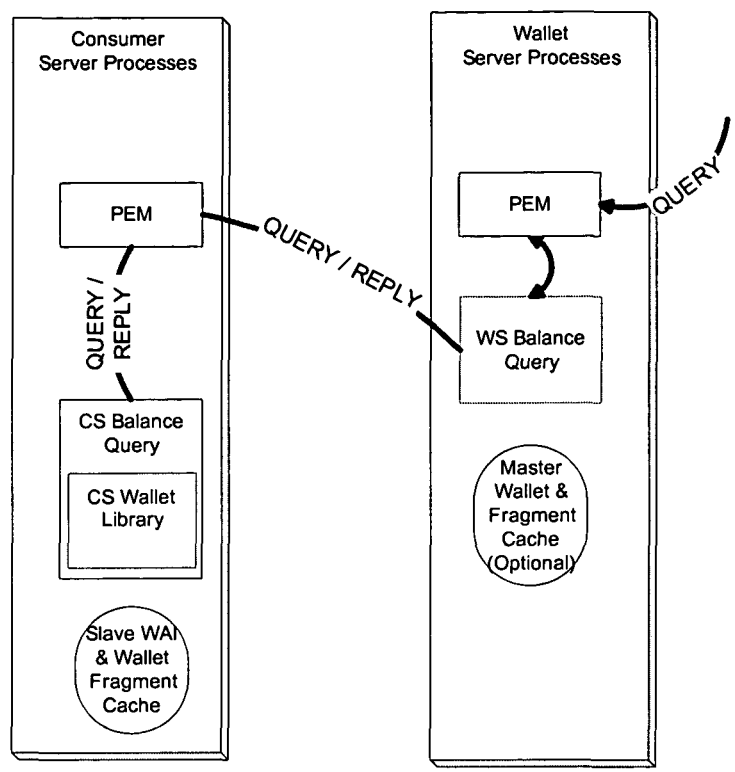

Referring to FIG. 47D, there is shown an embodiment for an internal balance query from the Wallet Server. This path may not result in changes to wallets. Where requests are made for multiple WAI/wallets, these wallets may be read while locking the wallet fragment information in the Consumer Server to ensure that all of the wallets/WAI are read at the same point in time. Simpler query processes may also be implemented as part of the rating process if the wallet fragments are not distributed across multiple Consumer Servers.

Consumer Server as Client and Wallet Server as Server

Figure 48A:
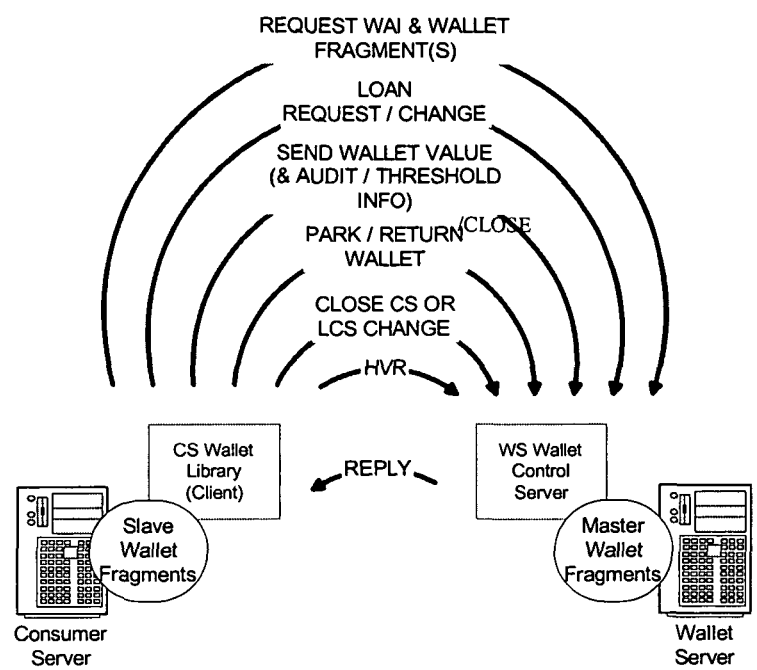
FIGS. 48A-C illustrates an embodiment of the interactions which may occur when external requests are made to the Consumer Server Wallet Library from the Consumer Server Rater or the Consumer Server Wallet Monitor.
Figure 48B:
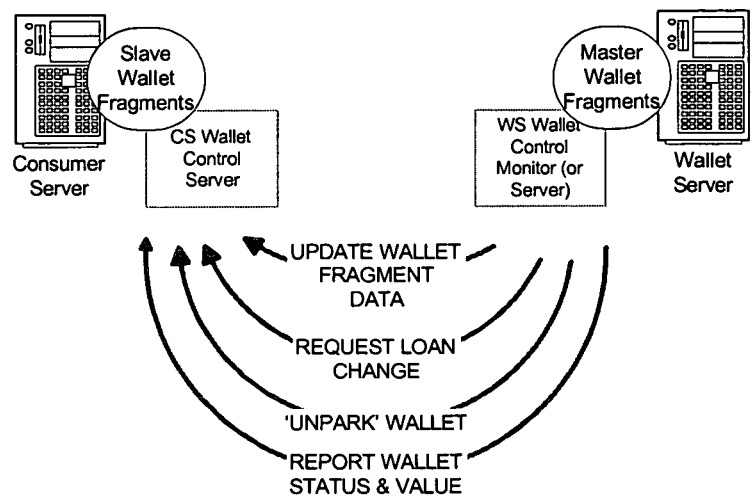
Figure 48C:
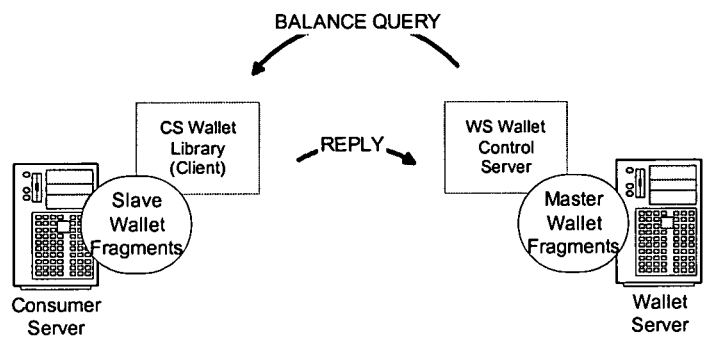
Figure 49:
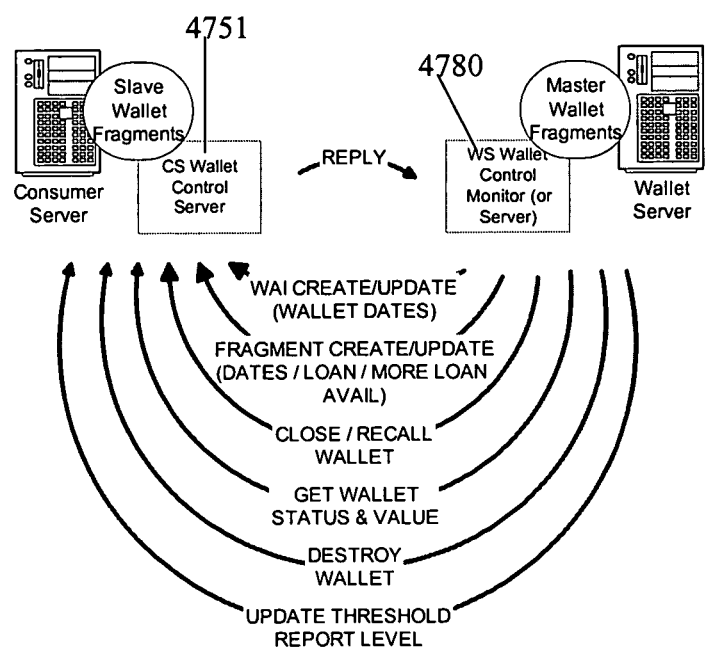
FIG. 49 illustrates an embodiment of the interactions which may occur when either the Wallet Server Monitor Client or the Wallet Server receive a message from a different Consumer Server.

Referring to FIGS. 48-49, an embodiment is shown which illustrates the messages that may be generated due to external requests to the Consumer Server Wallet Library (4752) from the Consumer Server Rater (4795) or the Consumer Server Wallet Monitor (4781). An embodiment is shown which illustrates the messages that may be generated by the Wallet Server Monitor Client (4780), or by the Wallet Server (940) triggered by a message received from a different Consumer Server (925).

Interaction between the CS and the Wallet Server may be via two async messaging paths presented in three forms:
 a. A functional overview of the different flows (that does not correspond to the messaging on the wire), but focuses on the business operations.
 b. A summary of the actual messages that can be transferred between the Wallet Server and Consumer Server.
 c. A detailed commentary on the interactions together with a failure analysis if messages are lost together with a discussion of race conditions.

CS Initiated

Referring to FIG. 48A, messages may be generated by the Consumer Server Wallet Library from the Consumer Server Rater or the Consumer Server Wallet Monitor.

Wallet Server Initiated

Referring to FIG. 48B, asynchronous messages may be generated by the Wallet Server processes. These may be queued at the Consumer Server and will normally trigger a message from the Consumer Server to Wallet Server.

Internal Balance Query

Referring to FIG. 48C, the Wallet Server may relay internal balance requests to the Consumer Servers.

Message Encoding and Processing

Referring again to FIG. 49, a common message may be used with simple wallet state indicators, in combination with a state machine, per Wallet Fragment (4510) at the Wallet Server (940) and Consumer Server (925) to control the Wallets (250 . . . ). Also, the Wallet (250 . . . ) may be locked for the Wallet Server (940) or Consumer Server (925) to perform wallet processing.

In one embodiment:
 1. Requests may be sent from the Consumer Server (925) as a client to the Wallet Server (940) as a server refer to one WAI/wallet fragment (except 'Request Wallet') where the fragment may be unknown.
 2. Replies back to the Consumer Server (925) as a client may contain details for more than one wallet fragment for the same WAI (for example an event can draw from two new wallet fragments on a given date), and may additionally update WAI information (e.g. date range for which the WS can serve wallets).
 3. Requests sent from the Wallet Server (940) as a server may refer to only one WAI/fragment, as do the corresponding replies from the server function in the Consumer Server (925).

Client requests and server responses generated by the Consumer Server (925) may include:
 1. The latest values of the Consumer Server wallet fragment (with associated sequence numbers, and wallet fragment state from the Consumer Server perspective) to ensure that the Wallet Server (940) always has the latest real time view of the wallet resource (that may be stored separately in the Wallet Server (940) from any wallet updates received via the Consumer Server log file).
 2. Details of any threshold that may be still exceeded (level threshold indication).
 3. Debug information. The 'state' of the CS wallet fragment.

Common Interactions

The following sections describe functional operations of the Wallet Server/Consumer Server interactions.

WAI & Wallet Fragment Creation/Update—CS Initiated

Figure 50A:
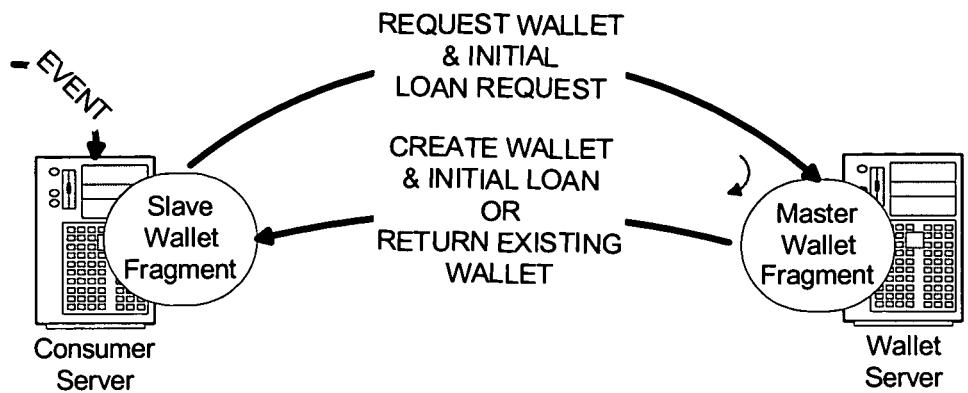
FIGS. 50A-L illustrates various interactions between a Consumer Server and a Wallet Server.

Referring to FIG. 50A, the CS Wallet Library may receive a request for a wallet not in its local cache and issues a request to the Wallet Server. The Wallet Server will create one or more fragments and the send these to the Consumer Server. The async reply will then 'release' the correct event to be reprocessed (via the CSWaitingEventId).

The request to the Wallet Server by the Consumer Server may be generated when there may be no WAI information cached in the Consumer Server for this WAI (i.e. the dates for which the WS can generate wallets can not be validated) and the Consumer Server has determined that it may not have all of the wallets for a given date range. There are two typical cases when this may occur. First, where there are no wallets for a date. Second, when the 'StartDateNextWallet' or 'EndDatePreviousWallet' or 'allowancePeriodEnd' of an exiting wallet indicates that more wallet(s) are required.

The Consumer Server may pass the Wallet Server an effective date range extracted from the requesting event (as the reqEventDateRange request message element) and the WAI for the wallet(s) it requires.

Optionally the CS may pass over the minimum absolute loan value it requires from one or more wallets with the same WAI (in the 'reqLoanIncrease' absolute value—the CS may not pass a 'requestLoanDecrease' value). These values are used by the Wallet Server as a hint only—it will not trigger a loan rebalance between consumer servers. The Wallet Server may return a loan less than may be requested.

If the required wallets and possibly wallet fragments exist on the WS then they will be returned to the CS (the _reqLoanIncrease value being ignored). New wallet fragments will only be generated by the WS if no wallet fragment exists on the WS for this WAI/Consumer server.

Note that if no wallet can be generated by the WS (e.g. error in customer or reference data or the corresponding wallet may be closed) then an 'error' may be returned from the Wallet Server to the Consumer Server which may be cached to prevent further requests. The Consumer Server may configured to clear an error to force a retry to a Consumer Server.

If a wallet fragment must be returned to the CS for wallet that may be already exhausted then it will be returned with zero_loanGrantedValue and in a state of 'OPEN/NO MORE'.

'Simple' Loan Increase—CS Initiated

Figure 50B:
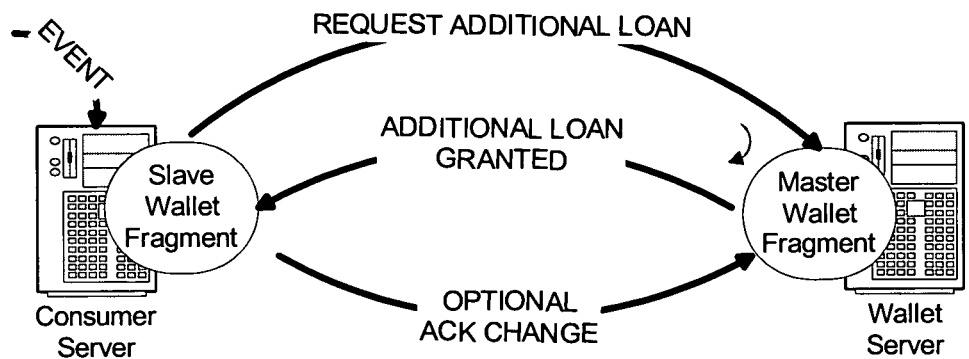
Figure 50C:
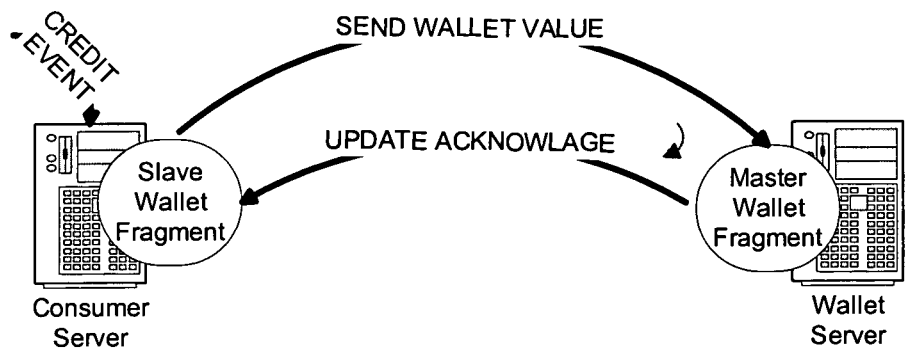
Figure 50D:
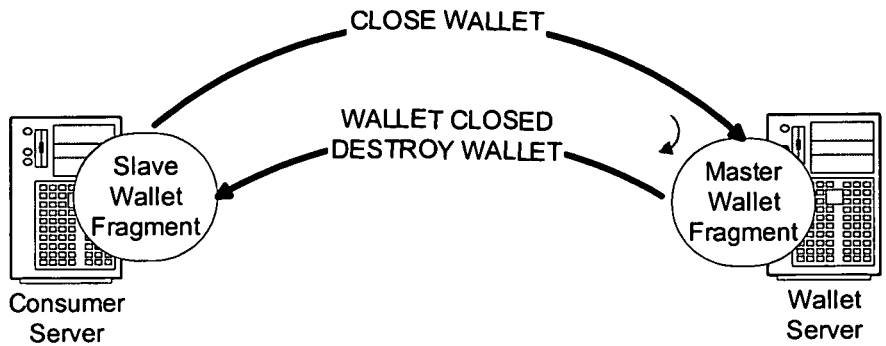

Referring to FIG. 50B, the following diagram shows a simple loan increase from a CS where the Wallet Server can immediately satisfy the loan request. The request (containing the reqLoanIncrease value) gives the absolute value of the loan now required from the Wallet Server, and the identity of the WAI and wallet fragment. The async reply updates the wallet fragment, and may optionally trigger the delivery of other fragments. For loan increases the Wallet Server may either respond with the requested loan (or larger loan), or may reply with a loan equal to the existing loan and an 'OPEN/NO MORE' state in the reply '_walletFragmentState'.

In the WS reply, the WS may be allowed to send updates for other wallet fragments. For example if the current fragment was closed in the WS, the WS could return another open fragment for the same period. The WS may also update any other values in the wallet (e.g. date ranges). The CS may also process this message and may echo the change if the message from the Wallet Server has the _requestReply flag may be set.

Wallet Fragment Update—WS Initiated

Figure 50E:
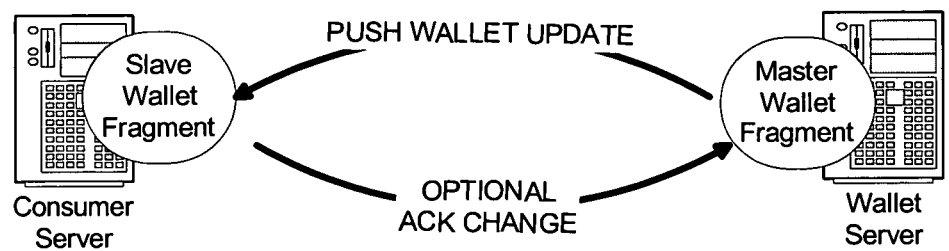

Referring to FIG. 50E, loans and other Wallet Fragment parameters may be changed by a message containing new values from the Wallet Server. Loan increases may be simply sent as updates to the loanGrantedValue to the Consumer Server. This exchange may be used as part of the loan redistribution exchange to update loans on the Consumer Servers then the loans have been recalled. Loan decreases are rather more complex due to race conditions with events arriving at the Consumer Server and do not use this simple mechanism. The CS will process this message and may echo the change if the message from the Wallet Server has the request Reply flag set.

The protocol allows the Wallet Server to proactively generate and push wallet fragments to a Consumer Server. This would typically be used to allow the Wallet Server to generate wallet fragment for high run rate accounts to eliminate a 'peak' of wallet generation at midnight as a number of customers switch over to new wallets. This may be undertaken by the Wallet Server scanning the high run rate wallet fragments that expire (say) within the next 24 hours, and proactively generate wallet fragments to the Consumer Server(s) that are hosting the high run rate wallets.

Wallet Fragment Query—WS Initiated

If the Wallet Server wishes to simply determine the current Consumer Server values it uses the same 'Wallet Fragment Update' mechanism described above with the _requestReply flag set.

Wallet Fragment Report—CS Initiated

Figure 50F:
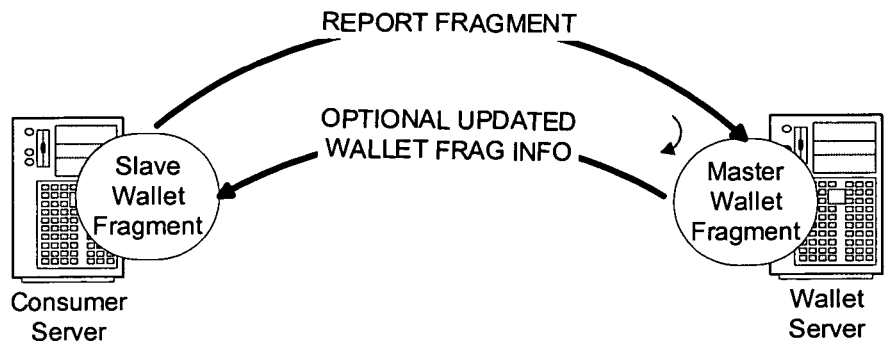

Referring to FIG. 50F, a CS may report the value of a fragment to the WS at any time (a message with no 'request' element). The WS is not required to return any message so configured. However the WS may generate a reply to update values on the CS (for example if the loan value on the CS is not as expected due to a previous communication failure).

Park or Close Wallet—WS Initiated

Figure 50G:
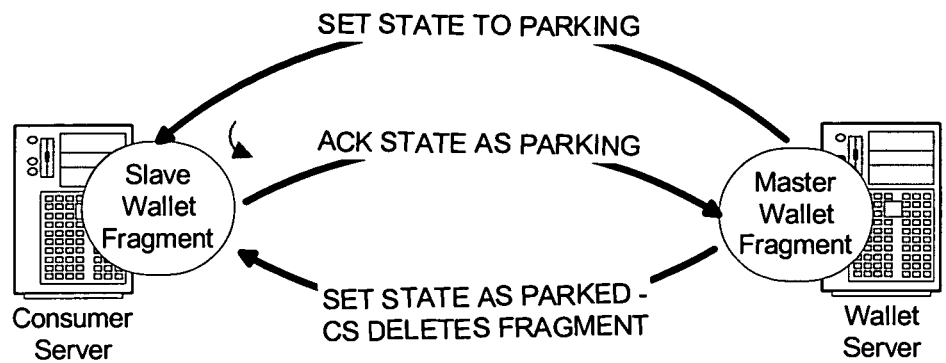
Figure 56:
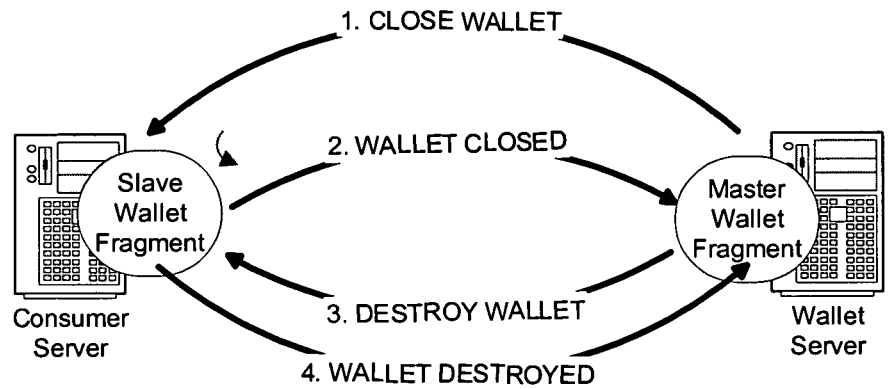
FIG. 56 illustrates an embodiment in which the Wallet Server closes and/or destroys a Wallet on the Consumer Server.

Referring to FIGS. 50G and 56, the Wallet Server may determine that it wants to park or close a wallet fragment on the Consumer Server because:

Very low usage.

No anticipated usage on this wallet fragment (end date of wallet may be a configurable number of days less than the current date/time).

Wallet Server has determined that the Consumer Server wallet fragment may be corrupt (typically by there being a sequence error, or mismatch of sums and deltas).

Wallet server wishes to close the corresponding wallet.

To park the Wallet Fragment:

The Wallet Server sends an update to the Wallet Fragment with a state of 'parking' containing the _requestReply flag.

The Consumer Server then changes the fragment state to be 'parking' and will then lock the wallet fragment and prevent further usage from being taken from the wallet fragment.

The Consumer Server then responds that the wallet is parking (with the last values consumed from the wallet prior to closure). However the Consumer Server may NOT yet delete the wallet fragment.

The Wallet Server will then acknowledge the parking request a new status (parked) indicating that the wallet should be deleted.

To close the Wallet Server generates a request to close the wallet. The Consumer Server responds that the wallet is closed (with the last values consumed from the wallet prior to closure). The Wallet Server may then generate a request to destroy the wallet.

Even if the Consumer Server receives a request to close or destroy a non-existent wallet, it may still reply that the wallet may be closed or destroyed as appropriate.

Once the Wallet Server has received acknowledgement that the wallet is destroyed, and all of the corresponding charges have been received via the Consumer Server log file then the fragment can be destroyed in the Wallet Server.

Park Wallet—CS Initiated

Figure 50H:
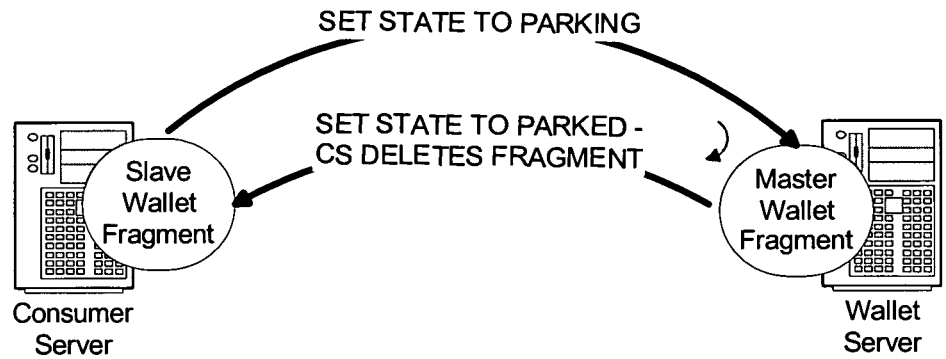

Referring to FIG. 50H, this is simply a truncated version of the same exchange that may be used by the Wallet Server to close a wallet. This mechanism will initially be used to close the wallets, one by one, as part of a controlled CS shutdown. Later enhancements will add bulk return/close operations—e.g. close all wallets for WAI. Loan Reduction & Redistribution. The WS Wallet Monitor may pro-actively redistribute the loan across multiple Consumer Servers, and the Consumer Server may reactively trigger a loan distribution. Different strategies may be implemented. The redistribution strategy complexity may be encapsulated within the Wallet Server—the strategy can be enhanced with no messaging or CS changes.

Wallet Loan 'Return'

Figure 50I:
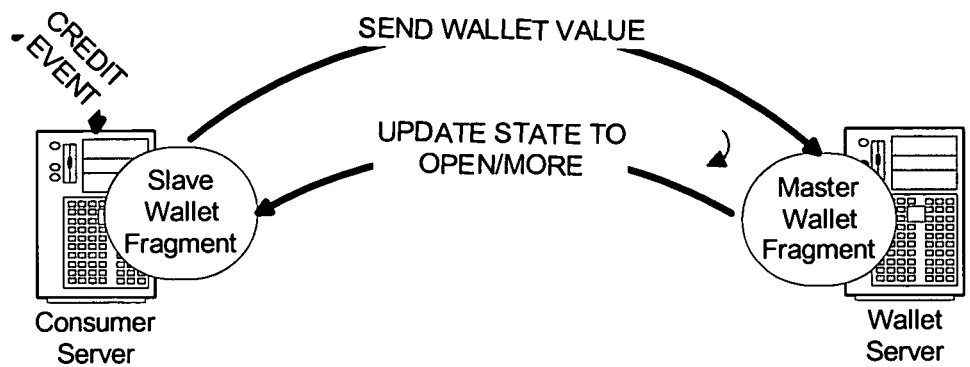

Referring to FIG. 50I, a special case of loan increase/decrease may be when the CS determines that loan can be 'returned' to the WS, when the WS may consider that all of the loan on the CS has previously been consumed. For example, the Wallet Server may have set the Wallet Fragment State to be 'OPEN/NOMORE'. When a change has been committed to a wallet (or a reservation adjustment/termination may be processed) at the CS then the CS wallet fragment status may be checked. If the wallet fragment is in the 'OPEN/NO-MORE' state but the used/authorized value is less than the loan then the WS thinks that this wallet is fully used, but the CS now has 'free' loan that has to be notified to the WS.

After the charge/loan is committed the CSWL, for any wallet fragments in the above state (i.e. the wallet fragment may be in the 'OPEN/NOMORE' state but the used/authorized value may be less than the loan), the CSWL sends the current wallet values to the WS, and sets the '_requestloanincrease' to the current loan value, but also passes the CS status unchanged.

Figure 50J:
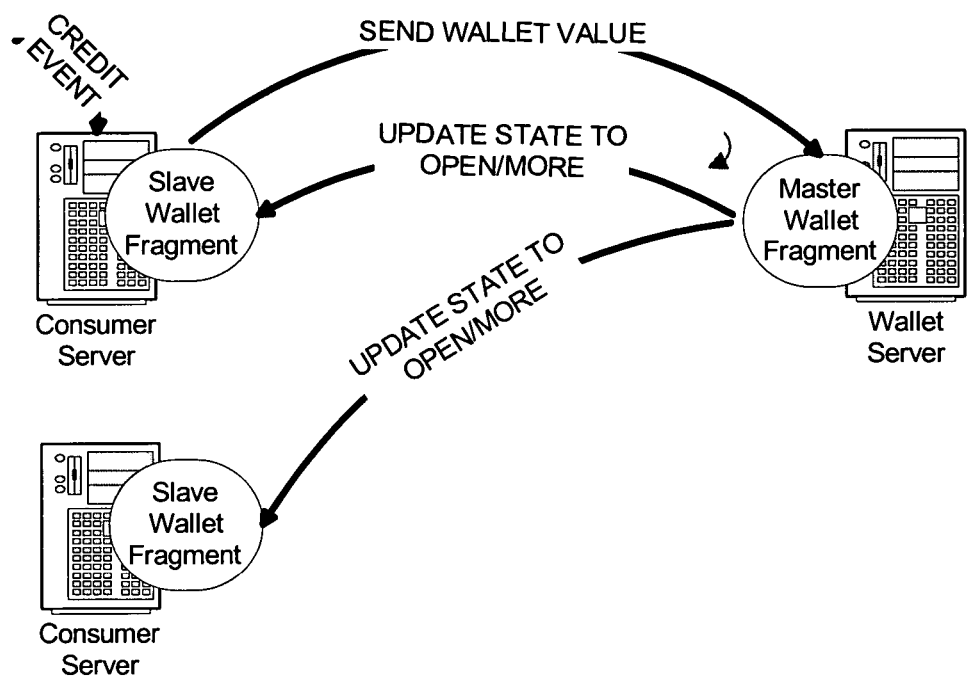

Referring to FIG. 50J, the WS will then reply by changing the loan value and/or setting the wallet fragment state to be 'OPEN/NOMORE'. The presence of the '_requestLoanIncrease' value (even if the value may be unchanged) will trigger the WS to review the loan values and validate the wallet fragment state.

The Credit Event may be the release of a Low Value Reservation. The wallet update in this case may then trigger new wallet status to then be driven down to other Consumer Servers (by the WS sending alerts to other Consumer Servers, not shown in above diagram). The Wallet Server may be notified that loan can be returned. This update may then cause updates to cascade to all of the other Consumer Server Wallet fragments informing them that more loan may be available.

HVR

Figure 50K:
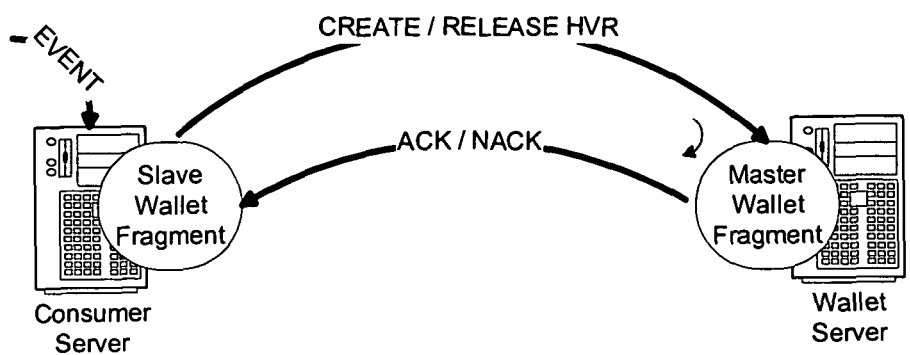
Figure 50L:
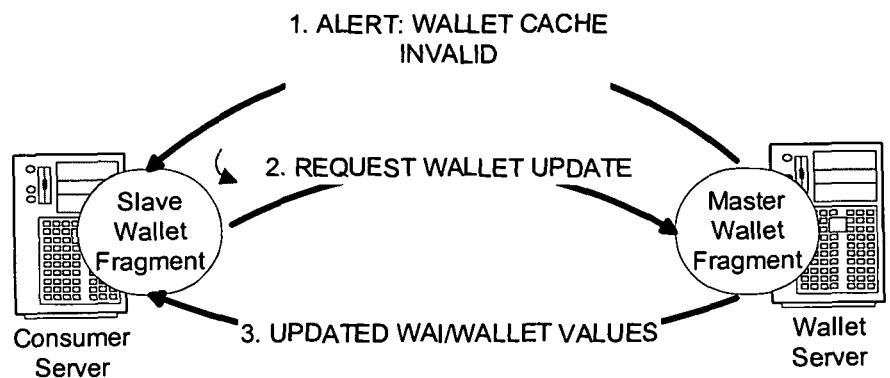

Referring to FIG. 50K, an embodiment for High Value Reservations is disclosed.

Wallet Loan Re-Balance Operation

Figure 51:
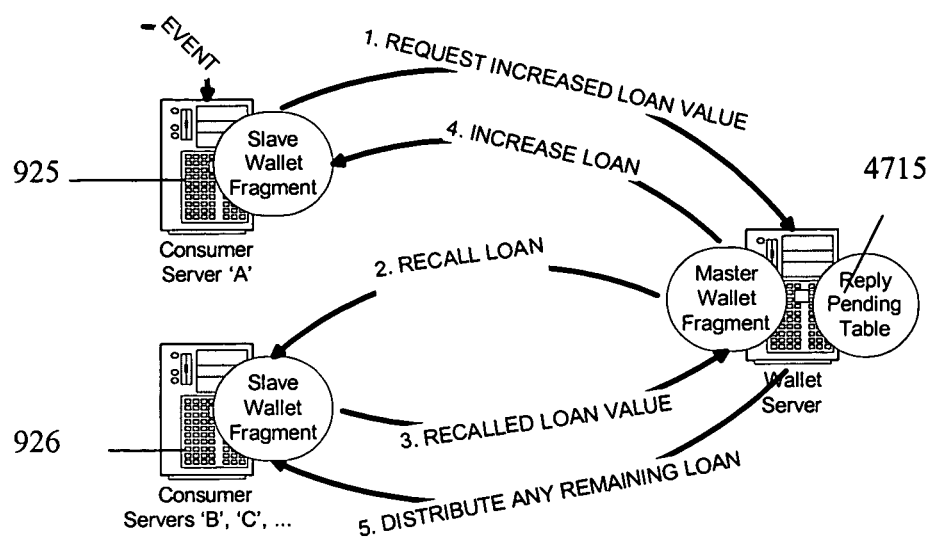
FIG. 51 illustrates an embodiment of real-time interactions between a plurality of Consumer Servers and the Wallet Server in which loan amounts are redistributed.

The Wallet rebalance operation can be reactive or proactive. Reactive operation would be to move loan from one or more Consumer Servers to another as a result of a loan increase being received from one Consumer Server. Referring to FIG. 51, reactive rebalance operations follow the illustrated message flows. Where the process is triggered from the Consumer Server, proactive operation may be initiated from the Wallet Server and may only use steps 2, 3, and 5.

The Consumer Server 'A' attempts to process an event and requires additional loan to commit a charge or process and authorization/reservation request, and requests additional loan from the Consumer Server. The Wallet Server determines it does not have sufficient unallocated loan to satisfy the request, determines that other Consumer Servers have wallet fragments for the same wallet, and sends requests to reduce (recall) loans from those other Consumer Servers ('B', 'C', . . . ). In a simple implementation the Wallet Server will request that all of the outstanding loan may be returned from each of the other Consumer Servers (i.e. the Consumer Server reduces the loan to cover the existing usage commitment (and any authorization/reservation). More sophisticated recall schemes are anticipated.

The Consumer Server responds with the value to which it can reduce it's loan (and does reduce Consumer Server's local copy of the loan to ensure that there is no race condition with additional arriving events—this is one exception where the loan value in the Consumer Server does not slave to the loan value in the Wallet Server).

The Wallet Server may calculate if there is sufficient loan to cover the request from Consumer Server 'A'. If there is insufficient loan, then the accumulated available loan may be passed to Consumer Server 'A'. If an excess loan remains then this can be either retained by the Wallet Server or distributed across the Consumer Servers. If the Wallet Server determines that it will re-distribute the loan, then the remaining Consumer Servers are updated.

A number of strategies exist to determine if recovered excess loan may be returned to the Consumer Servers. If the available loan is less than a configured 'noise' threshold then the loan may not be redistributed and may be retained by the Wallet Server. This assumes that the next transaction from any of the Consumer Servers will probably consume all of the remaining loan. Otherwise divide the remaining loan in two, and retain half on the Wallet Server, and distribute the other half across all of the active Consumer Servers. The Wallet Server retains part of the loan to allow for failover support.

Further Variations

Logical Data Centers

On a higher level, a complete system may be contained within a physical data center and be mapped as a Logical Data Center on a one-to-one basis or according to other variations. These Logical Data Centers may be considered as domains or high-level partitions for the system. Logical Data Centers provide a key advantage for global providers because many have separate systems for each country or have centralized deployment which makes scaling up more difficult. Finally, applying this model to the data center, enables more cost effective disaster resilience, i.e., n+1 resilience at the data center level. This is somewhat analogous to the concept of server clustering. In a computer system, a cluster is a group of servers and other resources that act like a single system and enable high availability and, in some cases, load balancing and parallel processing. Here, the logical data center concept may principally allow fail-over from one physical data center to another. The implementation of logical data centers may minimize the impact of total data center loss. Current DR strategies for single data center installations require a second (equally large) data center to be on standby. By carving the problem up, you can have significantly less redundant hardware and still provide fail-over in the event that you lose one of the data centers.

A Logical Data Center may be implemented in the following manner: product instances and consumer IDs may be assigned to a particular logical data center (i.e., US data center and UK data center). This assignment may be entered via CRM/self-care or via a plug-in. Because a Logical Data Center may be mapped to a physical data center, multiple logical data centers may be co-located. The partitioning of Logical Data Centers (LDC) operates in a similar manner to Logical Consumer Servers (LCS) and Logical Data Storage (LDS), however the LDC may be an externally exposed entity while the LCS and LDS may be entirely internal entities.

The Logical Data Center concept may be particularly amenable to the international scene especially for an operator that may provide service in multiple countries wherein each country offers local price plans and local operational management of systems. There is generally a strong connection between network traffic generated in a particular country and the nationality of the particular consumer but these systems must also be able to handle roaming consumers (i.e., a US consumer visits Britain and wishes to have an authorization processed).

Referring to FIGS. 36-39, two Logical Data Centers are depicted. So, a new account would be allocated to a Logical Data Center, e.g. based on a rule which says UK consumers go to LDC 1, and then within that Logical Data Center, they would be allocated to a Logical Data Store. A UK consumer may roam onto a US network and request an authorization which may be picked up by a Distributor in the US Data Center. The request will be generated with an identifier that tags the request as originating from a foreign consumer (i.e., integrating a foreign consumer ID into the request record). The US Distributor may route requests tagged with a foreign consumer ID to the UK Distributor (e.g., IMSIs starting with '44' go to the UK). Alternatively, the US Distributor may initiate a lookup. Lookup routing requires registration event to build directory. Then the US Distributor may forward the request to the correct UK Consumer Server. Each logical data center will have LCS/LDS 1-10000, so to identify a logical store or server globally, one would need both the LDC and the LDS or LCS.

Referring to FIGS. 40-43, an embodiment is illustrated which demonstrates a scenario in which an international entity comprising multiple consumers spread across multiple countries may need to share the same master wallet across data center boundaries.

Figure 44:
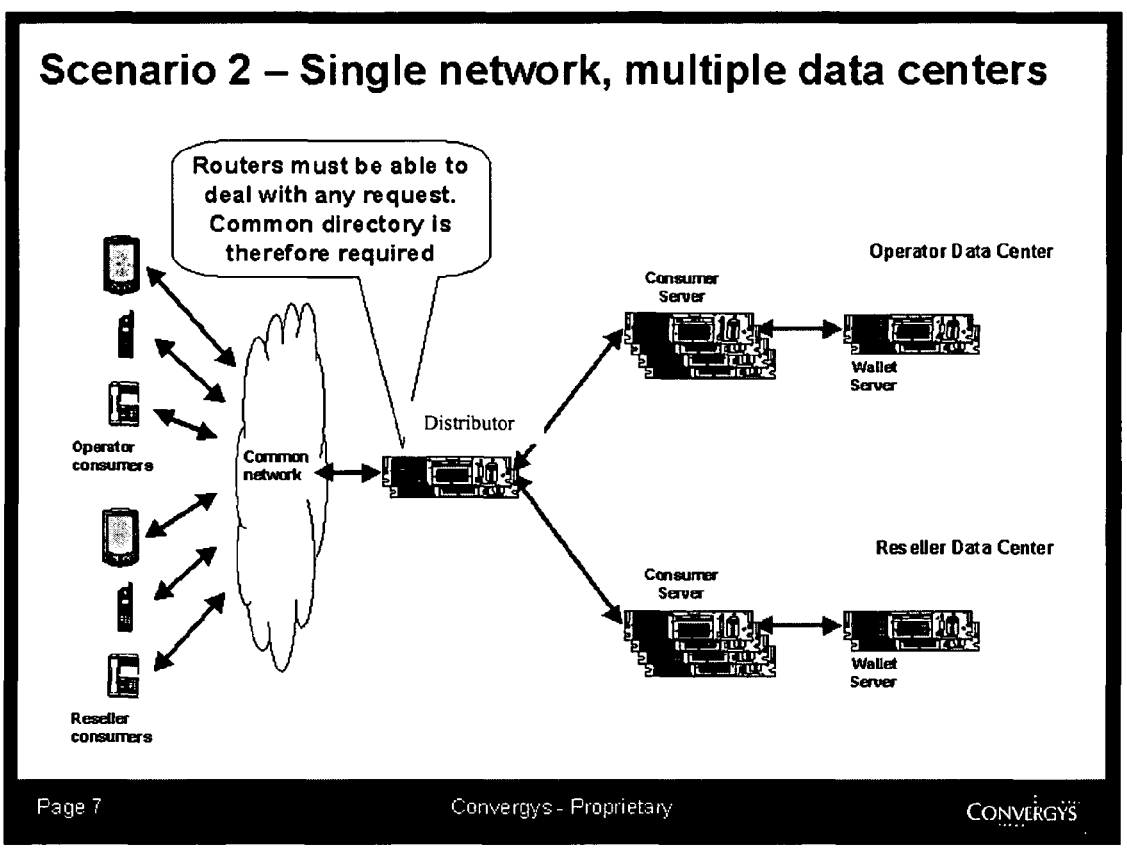
FIG. 44 illustrates another embodiment of the logical data center model in which a common network and distributor may be shared by the system.

Referring to FIG. 44, another embodiment is shown in which the network and Distributor is common to each Logical Data Center.

A variant on the DRM model allows the license key to be delivered "over-the-air" to any wireless enabled device. The key may be used to unlock the content which may be already resident on the device, having been distributed as a free CD with a magazine and loaded via sync cradle. Such a model could readily be deployed using 2G technologies such as SMS since the bandwidth required for the key may be small.

Further Embodiments

Wallet Server Initiated Messages

The following section describes examples of the real time interactions between the Consumer Server and the Wallet Server, with the WS Wallet Control Server acting as client with interactions initiated by the WS Wallet Monitor. The following examples are specific business cases of the same message to update the WAI and Wallet Fragment information cached on the Consumer Server.

Loan Redistribution

Figure 52:
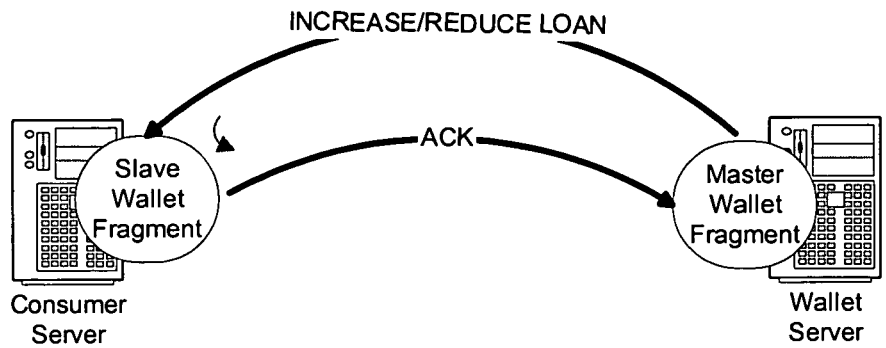
FIG. 52 illustrates an embodiment another embodiment of loan redistribution between the Consumer Server and the Wallet Server.

Referring to FIG. 52, the WS Wallet Monitor may pro-actively redistribute the loan across multiple Consumer Servers. Different strategies for this may be implemented. Note that the redistribution strategy complexity may be encapsulated within the Wallet Server—the strategy can be enhanced with no messaging or CS changes.

During a loan reduction, if the spend in the Consumer Server is greater than then loan value to which the Wallet Server would like to reduce the loan, then the loan may only be reduced to the current spend level. The actual updated loan (allowing for spend>requested loan value) may be returned in the acknowledgement.

Additional Loan for Wallet Fragment

Figure 53:
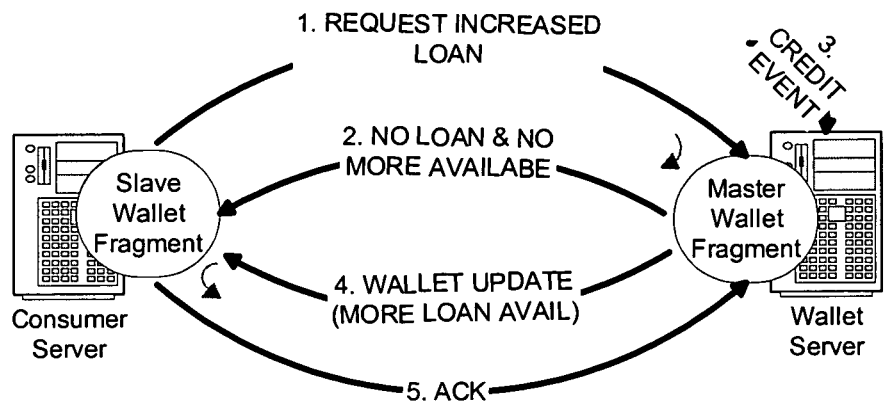
FIG. 53 illustrates an embodiment in which a Consumer Server may be refused additional loans if the Master Wallet has reached a pre-defined limit.

Referring to FIG. 53, a Consumer Server may be refused additional loan (if the master wallet has hit a credit or usage limit (stages 1 & 2 below, with the Consumer Server acting as client to the Wallet Server).

The Consumer Server in this example does not receive any new loan, and remembers that the Wallet Server has indicated 'no more loan available'. As part of this transaction the Wallet Server also notes to the Consumer Server that no additional loan may be available at the Wallet Server (or that can be recovered from other Consumer Servers).

Subsequently an adjustment may be made at the Wallet Server (either directly, or via another Wallet Server, see previous example) that results in additional loan becoming available at the Wallet Server.

The Wallet Server then must update ALL of the Consumer Server shadow wallets to indicate that more loan may be now available (the Wallet Server may also grant additional loan). For message exchange 1 & 2, the Consumer Server may be acting as a client, and for exchange 5 & 6 as a server.

Early Product Termination/Product Change

Figure 54:
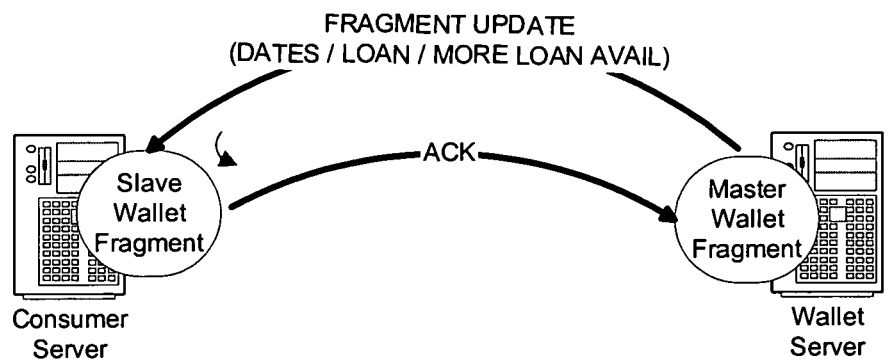
FIG. 54 illustrates an embodiment in which the Wallet Server updates the Wallet Fragment on the Consumer Server.

Referring to FIG. 54, once the Wallet Sever had determined that the WAI should be changed a number of changes are possible to the information stored in the Consumer Server:

The dates for which charges can be applied to this WAI (a union of all of the product and customer dates that will control usage).

The validity date for a Wallet Fragment, and the dates of adjacent Wallet Fragments.

The loan value for a wallet fragment.

Availability of additional loan on the Wallet Server.

Closure of the wallet for additional spend.

Any combination of the above can be undertaken for one Wallet Fragment for a given WAI in one round trip.

If the spend has already exceeded the revised wallet value then re-rating may address this problem together with any other problems associated with wallet validity or allowable spend.

A wallet (and therefore a WAI and account) could be flagged for re-rating if the spend in a wallet (following a wallet change) exceeds the allowable loan on a wallet (with some possible exceptions for exceeding credit limits on cash wallets).

Status & Value Recovery/Audit Poll

Figure 55:
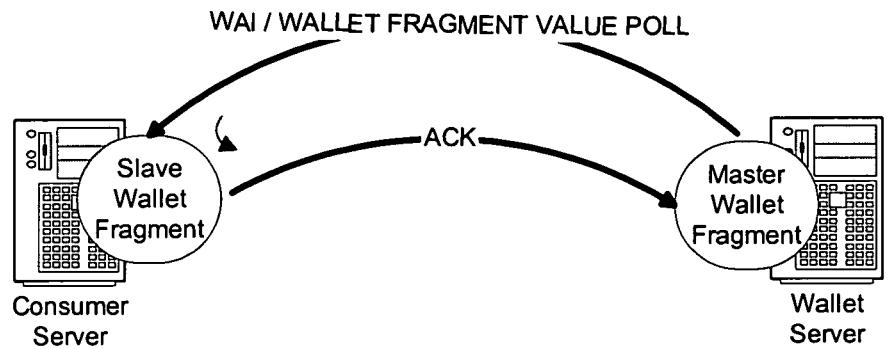
FIG. 55 illustrates an embodiment of the interaction between the Wallet Server and the Consumer Server in which the Wallet Server polls the Consumer Server for certain data.

Referring to FIG. 55, the WS Wallet Monitor may poll the Consumer Server for the value of pro-actively read the instantaneous wallet resources.

Pro-Active Wallet & Wallet Fragment Generation

Figure 57:
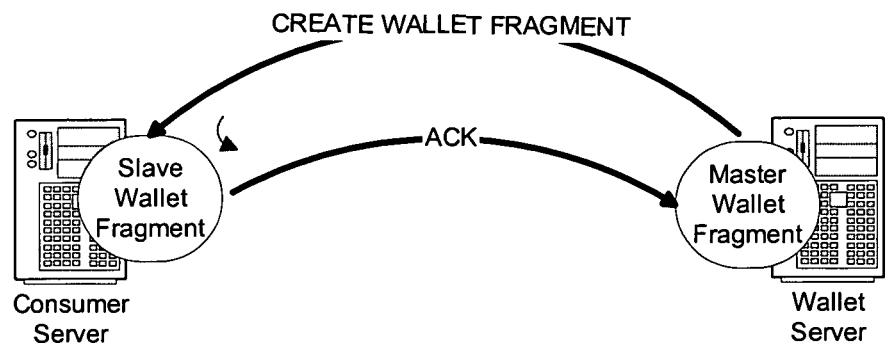
FIG. 57 illustrates an embodiment in which the Wallet Server creates and pushes Wallet Fragments to a Consumer Server.

Referring to FIG. 57, once a WAI exists on a Wallet Server the protocol may allow the Wallet Server to proactively generate and push wallet fragments to a Consumer Server. This would typically be used to allow the Wallet Server to generate wallet fragment for high run rate accounts to eliminate a 'peak' of wallet generation when WAI switch over to new wallets.

This may be undertaken by the Wallet Server scanning the high run rate wallet fragments that expire, for example, within the next 24 hours, and proactively generate wallet fragments to the Consumer Server(s) that are hosting the high run rate wallets.

Component Detail—Wallet Server

Wallet Database Update Demon Process

The demon may have x logical processing stages:

1. File reader
2. Consolidator
3. Database Writer

The Wallet Database Update Demon may assume that the following information may be stamped on each event:

1. Consumer Server Pool Element ID
2. Overall sequence number for this event for as processed by this Consumer Server.
3. Consumer Server process date time.

File Reader

The file reader may read Consumer Server log files directly, or abridged Consumer Server log files created by a separate process.

Two forms of abridged files are anticipated:

1. Consumer Server log files simply with data not required by the Wallet Server removed.
2. Consumer Server log files where events have been consolidated together. The file may comprise a (large) number of wallet updates, associated with a range of event sequence numbers. Each wallet update may include the total wallet value at the end of the update, the number of the updates, and the total delta value.

Depending on the final configuration of the ES/EM the file reader may have a number of different input control options including:

1. A managed database of files to process where the file reader 'tails' the file based on a file offset written to the file control database. (Preferred solution if EM/ES present).
2. A managed database of files to process where the file reader 'tails' the file based on the file size and only committing events up to a 'commit marker' in each file. (Preferred solution for debugging if no EM/ES where the Consumer Server log file has been registered with a file control database, but the reader tails the Consumer Server reading committed sets of events).

3. The file reader searches the Consumer Server directory for the next log file with a low sequence and 'tails' it. (Initial debugging).

The file reader may maintain a watermark of the highest sequence number event seen from each Consumer Server for transactional integrity, for restart and to detect missing updates. The same watermark may be committed PER Consumer Server by the database writer for recovery purposes.

Events received, per Consumer Server, with lower event sequence numbers than the watermark may be discarded, events with sequence gaps or Consumer Server processing timestamp inconsistencies may be recorded in the Wallet Update Exception Queue.

The File Reader may be responsible for detecting that a Consumer Server has terminated (either under control of the work manager or on a process/machine failure), and passing a message to the Wallet Update Exception Queue so that any associated loans for those wallet fragments can be freed.

Consolidator

The consolidator may undertake two functions:
1. Merging together updates to the same wallet fragment, checking the individual fragment sequences, sums and deltas.
2. Batching and partitioning the database updates into parallel blocks of wallet updates that can be written with parallel database writers to the database. Some databases may require that separate threads/processes updating the same database have separate database connections, and can not commit across threads or processes in parallel.

Database Writer

The Database Write may update the partitioned data into the Wallet Database, updating any Consumer Server sequence watermarks and/or input files in progress data at the same time in a single transaction.

It may then update in a separate transaction a file control database when an input file has been fully consumed so that the file can be audited/archived/deleted.

Partitioning by Consumer Server may be good for fragment updates and recovery. Partitioning by WAL may allow per wallet overall resource updates. It may also allow for physical update of fragments in co-located parts of database cache memory.

Consumer Server—Component Detail

The following will provide one embodiment for the design detail for the Consumer Server components.

Consumer Server Wallet Library (4752)

The Consumer Server wallet library may be used by the Consumer Server wallet related processes. The library encapsulates all of the fast moving Consumer Server caches, including the wallet and wallet fragment cache, low value reservation cache, while providing all the locking to protect these caches.

Detailed Schema Description

Figure 58:
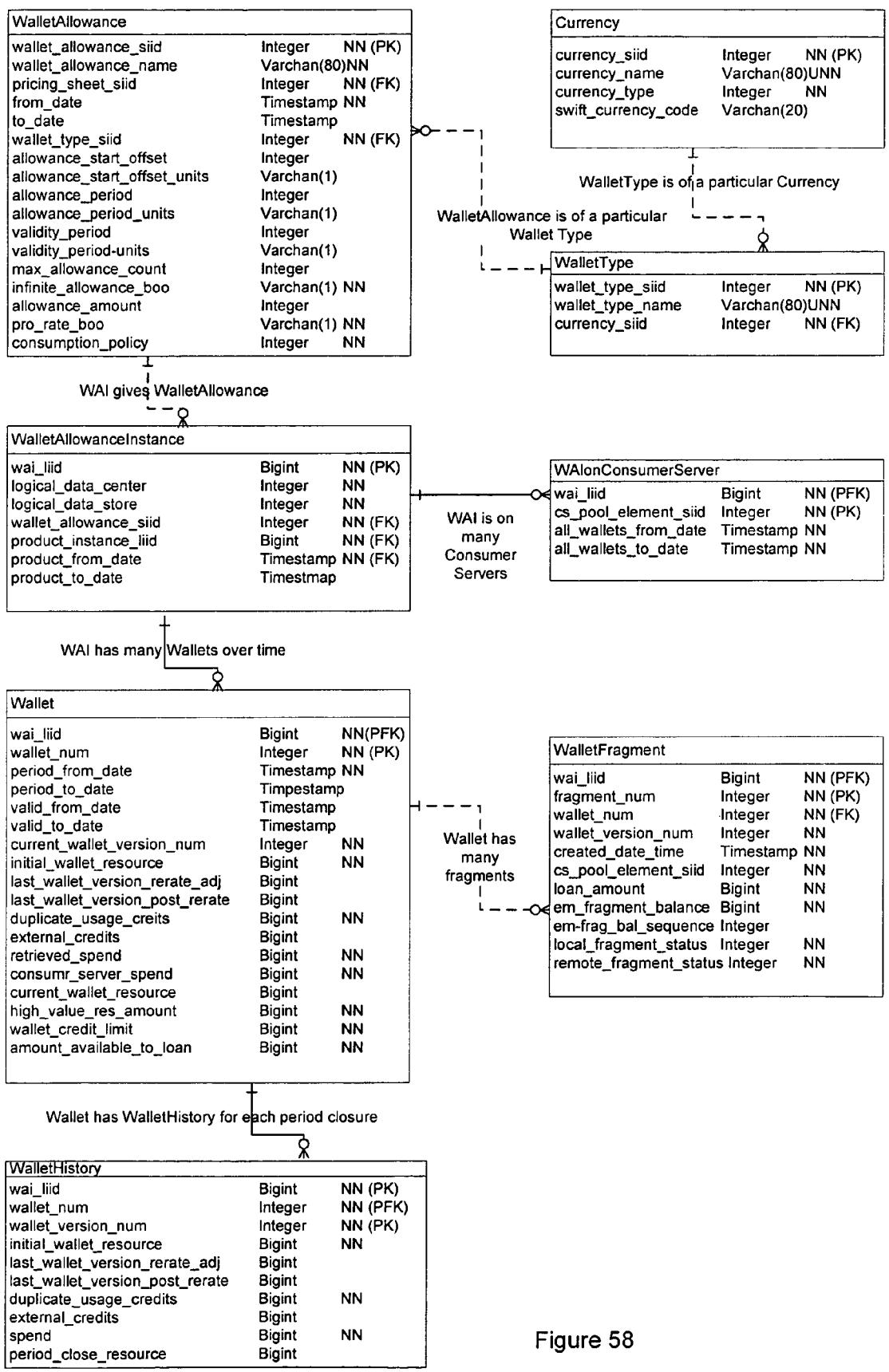
FIG. 58 illustrates an embodiment of a wallet schema.
Figure 59:
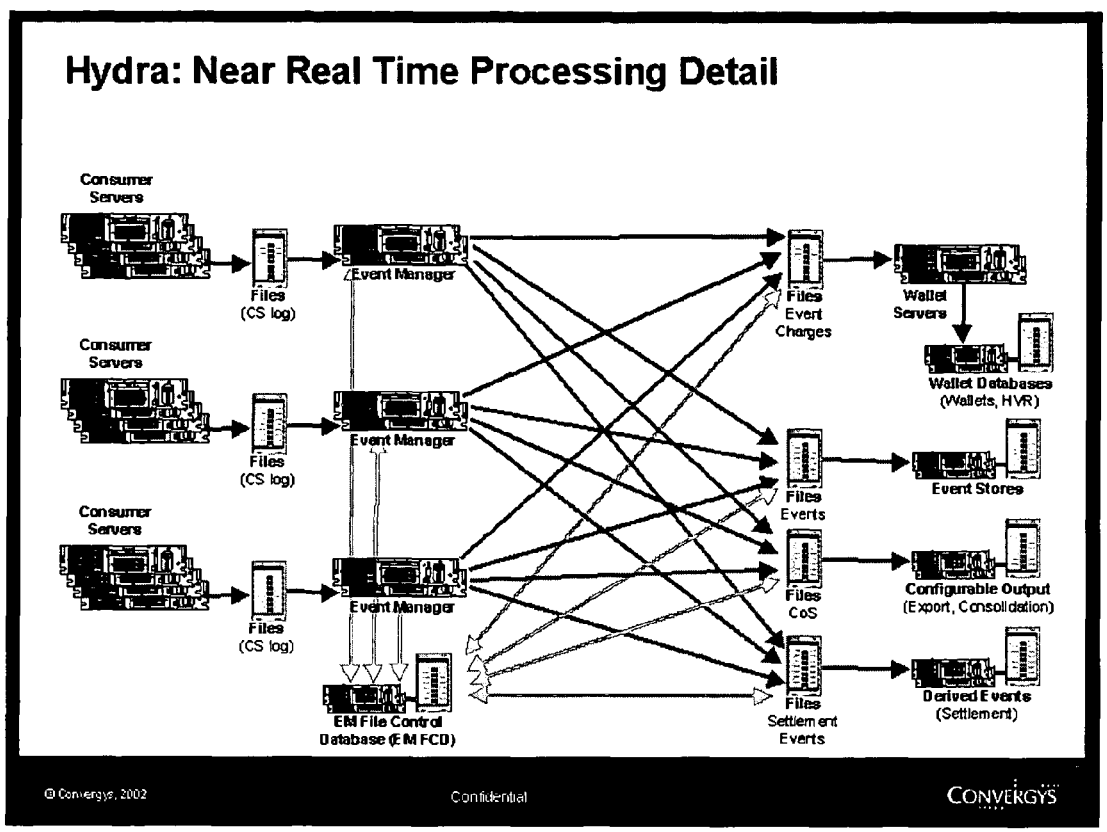
FIGS. 59-75 illustrates a real-time embodiment of FIGS. 17-33.
Figure 60:
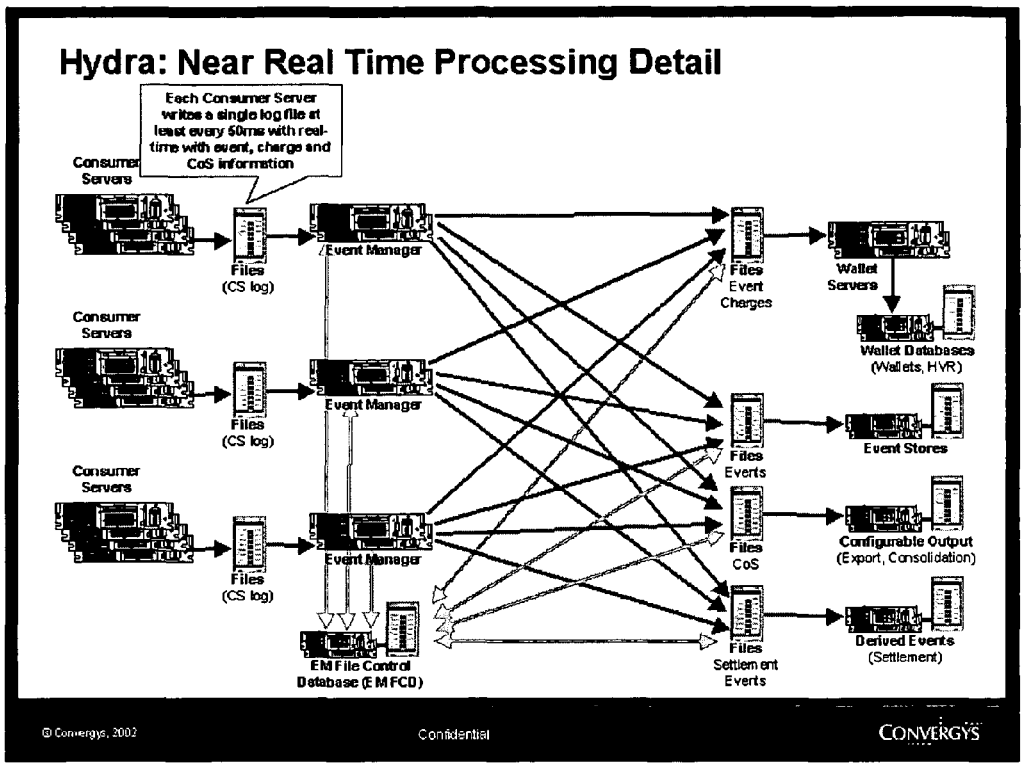
Figure 61:
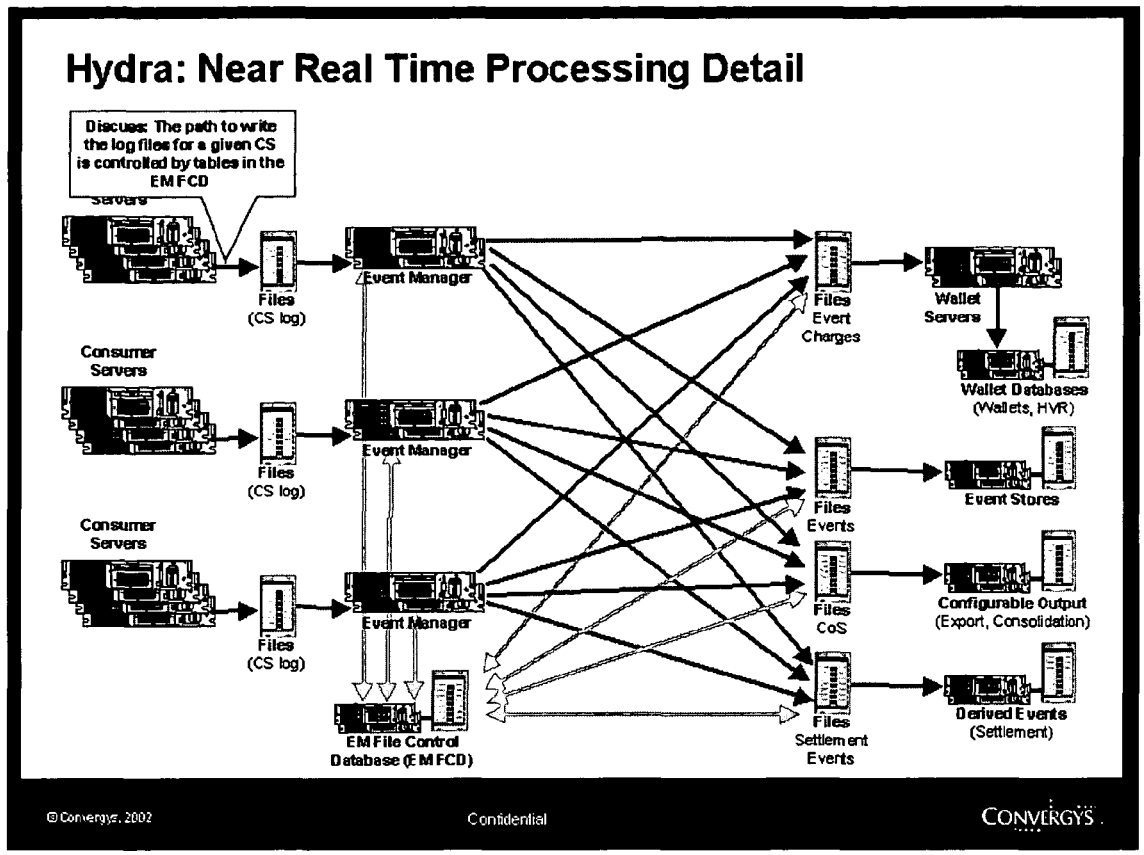
Figure 62:
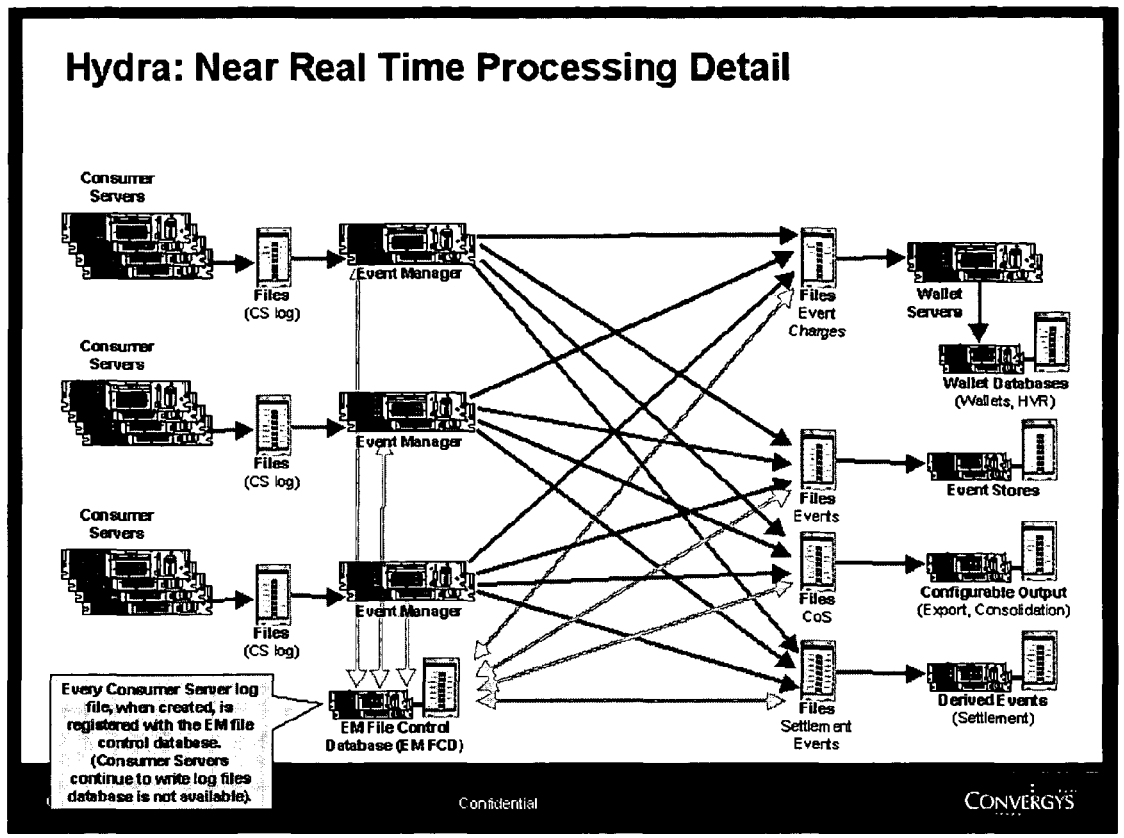
Figure 63:
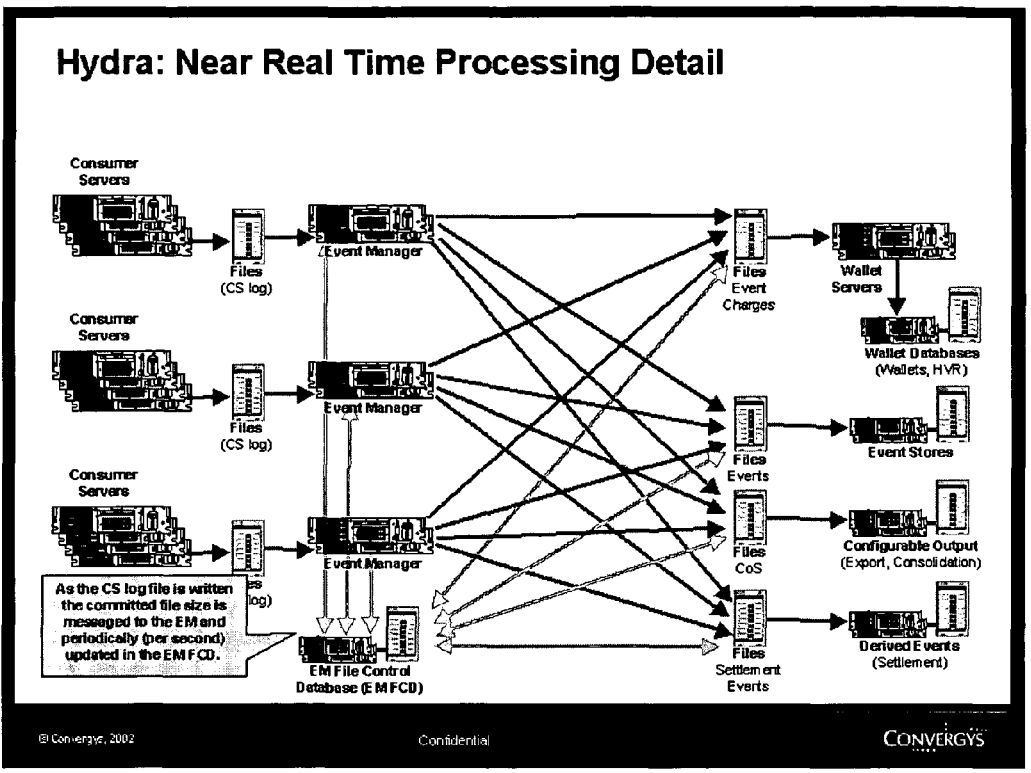
Figure 64:
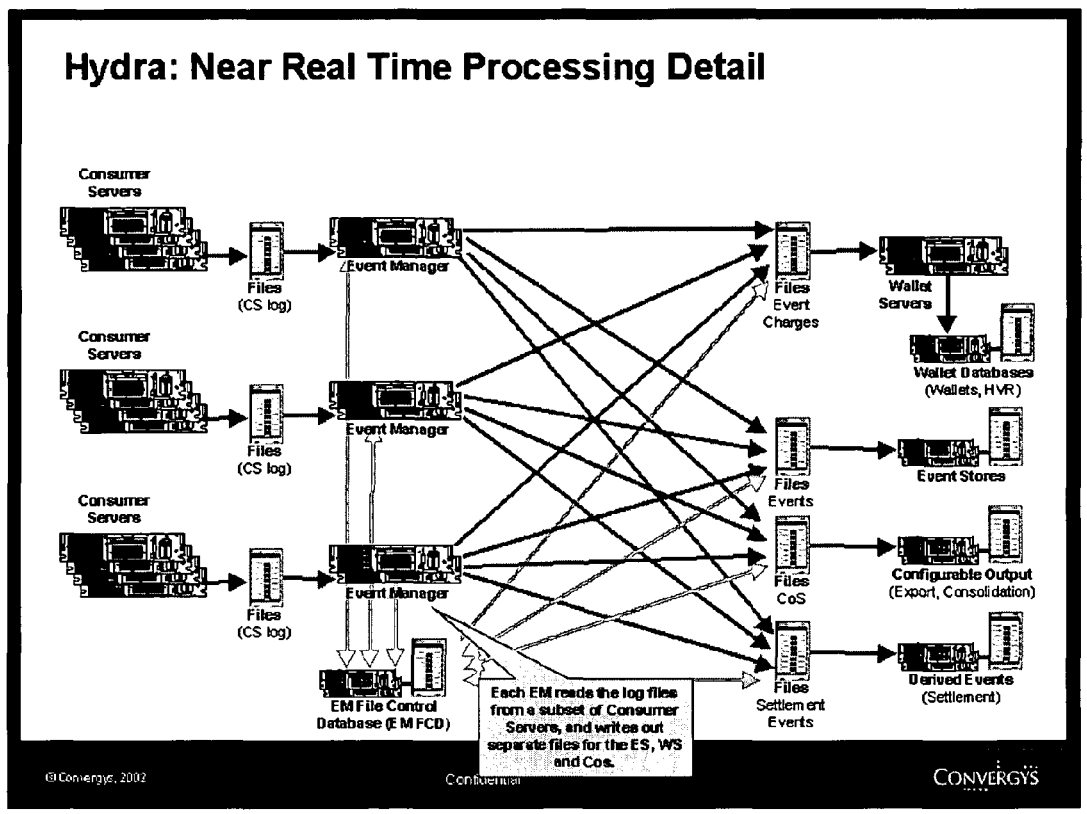
Figure 65:
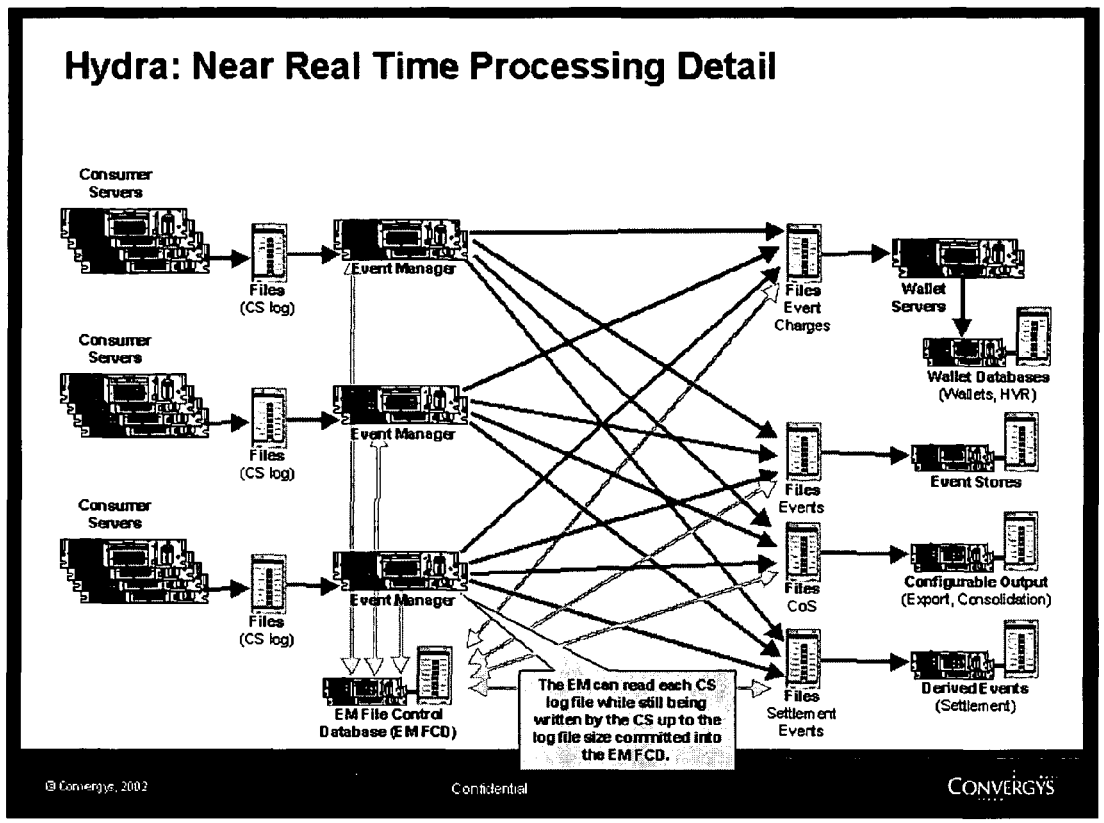
Figure 66:
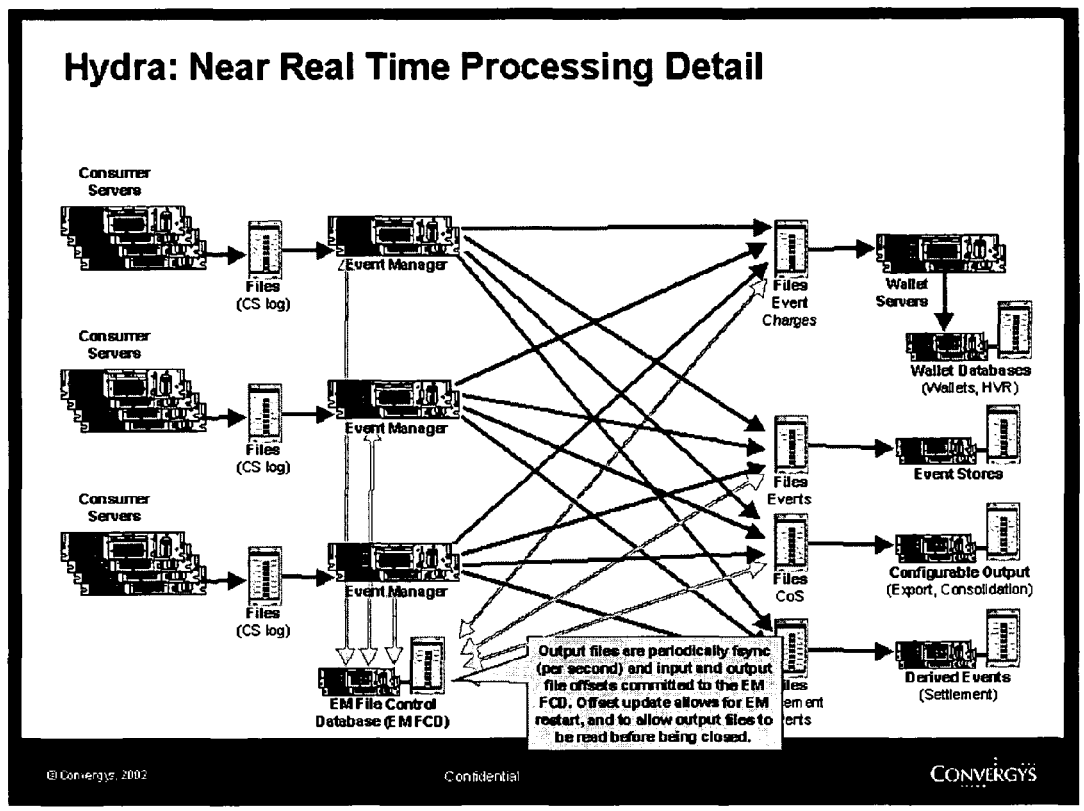
Figure 67:
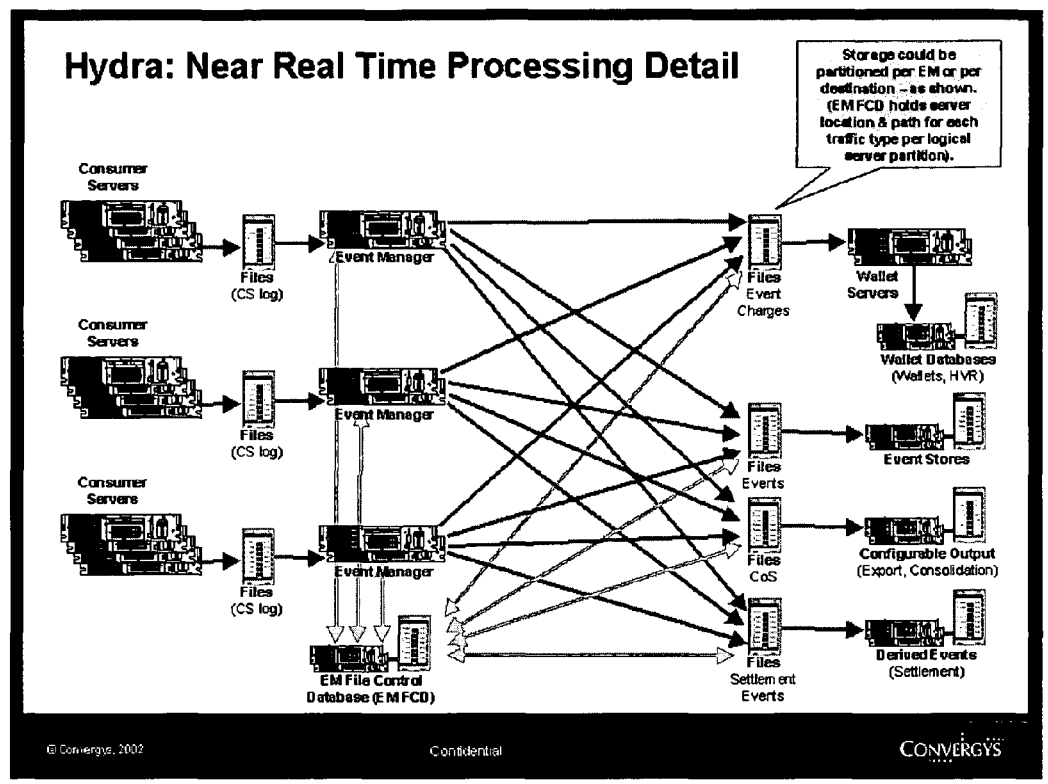
Figure 68:
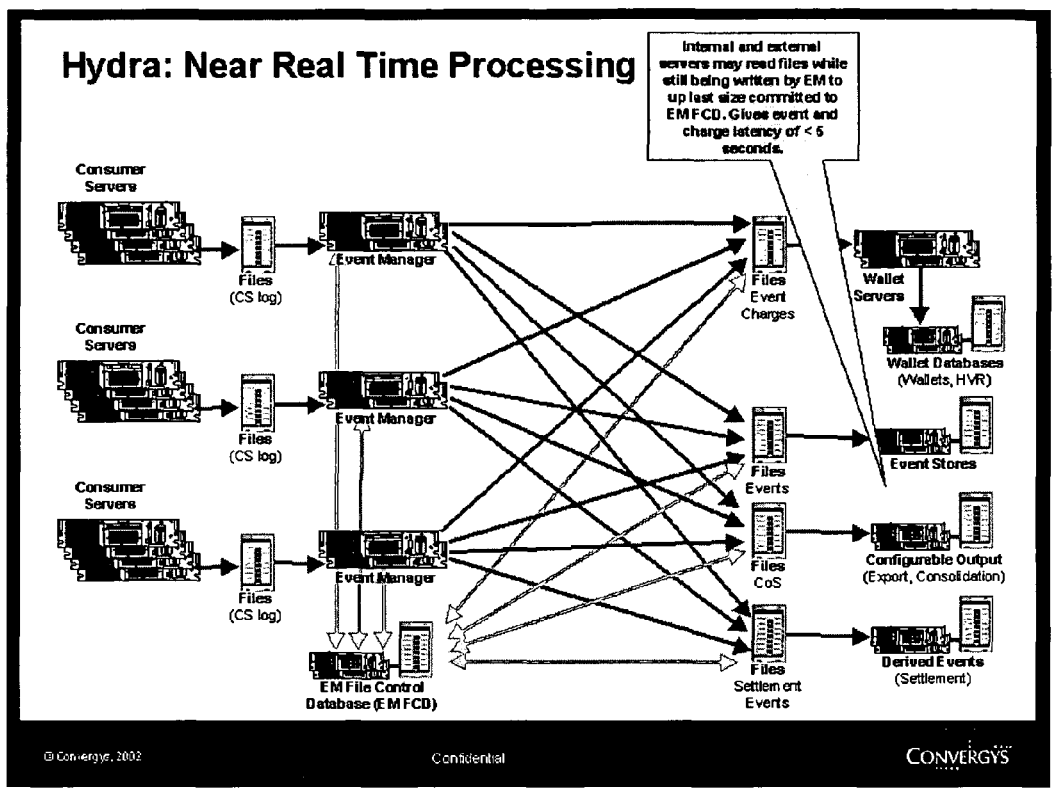
Figure 69:
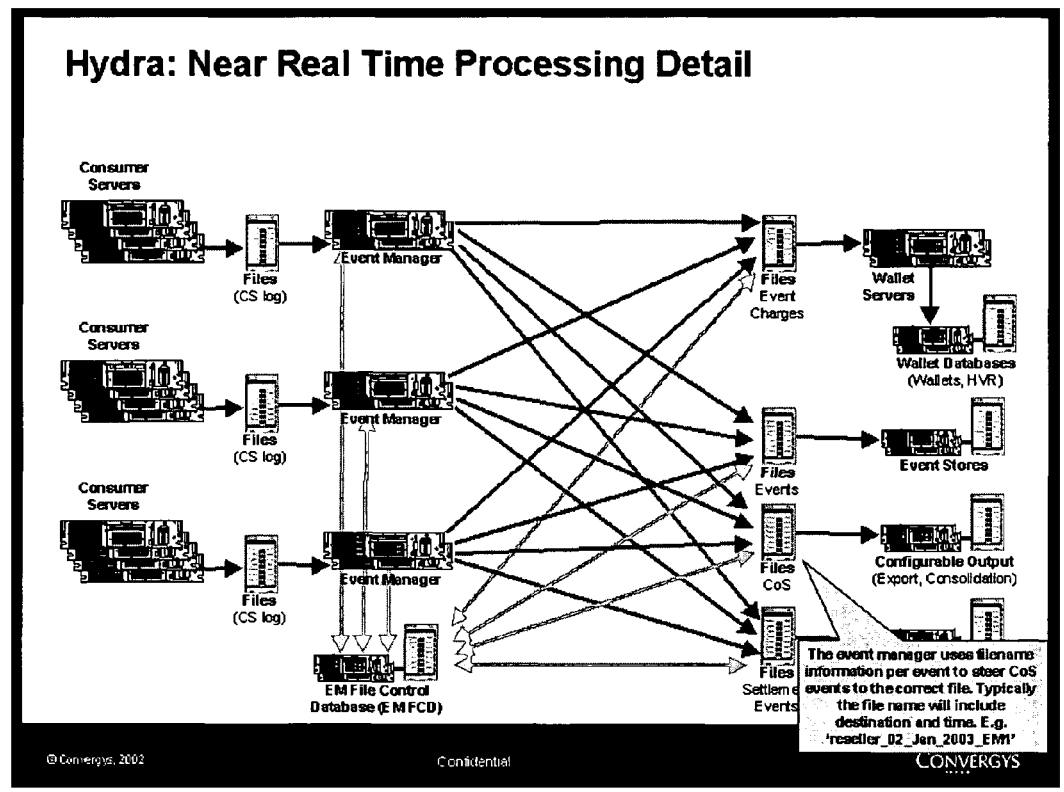
Figure 70:
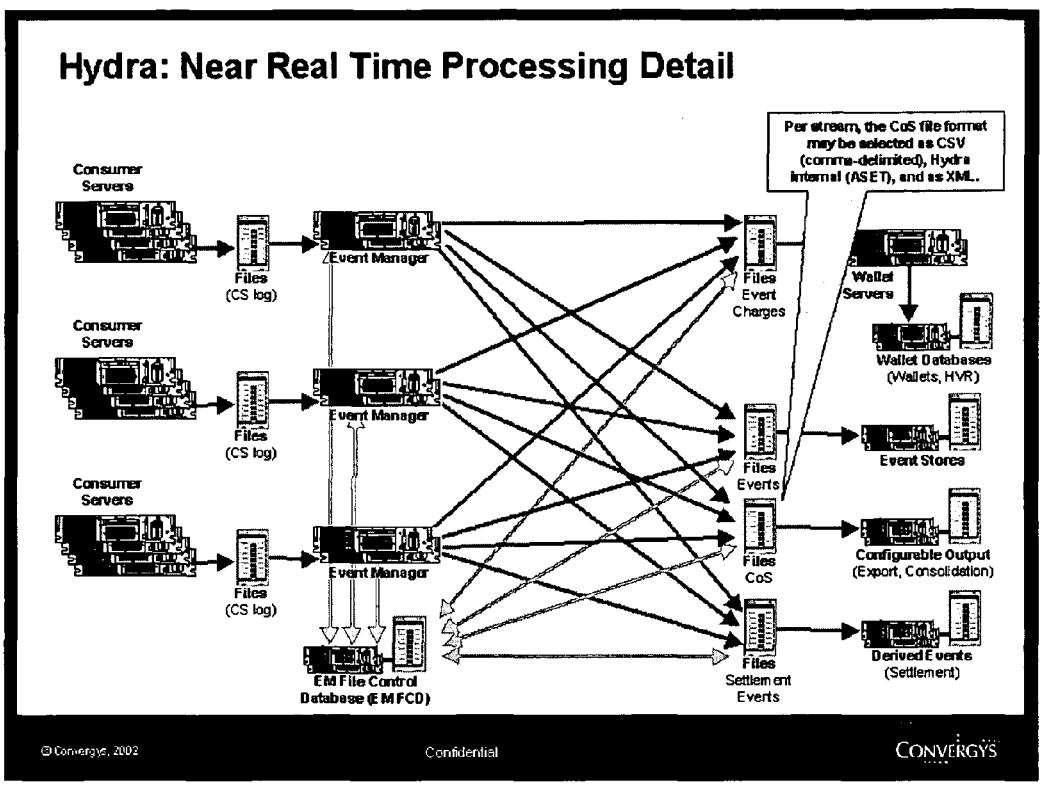
Figure 71:
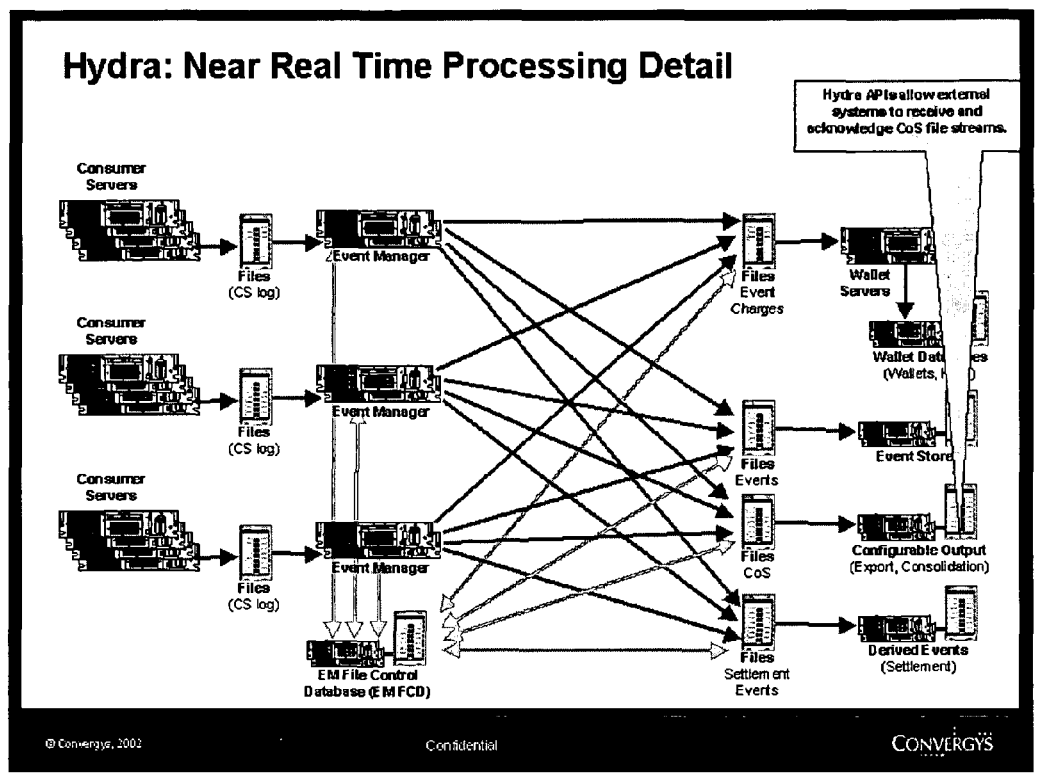
Figure 72:
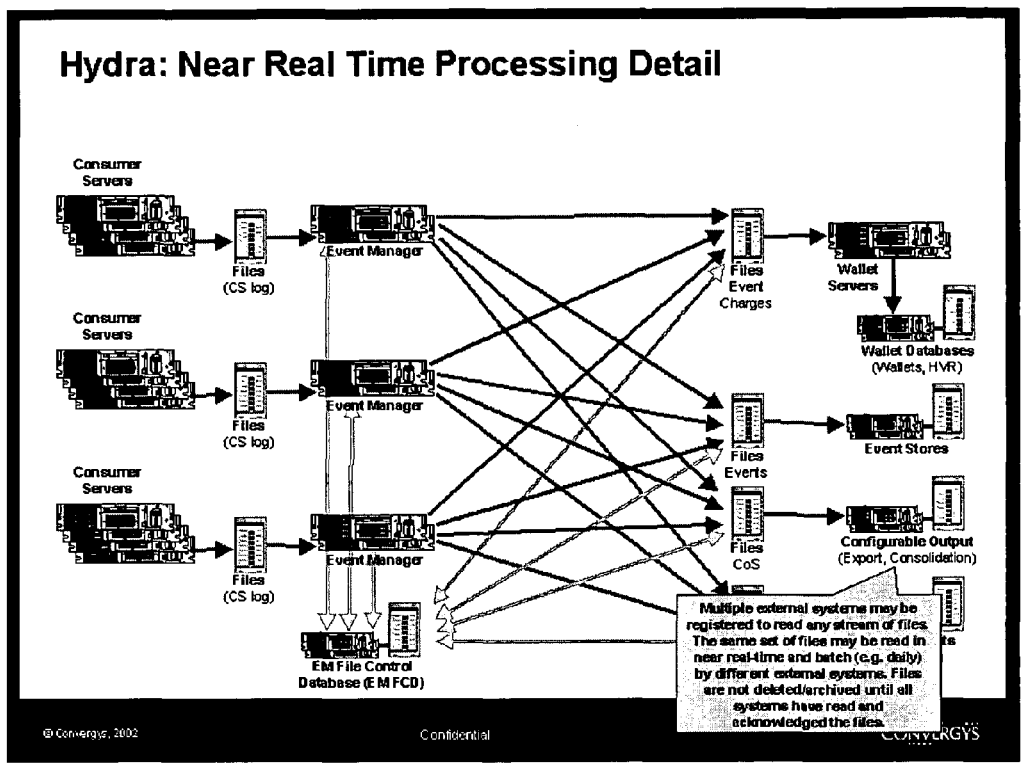
Figure 73:
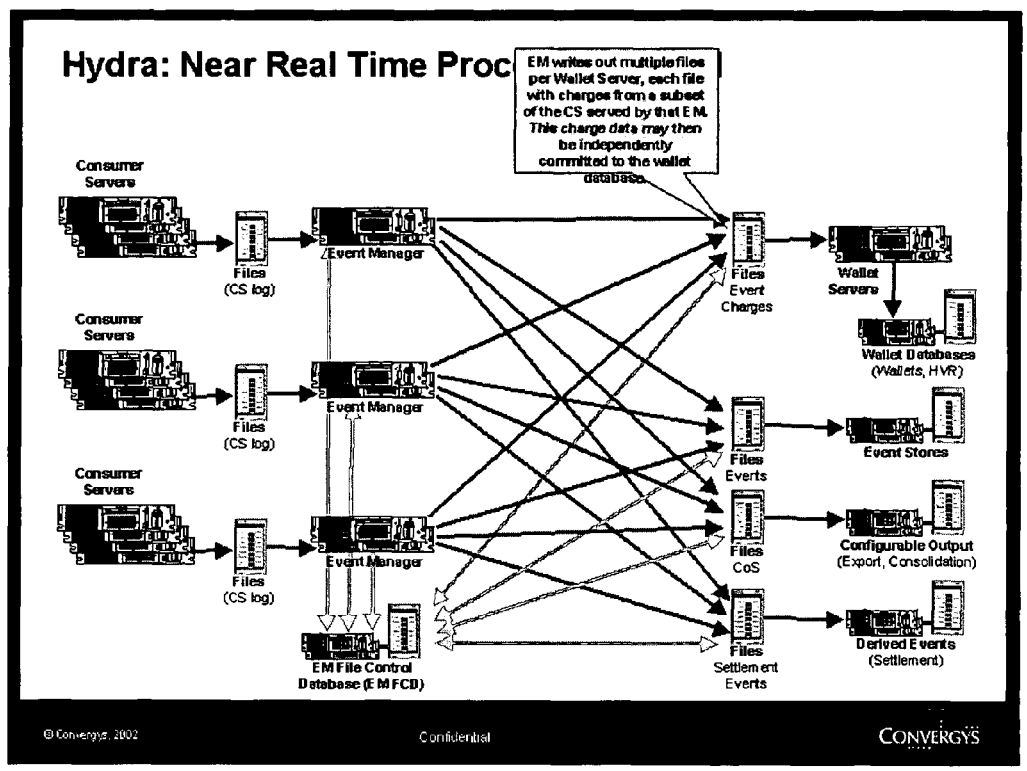
Figure 74:
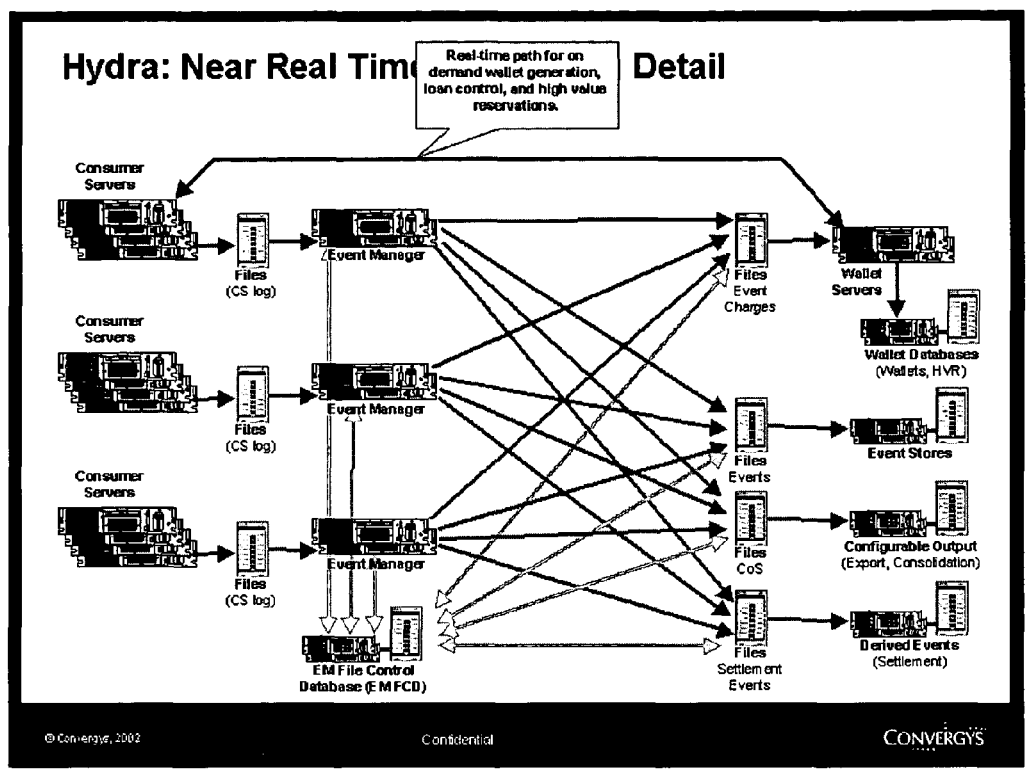
Figure 75:
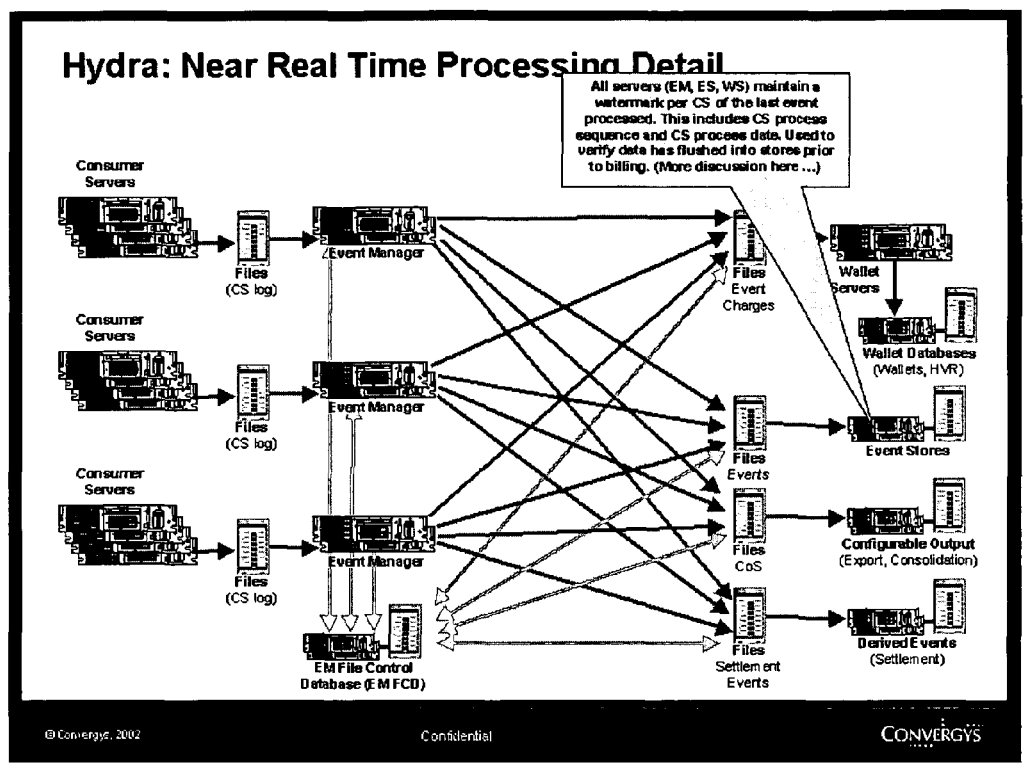

Referring to FIG. 58, an example for the WAI, Wallet, and Wallet Fragment is illustrated.

Wallet number: Allocated by Wallet Server. This may be a wallet sequence number and may be the same for all wallets that cover the same period. Used to tie together wallets of different Consumer Server that cover the same period as the wallet number will be the same. (So for periodic wallets stating in March, we can get March 2003=1, April 2003=2. March 2004=13. For long duration cash wallets there may be only one wallet of sequence 1).

Total loan value may be set at wallet creation and may be the maximum value that can be charged against the wallet. (Typically 100 min, or some cash limit for authorizations, for cash wallets this limit may be typically only used to control authorizations).

Wallet Server Start may be the first day wallet can be consumed from. For free minutes, this may be typically the date of the free period from which the wallet can be consumed. For cash wallets this may be typically the account creation date.

Wallet Server End may be the last day wallet can be consumed from. Typically set to forever for cash wallets and end of period for limited consumption wallet.

Next Wallet Start may be the date of next wallet. Never/invalid for cash wallets. Use for free minute wallets to find if there may be a gap before the next wallet, or if there may be another wallet that overlaps this period.

Last Wallet End may be the date of previous wallets. If invalid then no earlier wallet exists.

Values controlled by the Wallet Server may be changed by the Wallet Server over time.

Wallet server local usage: Usage saved in the Wallet Server from wallets that have been recalled from Consumer Server and destroyed, or usage recovered from a Consumer Server log following a Consumer Server failure. That is, usage for which no real time resource exists in a Consumer Server anymore.

Wallet server duplicate adjustments: Adjustments made to the wallets by the Wallet Server (e.g. negative adjustments due to duplicate removal). The changes may be recorded as events generated by the Wallet Server.

Wallet server other adjustments: Adjustments made to the wallets by the Wallet Server (e.g. payments). The changes may be recorded as events generated by the Wallet Server.

Values stored by billing extract, to determine what part of this wallet fragment has been reflected on the bill:

Billed value snapshots: Values of this wallet that have been billed, lined to some bill/extract number.

Numeric Consumer Server pool element ID: The ID of the Consumer Server on which this wallet fragment exists.

Fragment number: Used to identify a wallet fragment within a WAI across all Consumer Server (and wallet numbers).

Local wallet fragment state: Master state of the wallet as determined by the Wallet Server (open, closed, return requested etc).

Loan granted value: Fragment of loan granted to this Consumer Server by the Wallet Server.

Information values returned as part of the loan protocol, used to support new loan requests and interactive changes to recall loans etc.:

Remote wallet fragment state: State of the wallet last reported by the Consumer Server as part of the interactive Wallet Server/Consumer Server loan protocol.

Last resource via loan request: Consumer Server resource left at last loan request or other interactive Consumer Server/Wallet Server message. Used to be the latest Consumer Server resource for loan determination. (May not be persisted, and may never be committed to the Consumer Server log file, but potentially the most recent resource change seen by the Wallet Server).

Last sequence no via loan request: Sequence number of the last Consumer Server change seen.

Number of charges processed: Number of charges that have been processed for this wallet fragment from the Consumer Server log file.

Highest Consumer Server charge sequence number: Highest charge sequence number we have seen to date. As a simple test if the charges are processed in order then the number of charges should follow the sequence highest sequence number.

Remote fragment resource from Consumer Server: The last fragment resource as reported by the Consumer Server, corresponding with the highest Consumer Server charge sequence number seen.

Local fragment resource: Local fragment resource constructed from the deltas seen in the events. If all charges have been processed and no math errors exist then the local and remote fragment resources should match.

Wallet Fragment States

The wallet can be in the following states (this value may be decomposed into a number of flags), and the Consumer Server and Wallet Server track both their local state, and exchange their state with the remote server. The states are as follows (not that the Wallet Server and the Consumer Server may not use all of the states):

1. New request
2. Open/more. Open for use, more loan may be available. No loan requests pending.
3. Open/more/request. Open for use, more loan may be available. Loan change pending.
4. Open/no more. Open for use, no more loan available in Wallet Server.
5. Closed (no more loan, and loan already used so no events/authorizations can be set against this wallet).
6. Return requested (wallet may be in process of being passed back to Wallet Server, so no events/authorizations can be set against this wallet).
7. Purgable. Wallet can be purged from memory. Wallet server has 'taken control' of this resource.

The Consumer server may maintain two flags per shadow wallet:

1. 'LOAN_EXHAUSTED'. This may be used to cache information that the Wallet Server has no more loan to give to the Consumer Server. This prevents a Consumer Server from repeatedly asking for a loan that has been exhausted on the Wallet Server.
2. 'LOAN_FULLY_SPENT'. This may be a flag indicating that the Consumer Server has previously indicated that the internal loan may be fully consumed. The Wallet Server will have then assumed that the Consumer Server has no returnable loan for that shadow wallet, and will not include this shadow wallet in any loan reallocation. If an external loan may be cancelled or a payment may be made, and there is loan that can be returned then a new Wallet Status message can be triggered.]

Recovery

Replacement Consumer servers will create a new shadow wallet in the Balance Server. The shadow wallet loans data in the Wallet Server associated with the failed Consumer Server may be 'released' in a timer or when the Consumer Server Work Manager reports that the server has failed (typically as the machine has rebooted and re-registered). On failure the shadow wallet resource as held in the Wallet Server (including any journal changes in the Consumer Server) may be merged onto the Master Wallet Upgrades The Wallet Server may be upgraded prior to any Consumer Server upgrade, or any API server upgrade. The upgrade may be completed by moving shadow wallet Servers from one physical Wallet Server to another server.

The invention claimed is:

1. A computerized system for resource management comprising:
   a. a computer readable datastore associated with a server, said server hereinafter referred to as a wallet server, wherein a master copy of a wallet comprising computer readable storage representing a usage allowance, hereinafter master wallet, is stored;
   b. a plurality of logical servers which are logical partitions of said wallet server;
   c. a plurality of computer readable logical datastores which are logical partitions of said datastore;
   wherein said wallet server further comprises computer executable instructions to:
   create said master wallet for a set of users;
   configure each of said plurality of logical servers and their associated logical datastores for a subset of said set of users;
   allocate a plurality of independent subsets of said master wallet, prior to an event arrival including a request, each of said subsets hereinafter referred to as a shadow wallet, wherein each shadow wallet is associated with one of said plurality of logical servers and its associated logical datastore;
   configure each of said plurality of logical servers, to process said request received by said system for a given user from said subset of users against said shadow wallet associated with said given user;
   monitor usage across all of the shadow wallets derived from said master wallet and automatically adjust the usage allowances subdivided across said shadow wallets in anticipation of expected future use of said shadow wallets.

2. A computerized system as claimed in claim 1 wherein said wallet server further comprises computer executable instructions to configure said logical servers to notify said wallet server as the usage allowance allocated to a given shadow wallet is consumed.

3. A computerized system as claimed in claim 2 wherein said wallet server further comprises computer executable instructions to create an additional shadow wallet.

4. A computerized system as claimed in claim 3 wherein said wallet server further comprises computer executable instructions to reallocate said master wallet across said shadow wallets associated with said master wallet.

5. A computerized system as claimed in claim 4 wherein said wallet server further comprises computer executable instructions to
   a. configure a given logical server to automatically request an additional usage allowance when a first shadow wallet reaches a predetermined minimum usage allowance;
   b. receive said request for additional usage allowance;
   c. allocate a subset of any unclaimed usage allowance from said master wallet to said first shadow wallet.

6. A computerized system as claimed in claim 5 wherein said wallet server further comprises computer executable instructions to reclaim an unused portion of said usage allowance allocated to a second shadow wallet and reallocate said unused portion to said first shadow wallet.

7. A computerized system as claimed in claim 6 wherein said automatic reallocation reduces the number of automatic requests made by a given logical server for additional usage allowance.

8. A computerized system as claimed in claim 1 wherein said master wallet includes a set of conditions pertaining to the access of said master wallet that are passed onto any shadow wallets associated with said master wallet.

9. A computerized system as claimed in claim 8 wherein said set of conditions are automatically determined by a product purchased by a user.

10. A computerized system as claimed in claim 9 wherein said set of conditions includes a validity period.

11. A computerized system as claimed in claim 1 wherein said wallet server further comprises computer executable instructions to, upon the failure of any of said plurality of logical servers, their associated logical datastores or said shadow wallets, hereinafter a failed logical component, create a new logical component to replace said failed component.

12. A computerized system for resource management comprising:
  a. a computer readable datastore associated with a server, said server hereinafter referred to as a wallet server, wherein a master copy of a wallet comprising computer readable storage representing a usage allowance, hereinafter master wallet, is stored;
  b. a plurality of logical servers which are logical partitions of said wallet server;
  c. a plurality of computer readable logical datastores which are logical partitions of said datastore;
  wherein said wallet server further comprises computer executable instructions to:
    create said master wallet for a set of users;
    configure each of said plurality of logical servers and their associated logical datastores for a subset of said set of users;
    assign a service level to each of said logical servers;
    allocate a plurality of independent subsets of said master wallet, prior to an event arrival including a request, each of said subsets hereinafter referred to as a shadow wallet, wherein each shadow wallet is associated with one of said plurality of logical servers and its associated logical datastore;
    determine a service level associated with said request received by said system and distribute said request to a particular logical server associated with said service level and configure said particular logical server, to process a request received by said system for a first user from said subset of users against said shadow wallet associated with said first user.

13. A computerized system for resource management comprising:
  a. a computer readable datastore associated with a server, said server hereinafter referred to as a wallet server, wherein a master copy of a wallet comprising computer readable storage representing a usage allowance, hereinafter master wallet, is stored;
  b. a plurality of logical servers which are logical partitions of said wallet server;
  c. a plurality of computer readable logical datastores which are logical partitions of said datastore;
  wherein said wallet server further comprises computer executable instructions to:
    create said master wallet for a set of users associated with an account providing a bundled allowance;
    configure each of said plurality of logical servers and their associated logical datastores for a subset of said set of users;
    subdivide said master wallet into a plurality of independent shadow wallets, prior to an event arrival including a request, wherein each shadow wallet is associated with one of said plurality of logical servers and its associated logical datastore;
    process a plurality of requests against said master wallet by configuring each of said plurality of logical servers, to process said request received by said system for a given user from said subset of users against said shadow wallet associated with said given user.

14. A computerized system as claimed in claim 13 wherein said wallet server further comprises computer executable instructions to set a flag, accessible by any of said plurality logical servers, to indicate a state relating to said master wallet.

15. A computerized system as claimed in claim 14 wherein said flag indicates that additional usage allowance is not available from said master wallet.

16. A computerized system as claimed in claim 15 wherein said wallet server further comprises computer executable instructions to set a corresponding flag on each of said shadow wallets derived from said master wallet to inform said associated logical servers that the master wallet is exhausted in order to limit repeated requests by said associated logical servers for additional usage allowance.

17. A computerized system as claimed in claim 14 wherein said master wallet includes a schedule for automatic periodic usage allowance replenishment which is associated with a product purchased by a user.

18. A computerized system as claimed in claim 13 wherein said wallet server further comprises computer executable instructions to configure said plurality of logical servers to process a query in isolation from said wallet server.

* * * * *